(12) United States Patent
Himes, Jr.

(10) Patent No.: US 10,456,910 B2
(45) Date of Patent: Oct. 29, 2019

(54) EDUCATIONAL SYSTEMS COMPRISING PROGRAMMABLE CONTROLLERS AND METHODS OF TEACHING THEREWITH

(71) Applicant: Purdue Research Foundation, West Lafayette, IN (US)

(72) Inventor: Larry Eugene Himes, Jr., West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 104 days.

(21) Appl. No.: 15/406,118

(22) Filed: Jan. 13, 2017

(65) Prior Publication Data

US 2017/0232611 A1    Aug. 17, 2017

Related U.S. Application Data

(60) Provisional application No. 62/278,718, filed on Jan. 14, 2016.

(51) Int. Cl.
*B25J 9/16* (2006.01)
*G05B 19/409* (2006.01)

(52) U.S. Cl.
CPC ............ *B25J 9/161* (2013.01); *G05B 19/409* (2013.01); *G05B 2219/39059* (2013.01)

(58) Field of Classification Search
USPC ................................................ 700/245–264
See application file for complete search history.

(56) References Cited

U.S. PATENT DOCUMENTS

| | | | | |
|---|---|---|---|---|
| 4,484,120 A | * | 11/1984 | Olex | B25J 9/1671 318/568.14 |
| 4,616,326 A | * | 10/1986 | Meier | B23K 9/1272 318/561 |
| 4,675,502 A | * | 6/1987 | Haefner | B25J 9/1684 219/124.34 |
| 5,373,747 A | * | 12/1994 | Ogawa | B25J 13/084 73/862.041 |
| 5,447,403 A | * | 9/1995 | Engler, Jr. | B25J 15/0009 294/111 |
| 5,501,498 A | * | 3/1996 | Ulrich | B25J 9/102 294/106 |
| 5,579,444 A | * | 11/1996 | Dalziel | B25J 9/1669 382/153 |
| 5,617,515 A | * | 4/1997 | MacLaren | B25J 9/1656 414/5 |

(Continued)

*Primary Examiner* — Jonathan L Sample
(74) *Attorney, Agent, or Firm* — Hartman GLobal IP Law; Gary M. Hartman; Domenica N. S. Hartman

(57) ABSTRACT

Systems and methods for hands-on training of students. Such a system includes one or more programmable controllers configured to interact with one or more external devices. Each programmable controller includes a microcontroller, a memory device, an interface for remotely accessing the programmable controller, and at least one bus interface for interfacing with an external microcontroller of another programmable controllers. The method includes functionally coupling a first of the programmable controllers to an external device, programming the first programmable controller to operate the external device, and providing instructions to the external device through the programmable controller from a remote location relative to the first programmable controller.

16 Claims, 48 Drawing Sheets

(56) References Cited

U.S. PATENT DOCUMENTS

| | | | | |
|---|---|---|---|---|
| 5,745,387 A * | 4/1998 | Corby, Jr. | B25J 9/1671 | 348/114 |
| 5,748,854 A * | 5/1998 | Watanabe | G05B 19/423 | 318/568.16 |
| 5,762,390 A * | 6/1998 | Gosselin | B25J 15/0009 | 294/106 |
| 5,782,401 A * | 7/1998 | Hinrichs | B23K 9/12 | 219/124.34 |
| 5,845,050 A * | 12/1998 | Sekiguchi | G06N 3/0427 | 706/20 |
| 6,272,396 B1 * | 8/2001 | Taitler | G05B 19/423 | 318/568.13 |
| 6,418,823 B1 * | 7/2002 | Taitler | B26D 1/08 | 83/100 |
| 6,493,606 B2 * | 12/2002 | Saijo | B25J 13/00 | 700/245 |
| 6,496,756 B1 * | 12/2002 | Nishizawa | B25J 9/1689 | 700/260 |
| 6,515,669 B1 * | 2/2003 | Mohri | G06F 3/014 | 345/418 |
| 6,584,377 B2 * | 6/2003 | Saijo | B25J 13/00 | 318/561 |
| 6,681,031 B2 * | 1/2004 | Cohen | G07F 9/023 | 382/103 |
| 6,934,603 B1 * | 8/2005 | Kochanneck | B25J 9/08 | 700/245 |
| 6,996,456 B2 * | 2/2006 | Cordell | B25J 9/1692 | 219/124.34 |
| 7,164,971 B2 * | 1/2007 | Ferla | B25J 13/06 | 700/247 |
| 7,211,980 B1 * | 5/2007 | Bruemmer | G05D 1/0246 | 318/567 |
| 7,565,295 B1 * | 7/2009 | Hernandez-Rebollar | G06K 9/00355 | 382/182 |
| 7,701,202 B2 * | 4/2010 | Torres-Jara | G01L 5/16 | 324/207.2 |
| 7,714,895 B2 * | 5/2010 | Pretlove | B25J 9/1656 | 348/115 |
| 7,843,425 B2 * | 11/2010 | Lu | G06F 3/011 | 341/20 |
| 7,848,850 B2 * | 12/2010 | Hoshino | G06K 9/00362 | 700/264 |
| 8,140,188 B2 * | 3/2012 | Takemitsu | B25J 9/1661 | 700/211 |
| 8,350,843 B2 * | 1/2013 | Rogowitz | G06F 3/04815 | 345/156 |
| 8,648,797 B2 * | 2/2014 | Nagasaka | G06F 3/014 | 345/156 |
| 8,751,063 B2 * | 6/2014 | Bernstein | A63H 30/04 | 701/2 |
| 8,958,912 B2 * | 2/2015 | Blumberg | B25J 9/0087 | 700/259 |
| 9,052,710 B1 * | 6/2015 | Farwell | G05B 19/423 | |
| 9,387,590 B2 * | 7/2016 | Som | B25J 13/06 | |
| 9,527,207 B2 * | 12/2016 | Low | B25J 9/0087 | |
| 9,579,799 B2 * | 2/2017 | Parker | B25J 9/1689 | |
| 9,669,543 B1 * | 6/2017 | Stubbs | B25J 9/1612 | |
| 9,757,859 B1 * | 9/2017 | Kolb | B25J 13/089 | |
| 9,925,662 B1 * | 3/2018 | Jules | G05B 19/423 | |
| 9,975,241 B2 * | 5/2018 | Kamhi | B25J 9/161 | |
| 2001/0000663 A1 * | 5/2001 | Shahoian | A63F 13/06 | 345/156 |
| 2001/0014781 A1 * | 8/2001 | Nissim | A61H 7/001 | 601/133 |
| 2002/0061504 A1 * | 5/2002 | Saijo | B25J 13/00 | 434/268 |
| 2003/0146898 A1 * | 8/2003 | Kawasaki | B25J 13/02 | 345/156 |
| 2004/0078114 A1 * | 4/2004 | Cordell | B25J 9/1692 | 700/258 |
| 2004/0189675 A1 * | 9/2004 | Pretlove | B25J 9/1656 | 345/633 |
| 2005/0001842 A1 * | 1/2005 | Park | G06F 17/5009 | 345/474 |
| 2005/0065649 A1 * | 3/2005 | Rosenfeld | G05D 1/0231 | 700/245 |
| 2005/0065657 A1 * | 3/2005 | Green | A61B 1/00193 | 700/245 |
| 2005/0203382 A1 * | 9/2005 | Govari | A61M 25/0147 | 600/424 |
| 2005/0218679 A1 * | 10/2005 | Yokoyama | B25J 9/142 | 294/99.1 |
| 2005/0256611 A1 * | 11/2005 | Pretlove | B25J 9/1664 | 700/264 |
| 2006/0012197 A1 * | 1/2006 | Anderson | B25J 15/0009 | 294/106 |
| 2006/0056678 A1 * | 3/2006 | Tanaka | G06N 3/008 | 382/153 |
| 2006/0136095 A1 * | 6/2006 | Rob | A61J 1/20 | 700/245 |
| 2006/0253223 A1 * | 11/2006 | Bodenheimer, Jr. | B25J 13/00 | 700/245 |
| 2007/0018470 A1 * | 1/2007 | Hayakawa | B25J 9/0009 | 294/106 |
| 2007/0067678 A1 * | 3/2007 | Hosek | G05B 23/0235 | 714/25 |
| 2007/0219666 A1 * | 9/2007 | Filippov | B60T 7/22 | 700/245 |
| 2007/0260394 A1 * | 11/2007 | Dean | G01C 21/00 | 701/408 |
| 2007/0280006 A1 * | 12/2007 | Aoyama | G06K 9/0057 | 365/189.15 |
| 2008/0027582 A1 * | 1/2008 | Obinata | B25J 13/082 | 700/260 |
| 2008/0167662 A1 * | 7/2008 | Kurtz | A61B 34/70 | 606/130 |
| 2009/0076657 A1 * | 3/2009 | Tsuboi | G05B 13/021 | 700/275 |
| 2009/0132088 A1 * | 5/2009 | Taitler | G05B 19/42 | 700/264 |
| 2009/0145671 A1 * | 6/2009 | Filippov | B25J 5/005 | 180/9.42 |
| 2009/0164676 A1 * | 6/2009 | Schaller | H04L 12/40006 | 710/100 |
| 2009/0210090 A1 * | 8/2009 | Takemitsu | B25J 9/1661 | 700/245 |
| 2011/0015785 A1 * | 1/2011 | Tsusaka | B25J 9/0003 | 700/254 |
| 2011/0015787 A1 * | 1/2011 | Tsusaka | B25J 9/0003 | 700/264 |
| 2012/0185098 A1 * | 7/2012 | Bosscher | B25J 5/005 | 700/260 |
| 2012/0268580 A1 * | 10/2012 | Kim | G06F 3/017 | 348/77 |
| 2015/0057800 A1 * | 2/2015 | Cohen | A47L 9/2857 | 700/258 |
| 2015/0217449 A1 * | 8/2015 | Meier | B25J 9/1602 | 700/257 |
| 2015/0273693 A1 * | 10/2015 | Cohen | B25J 9/1661 | 700/253 |
| 2015/0283703 A1 * | 10/2015 | Izhikevich | B25J 9/163 | 706/11 |
| 2015/0290795 A1 * | 10/2015 | Oleynik | G05B 19/42 | 700/257 |
| 2015/0352718 A1 * | 12/2015 | Lee | B25J 13/006 | 700/246 |
| 2016/0031078 A1 * | 2/2016 | Kapoor | G05B 19/427 | 700/258 |
| 2016/0041628 A1 * | 2/2016 | Verma | G06F 3/0304 | 345/156 |
| 2016/0046023 A1 * | 2/2016 | Nagendran | B25J 9/1689 | 700/248 |
| 2016/0059412 A1 * | 3/2016 | Oleynik | B25J 9/163 | 700/257 |

(56) References Cited

U.S. PATENT DOCUMENTS

| | | | |
|---|---|---|---|
| 2016/0075015 A1* | 3/2016 | Izhikevich | B25J 9/163 |
| | | | 700/253 |
| 2016/0075017 A1* | 3/2016 | Laurent | B25J 9/163 |
| | | | 700/264 |
| 2016/0075034 A1* | 3/2016 | Laurent | H04L 12/282 |
| | | | 700/264 |

* cited by examiner

EDUCATIONAL SYSTEMS COMPRISING PROGRAMMABLE CONTROLLERS AND METHODS OF TEACHING THEREWITH

CROSS REFERENCE TO RELATED APPLICATIONS

This application claims the benefit of U.S. Provisional Application No. 62/278,718, filed Jan. 14, 2016, the contents of which are incorporated herein by reference.

BACKGROUND OF THE INVENTION

The present invention generally relates to teaching systems and methods. The invention particularly relates to educational systems comprising programmable devices for operating electronic systems such as robotic devices, vehicles, etc., and methods of use thereof suitable for hands-on education for students.

Mechatronics refers to an approach to design and development that merges principles of electrical engineering, mechanical engineering, and computer science. Mechatronic devices find use in a variety of industries and applications, including but not limited to the entertainment industry, elderly care, surgery, agriculture, and automotive. Depending on the particular application, mechatronic engineers may need an understanding of mechanical design for structural considerations, kinematics, dynamics, and statics for component interaction and movement considerations, and power electronics actuation and power considerations.

Commonly, science, technology, engineering and mathematics (STEM) education relating to the field of mechatronics involves demonstrations using robotic kits intended to teach students an understanding of both hardware and software considerations. These kits generally include at least a controller device capable of operating a relatively simple robotic device. However, these kits, controllers, and the robotic devices they control are often expensive for the educational setting, leading to limited resources and a lack of hands-on training for students. In addition, many of the commercially available educational robotic kits are limited in their capabilities and therefore only suitable for use in teaching certain aspects of mechatronics.

Inadequate training in most areas of technology can lead to several problems in the real world. For example, inadequate hands-on training may lead to preventable accidents, loss of production, and elevated manufacturing costs. Accordingly, there is an ongoing desire for systems and methods of use thereof suitable for hands-on educational training for students.

BRIEF DESCRIPTION OF THE INVENTION

The present invention provides systems and methods of teaching that are suitable for hands-on training of students.

According to one aspect of the invention, an educational system is provided that includes one or more programmable controllers configured to interact with one or more external devices. Each programmable controller includes a microcontroller, a memory device, an interface for remotely accessing the programmable controller, and at least one bus interface for interfacing with an external microcontroller of another programmable controllers.

According to another aspect of the invention, an educational system is provided that includes one or more programmable controllers configured to interact with one or more external devices. Each programmable controller includes a microcontroller, a memory device, an interface for remotely accessing the programmable controller, and at least one bus interface for interfacing with an external microcontroller of another programmable controllers. At least one of the programmable controllers is a robotic controller configured for controlling movement of a robotic device and includes means for a user to interface with the robotic controller for controlling the movement of the robotic device. At least one of the programmable controllers is a graphical user interface (GUI) controller comprising a microcontroller with an internal video processor and a SD card interface for external graphics storage. At least one of the programmable controllers is an instrument controller configured to communicate with more than one external device and includes a SD card interface and at least one audio output for rendering audio files, means for monitoring sensors and control actuators of a process, and a motor output for interfacing with a motor of an external device.

According to another aspect of the invention, a method is provided for using an educational system that includes one or more programmable controllers configured to interact with one or more external devices. Each of the programmable controllers comprising a microcontroller, a memory device, an interface for remotely accessing the programmable controller, and at least one bus interface for interfacing with an external microcontroller. The method includes functionally coupling a first of the programmable controllers to an external device, programming the first programmable controller to operate the external device, and providing instructions to the external device through the programmable controller from a remote location relative to the first programmable controller.

Technical effects of the systems and methods described herein include the ability to provide a relatively low-cost educational system comprising one or more programmable controllers that are uncomplicated for students to assemble, program, and implement when applying their knowledge in an education curricula.

Other aspects and advantages of this invention will be further appreciated from the following detailed description.

DETAILED DESCRIPTION OF THE INVENTION

Figure 1:
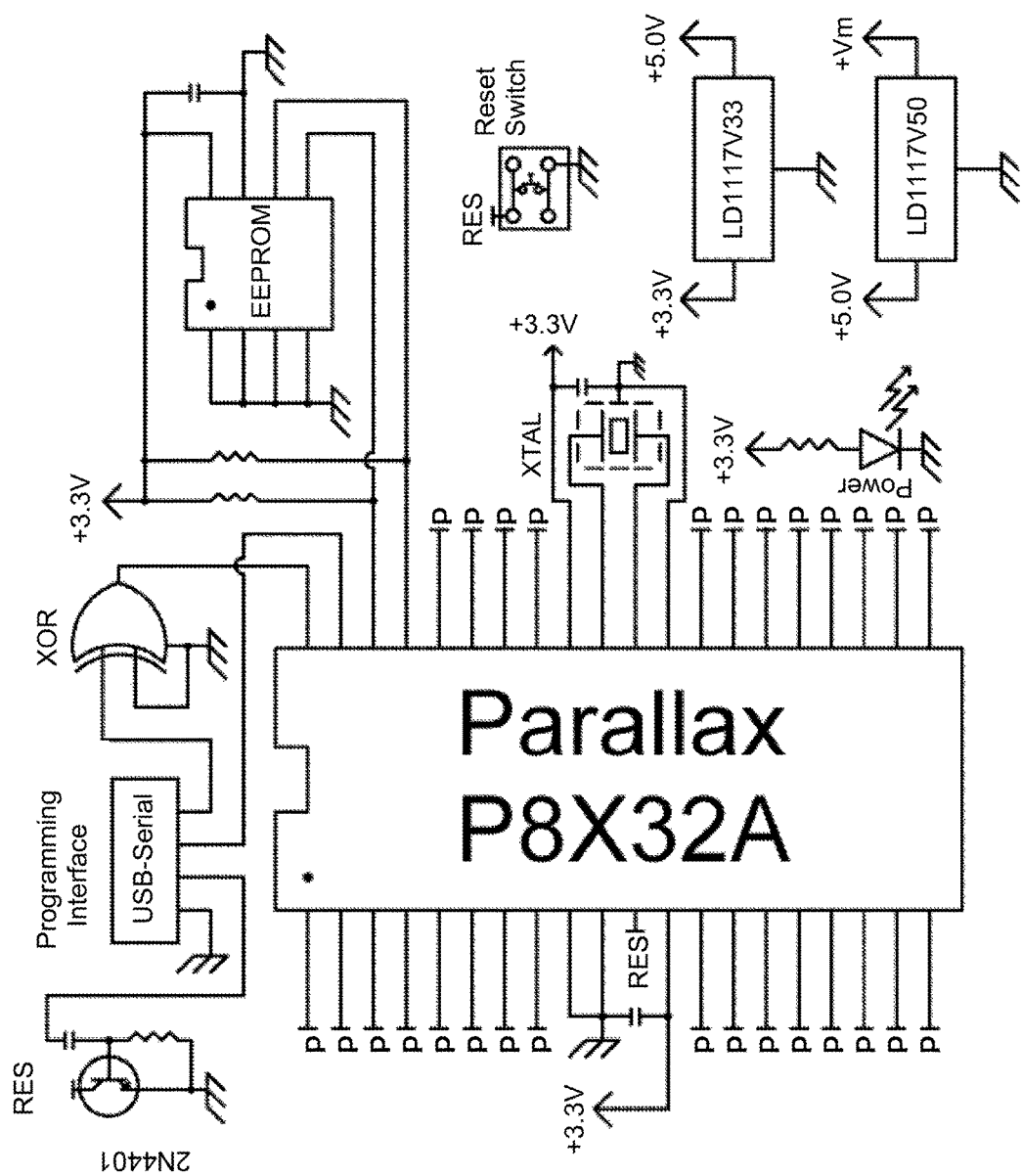
FIGS. 1 through 4 are schematics representing circuitry of a five-axis programmable controller adapted to operate a robotic device in accordance with certain aspects of the invention.

FIGS. 1 through 47 represent schematics for relatively low-cost devices that may be included in an educational system suitable for hands-on training of students. The drawings disclose certain components of the devices that are believed to be preferred or exemplary. However, it is foreseeable that functionally-equivalent components could be used. Therefore, the disclosed components are not necessarily limitations to the scope of the invention. In view of similarities between the devices of FIGS. 1 through 47, the following discussion may at times focus primarily on aspects of the specific device being described that differ from the previously discussed devices in some notable or significant manner. However, it will be understood that certain components and circuitry on the devices of FIGS. 1 through 47 may function as previously described in relation to one or more of the other devices.

An educational system comprising one or more of the components of FIGS. 1-47 or other components described herein provides a cost-effective solution to provide training to students and industry personnel. In general, the components of the system may include one or more programmable controllers capable of use in operation of external systems functionally coupled to the respective programmable controllers. As used herein, the term "programmable" indicates that the users may repeatedly reprogram the controller with programming instructions (user code) to perform various tasks. Such programmable controllers may be used individually or in combination to operate various systems including but not limited to robotic systems, gaming systems, vehicles, smoke detectors, fire alarms, etc. Commonly, industrial systems are expensive and decommissioning or purchasing of such systems for training purposes is generally not cost effective. An inexpensive educational system comprising components such as those represented in FIGS. 1-47 allows each student to have his/her own dedicated setup for programming and experimenting. This in turn may reduce the time necessary for the student to become proficient in various industrial areas including, but not limited to, manufacturing automation and remote assistance of mechatronics or robotic devices during production simulations.

As an example, the educational system may include a programmable controller capable of operating a robotic system or device. One nonlimiting example of a low-cost robot suitable for use with the educational system described herein is a five-axis robotic arm kit commercially available under the name OWI-535 Edge from OWI Incorporated. With the other components described herein, the robotic arm may be used for demonstration, testing, and feedback in the STEM education arena. The OWI-535 Edge robotic arm is capable of five degrees of freedom and manual control. In this example, the educational system may be used for interfacing with the robotic arm for standalone operation, interactive operation, and distance learning. The robotic arm may be set up, started, stopped, and repositioned as needed either locally or remotely, for example, by using an Internet connection and web browser.

Figure 13:
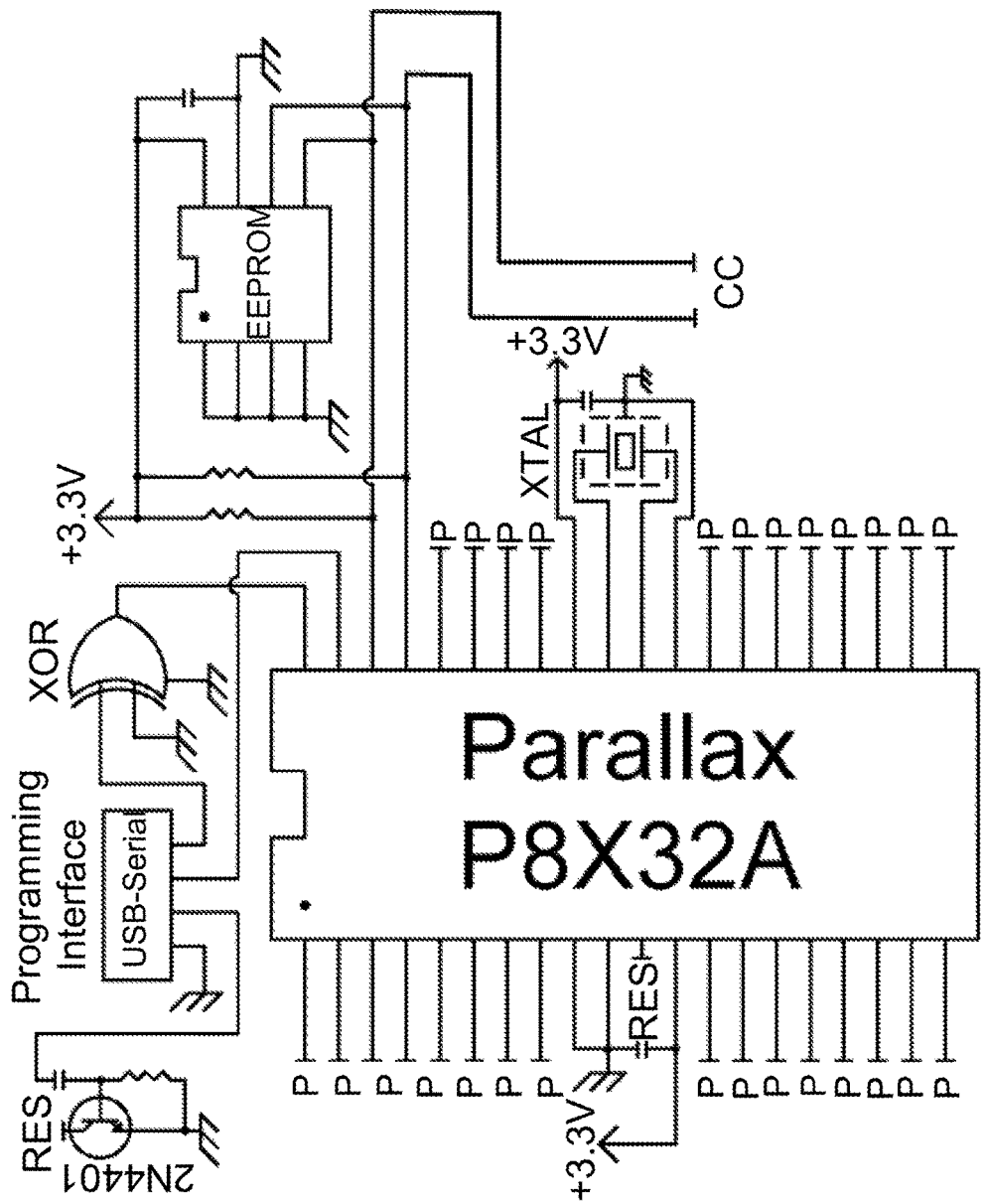
FIGS. 13 through 15 are schematics representing circuitry of a pendant PCB in accordance with certain aspects of the invention.
Figure 14:
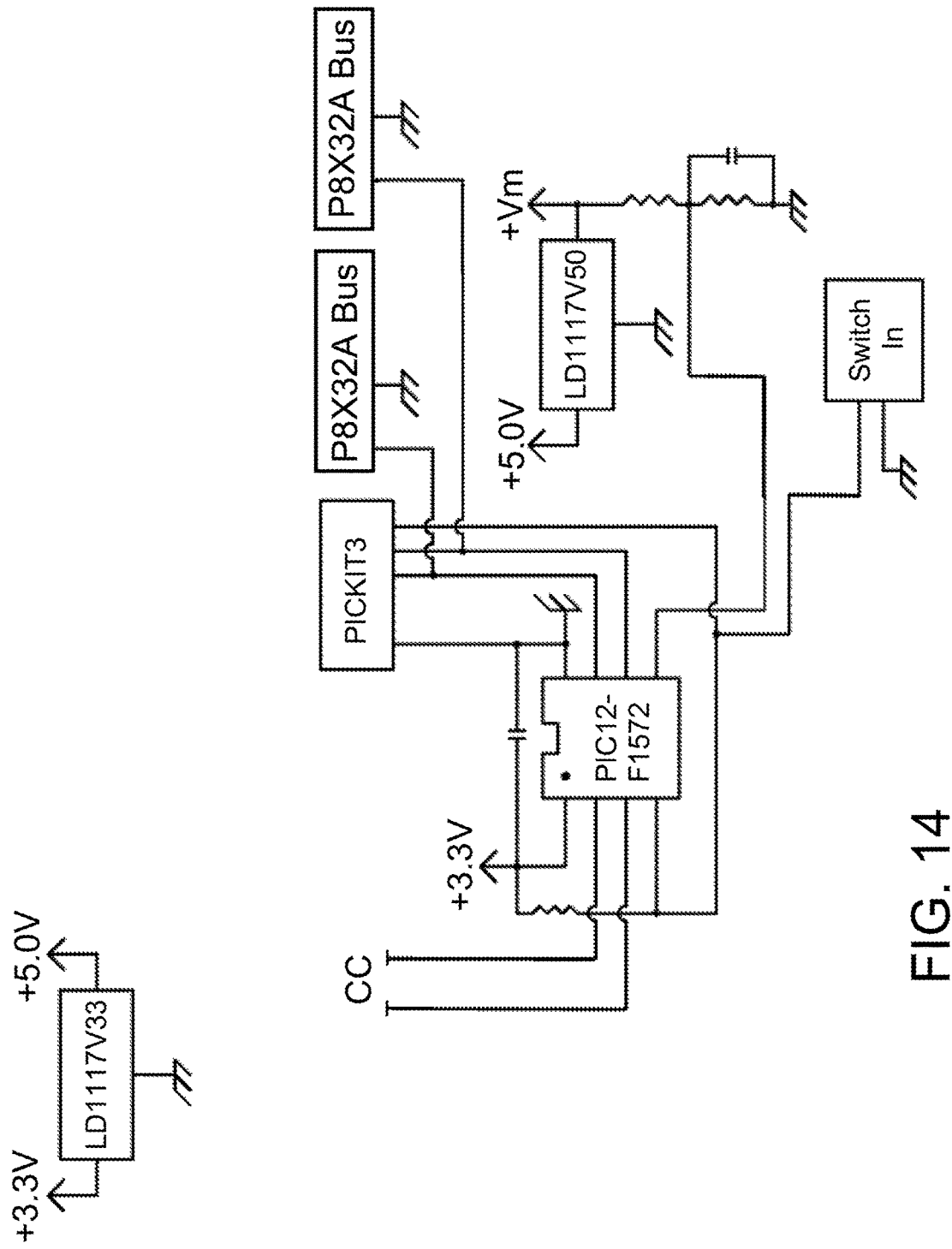
Figure 15:
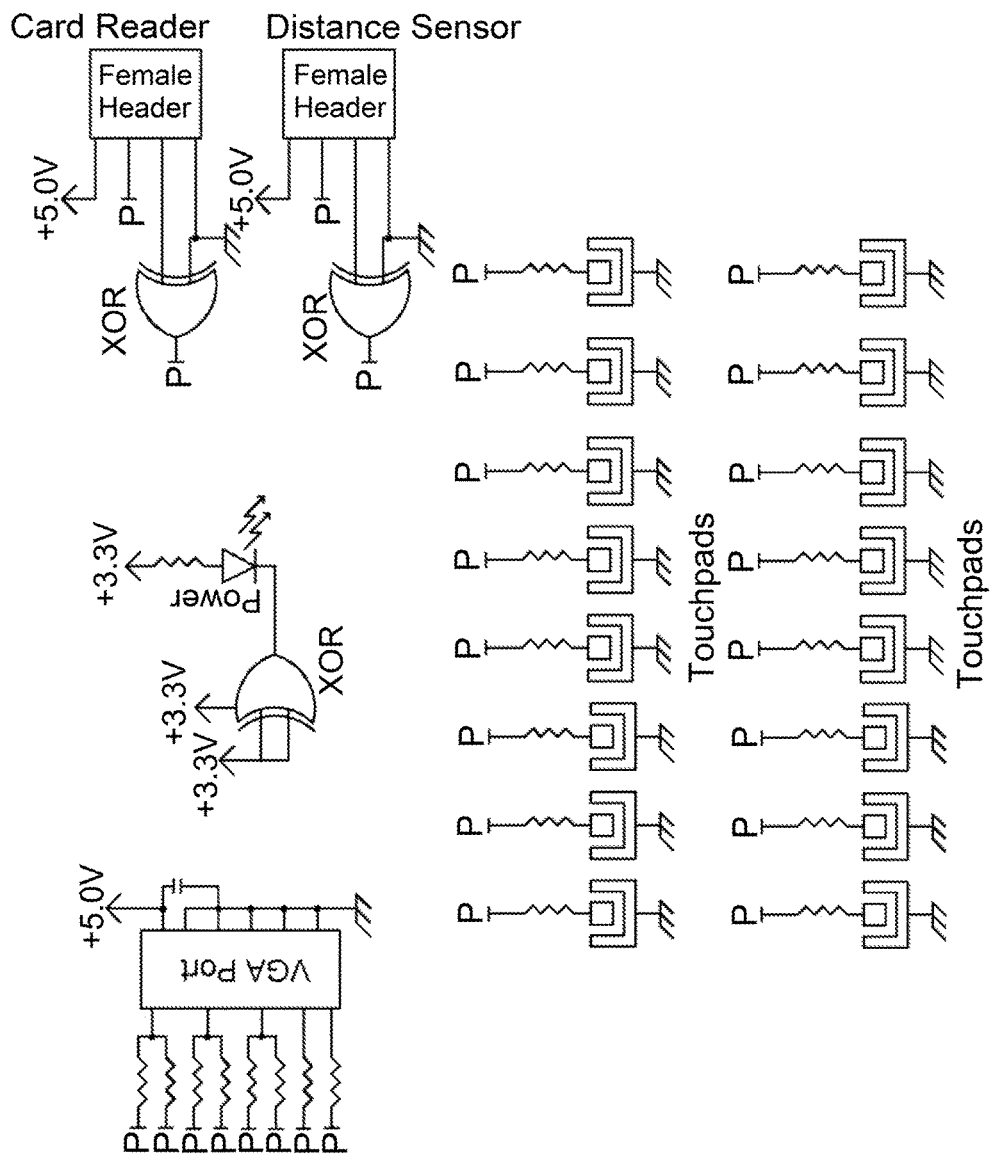
Figure 16:
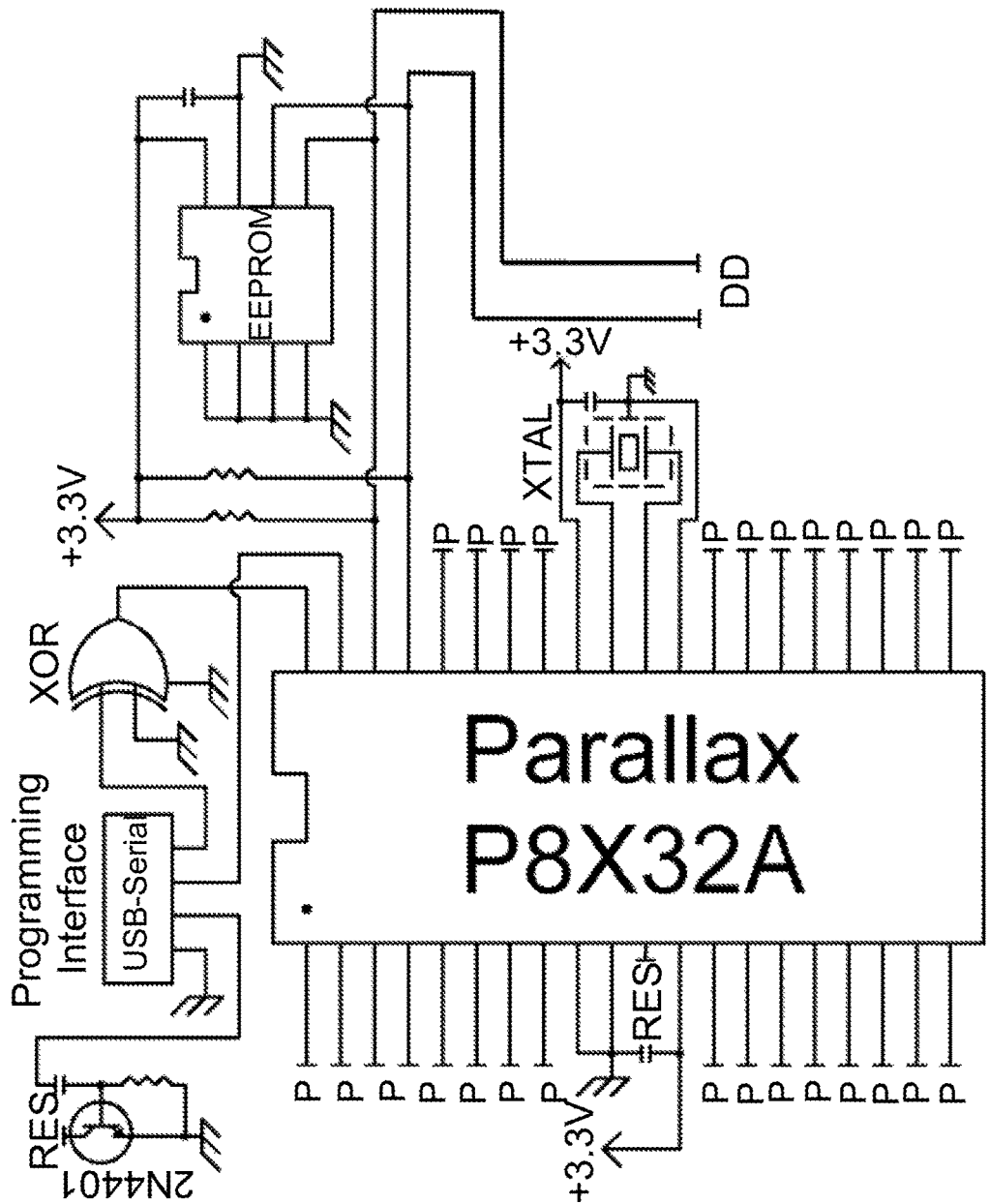
FIGS. 16 through 21 are schematics representing circuitry of a graphical user interface controller in accordance with certain aspects of the invention.
Figure 17:
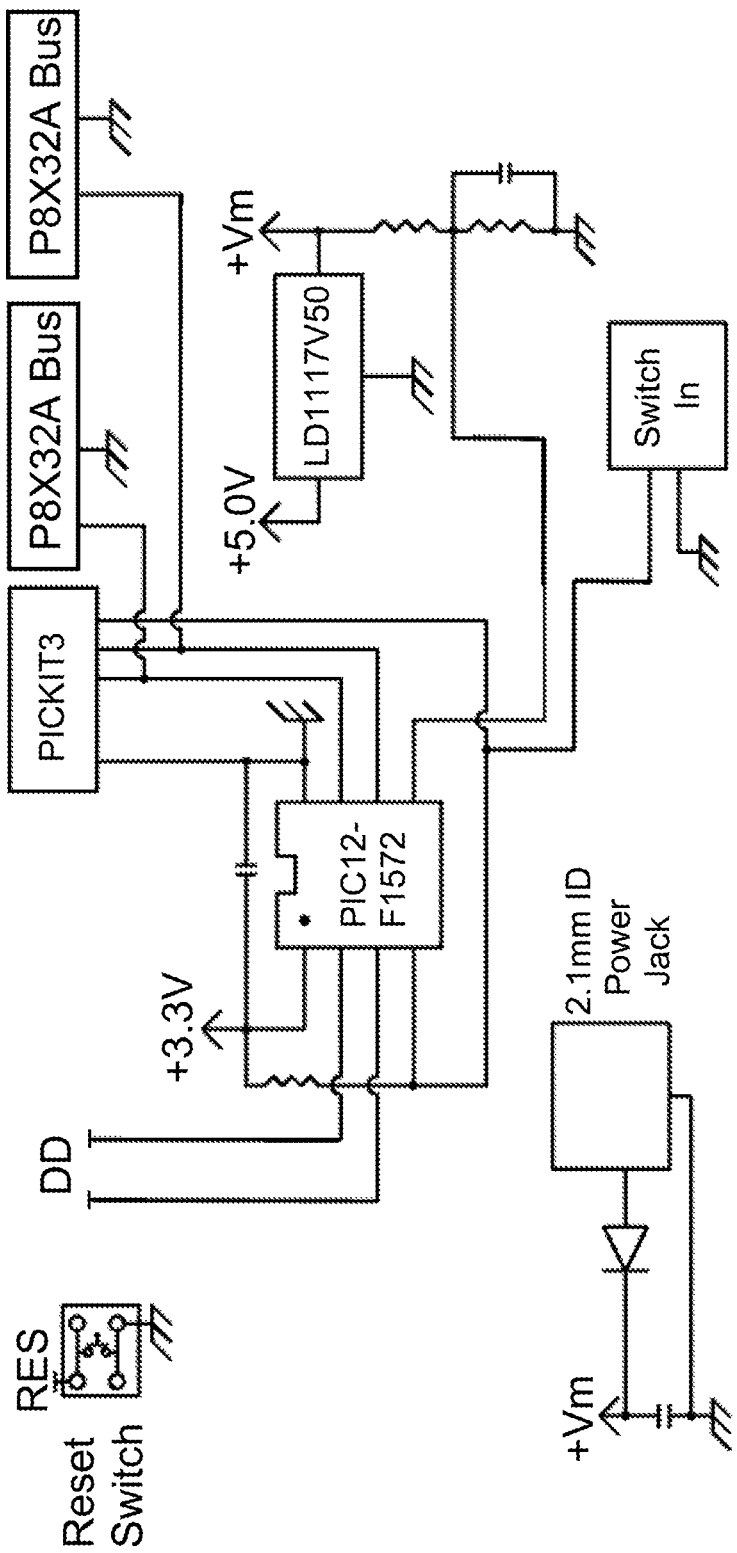
Figure 18:
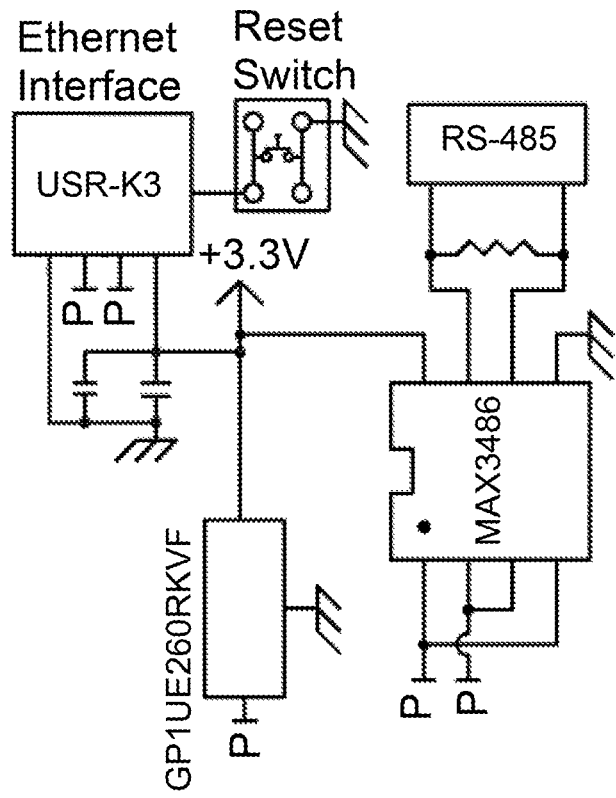
Figure 18:
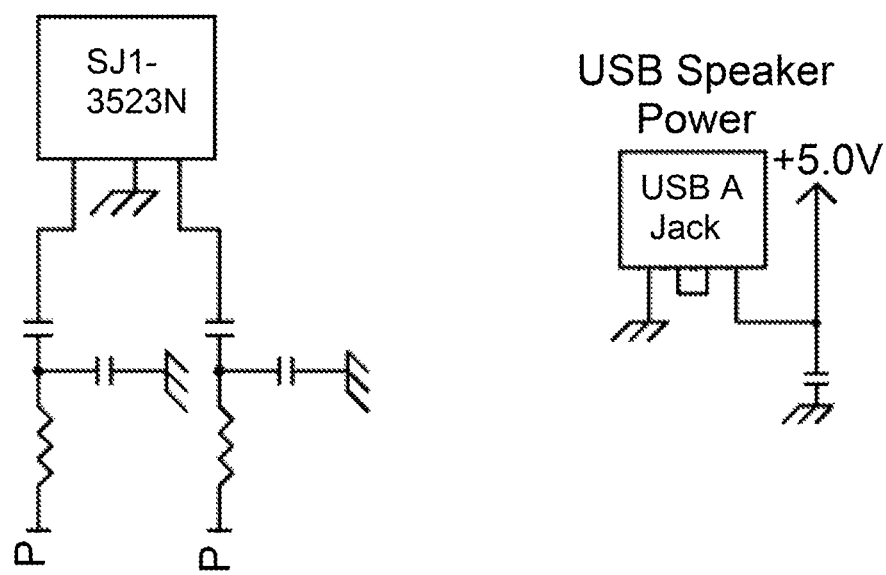
Figure 19:
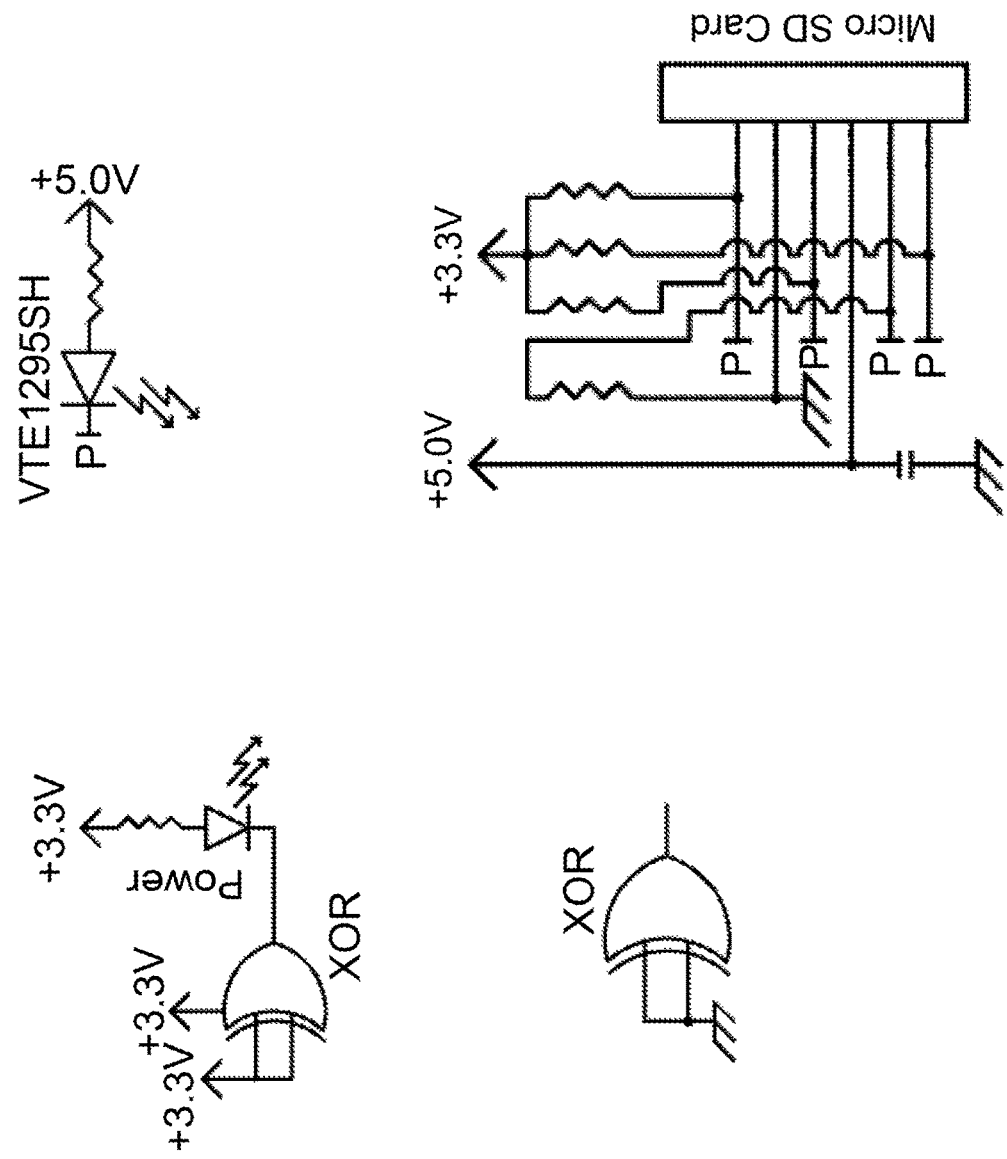
Figure 20:
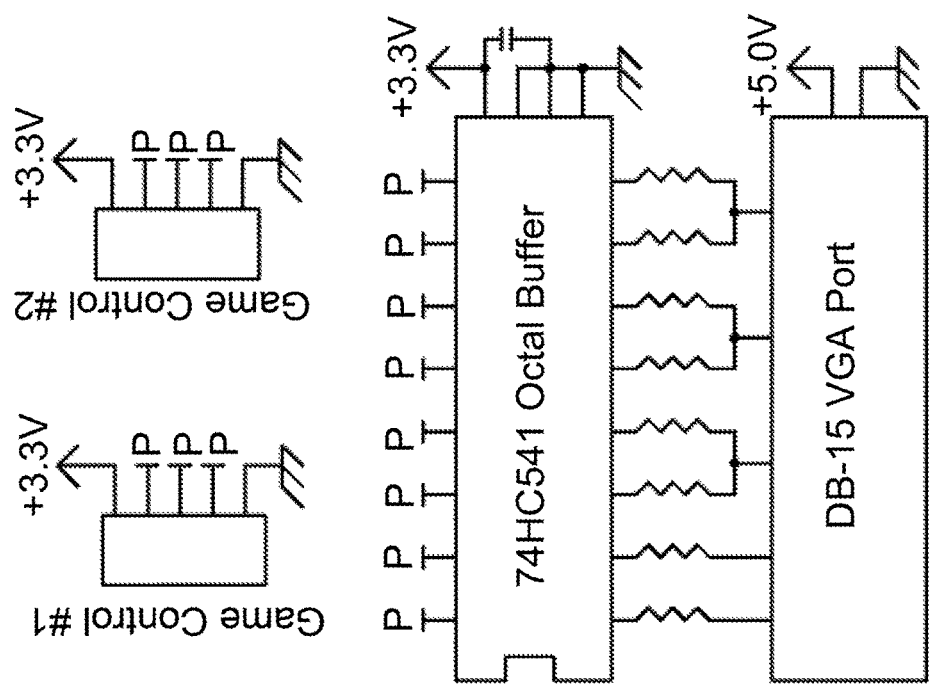
Figure 21:
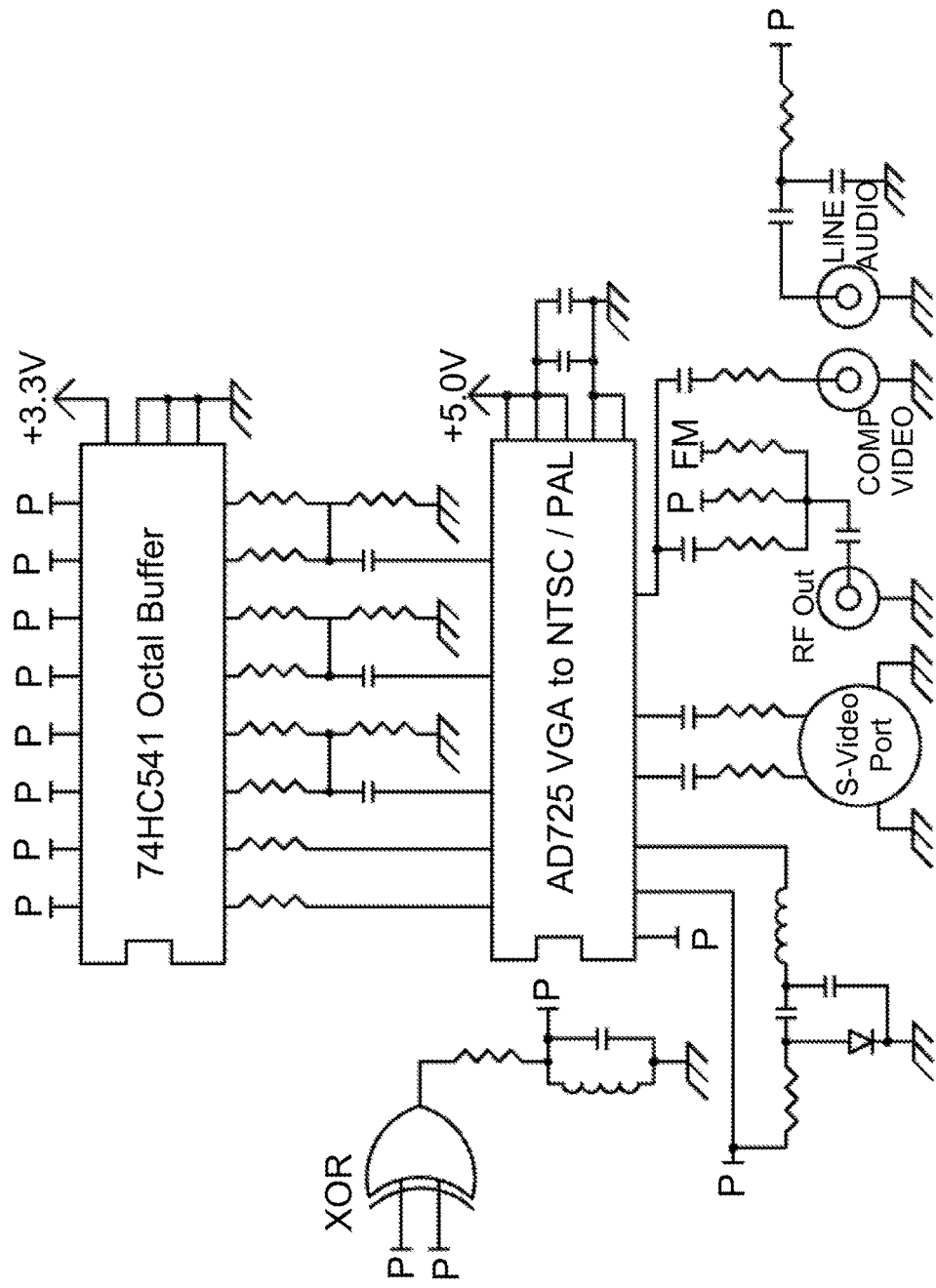
Figure 22:
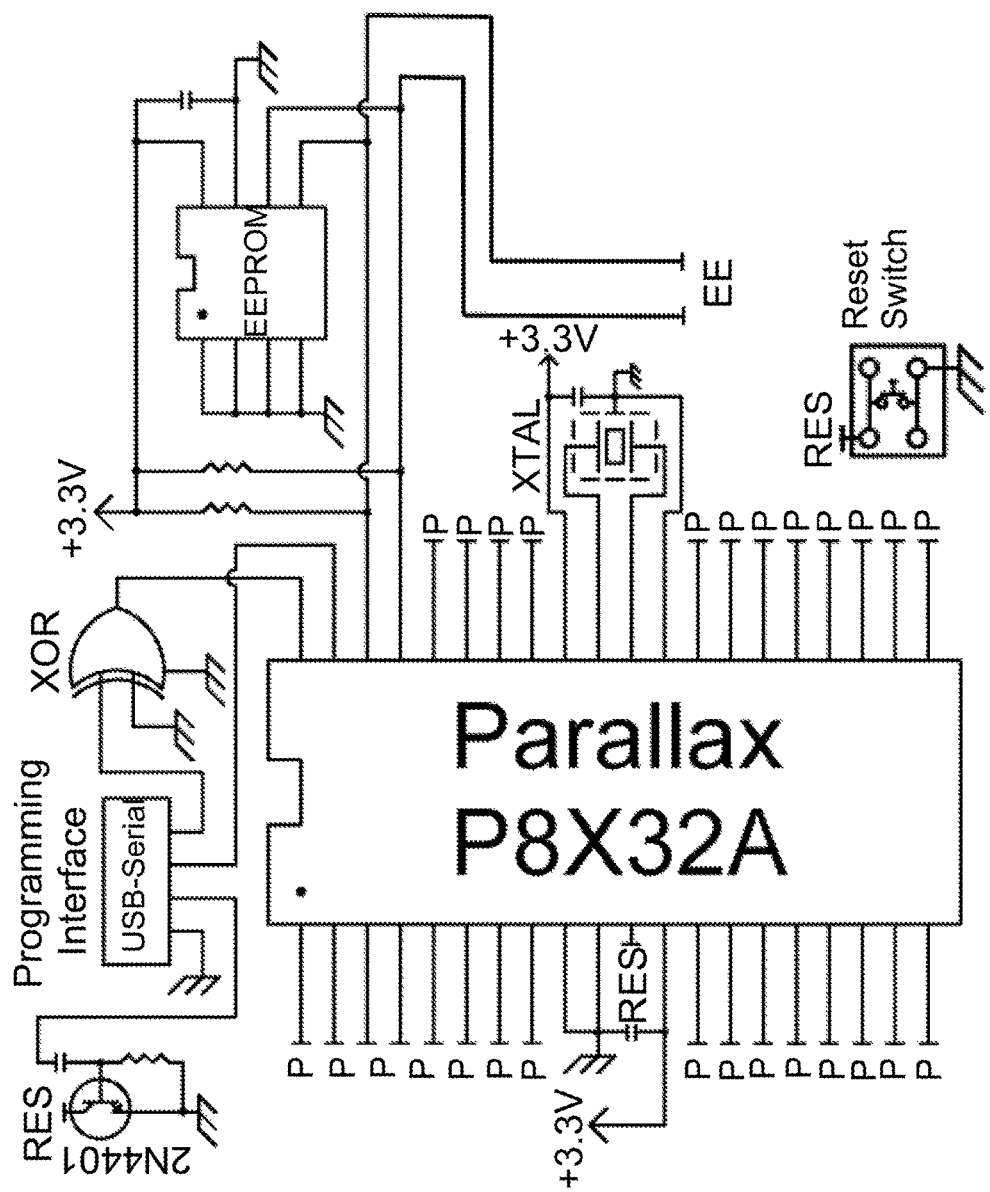
FIGS. 22 through 29 are schematics representing circuitry if an instrumentation and electrical system controller in accordance with certain aspects of the invention.
Figure 23:
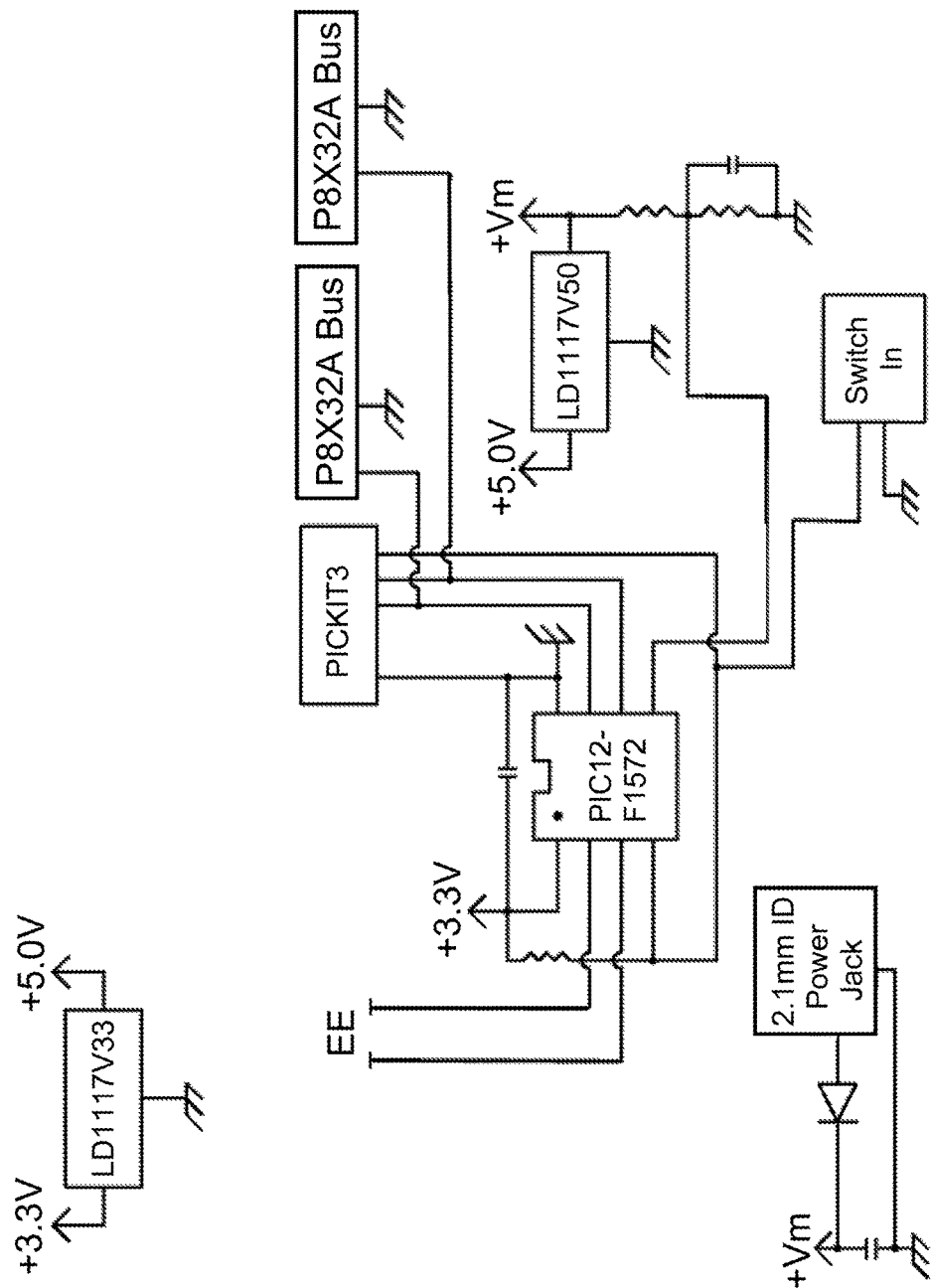
Figure 24:
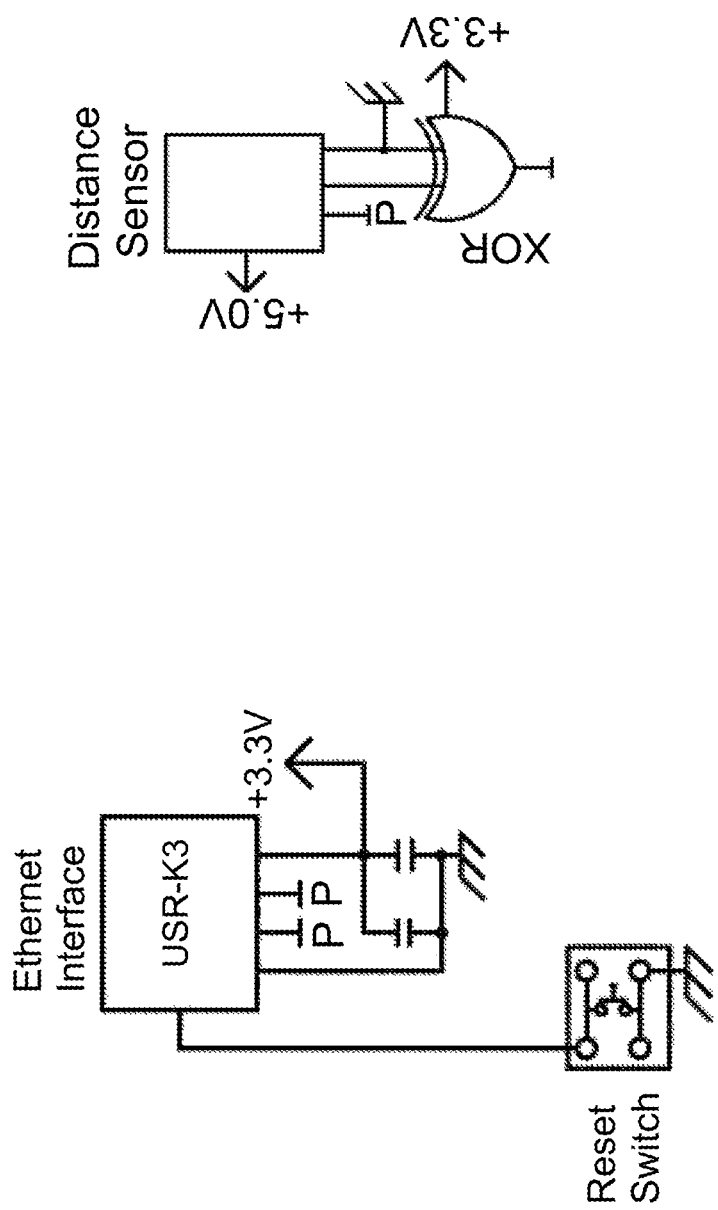

FIGS. 1 through 12 include schematics representing circuitry of nonlimiting five- (FIGS. 1-4), six- (FIGS. 5-8), and eight-axis (FIGS. 9-12) programmable controllers (hereinafter also referred to as robotic controllers), such as may be on printed circuit boards (PCBs; not shown), each individually capable of operating a robotic device, such as the OWI-535 Edge robotic arm. FIGS. 13-15 are schematics representing circuitry of a nonlimiting pendant PCB which may be used for manual control of the robotic device.

The robotic controllers may comprise various components depending on the application. According to certain aspects of the invention, each robotic controller shown in FIGS. 1-12 and pendant circuitry shown in FIGS. 1 and 15 may collectively include means for operating DC motors of a robotic device, means for receiving and sending both wired and wireless transmissions from and to a user device, means for connecting to a remote computer device through the Internet or other network system for remote access of the robotic controller, means for connecting to a pendant device, means for storing data such as user code, audio files, web page files, etc., means for rendering (playing) audio files, means for sending and receiving data to and from the robotic device, means for measuring distance of objects near the robotic controller, means for sensing hand gestures of a user and converting the gestures to instructions for the robotic device, and/or means for displaying data on a display monitor.

Each robotic controller shown in FIGS. 1-12 is preferably suitable for providing means for monitoring and controlling axis position of a robotic device of a mechatronics system using DC motors. Such a DC motor, for example, may be incorporated into the mechatronics system, as with the OWI-535 Edge. Alternatively, it is foreseeable that students may draft their own robotic device using a 3D design program, for example, TinkerCad, three-dimensionally print the drafted mechanical components, and then construct their own individual devices. Such devices may use a readily available gear motor, such as the Dagu DG01D-A130, and the robotic controller for controlling the movements of their individual robotic devices.

FIGS. 1 through 4 represent circuitry of the five-axis robotic controller. In order to control a mechatronics system, the robotic controller comprises a primary multicore microcontroller. As a nonlimiting example, the primary multicore microcontroller (hereinafter, "primary microcontroller") is represented in FIG. 1 as a Parallax Propeller P8X32A microcontroller commercially produced by Parallax, Inc. The primary microcontroller preferably includes an integrated development environment (IDE) for software development, in this instance an open source C compiler called SimpleIDE commercially available from Google, Inc. Preferably, the primary microcontroller and IDE are open source in order to reduce costs involved for classroom and personal use. All connections to and from the primary microcontrollers in FIGS. 1-47 are labeled with "P." Other various connections are labeled with double letters (e.g., AA, BB, CC, etc.).

Programming of the primary microcontroller may be accomplished by any means known in the art. Preferably, programming instructions may be inputted from an external device via an Ethernet interface on the robotic controller, wirelessly via a Bluetooth wireless module (not shown) on the robotic controller, through an onboard programming interface, or any other known means. According to one nonlimiting aspect of the invention, the five-axis robotic controller represented in FIG. 1 includes a USB to RS-232 (serial) adapter with a data terminal ready (DTR) line as the reset control that can be used for programming the primary microcontroller. In this instance, the DTR line is shown in FIG. 1 as connected to one side of a 0.1 µF capacitor with the other side of the capacitor connected to one side of a 9.1 KΩ resistor, and the other side of the resistor connected to ground. The junction of the capacitor and resistor is connected to the base of a bipolar negative positive negative (NPN) transistor (e.g., a 2N4401), and its emitter is connected to ground and its collector to the reset line of the primary microcontroller to complete the programming reset circuit. An exclusive OR (XOR) gate is shown in FIG. 1 following the USB to RS-232 (serial) adapter as a logic translator to reduce the likelihood that the signal levels from an external programmer module (not shown) will damage the robotic controller, for example, if the programmer module is not set to the correct volt logic output, in this instance, 3.3V.

Internal memory of the primary microcontroller may be preprogrammed by the manufacturer with various services such as secure digital (SD) card interfacing and access. Data such as user code may be stored externally from the primary microcontroller in onboard auxiliary memory such as an electrically erasable read-only memory (EEPROM; e.g., 24LC1026) shown in FIG. 1. The auxiliary memory of the robotic controller is shown in FIG. 1 as connected to the primary microcontroller via an Inter-IC Bus (I2C or I1C) having one 9.1 KΩ, pull up resistor per line. This bus is preferably active at power up for loading the user code into program random access memory (RAM) inside the primary microcontroller. If the user desires to write code in excess of the capacity limit of the onboard memory, then the primary microcontroller can be redirected to use an axillary internal or external memory, such as a SD card configured to communicate with the microSD card interface of FIG. 2. The axillary memory (e.g., SD card) can also be used to store, for example, audio files (e.g., waveform audio file format (WAV)) for audio narration of class projects or playing music, and to store code for website rendering (e.g., HTML or CSS).

Preferably, a user interface is provided that is not platform dependent. For example, FIG. 2 includes an RS-232 to Ethernet interface (e.g., USR-K3 module) for handling the primary microcontroller RS-232 bus to Ethernet interface. In this example, the USR-K3 module adds a TCP/IP header to received serial data from the primary microcontroller before sending it over the Internet to a user's computer. As such, the operating system of the user's computer is of no consideration since control is handled using a web browser on the user's computer. When data is sent from the web browser (user input) to the USR-K3 module, it removes the incoming TCP/IP header before transferring the data to the primary microcontroller via the RS-232 interface. Programming of the USR-K3 module may be accomplished by any means known in the art. If the P8X32A primary microcontroller is used as the primary microcontroller, the TCP/IP packet size is preferably limited to 1 KB or less as the P8X32A has only 2 KB of memory per core.

Figure 2:
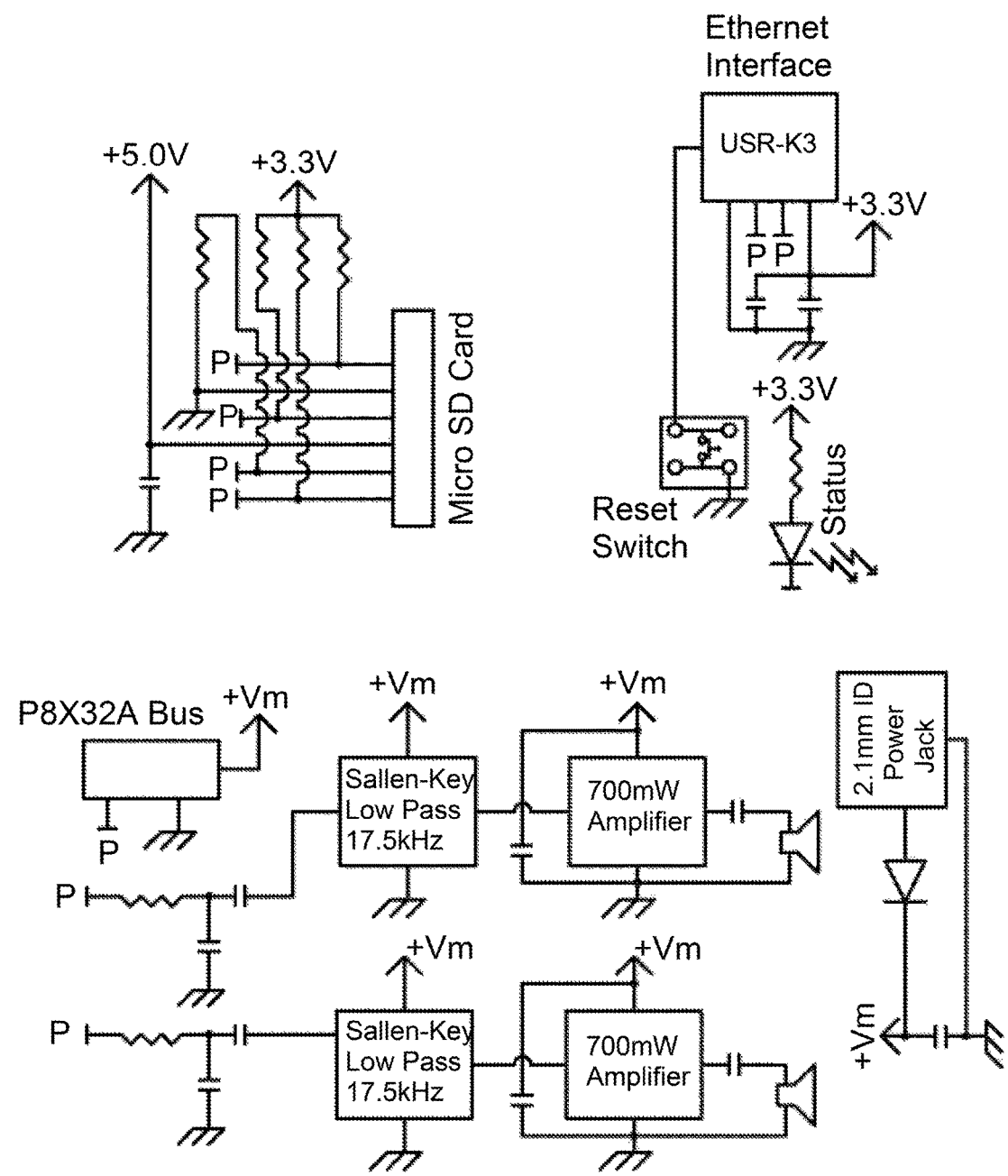

In the nonlimiting embodiment represented FIG. 2, the SD card interface preferably includes four lines including one line for master input/slave output (MISO), one line for master output/slave input (MOSI), one line for the synchronization clock (SCLK), and one line for chip select (CS) using the serial peripheral interface. The SD card interface may operate with a SD card, for example, that uses file allocation table 16 bit (FAT16) formatting prior to being used for file storage and retrieval. Use of a SD card shield may simplify and reduce the cost of the interface. In addition, a Bluetooth wireless module (not shown) may be provided that allows user programming from a control device, cell phone, tablet, or other wireless device.

Figure 3:
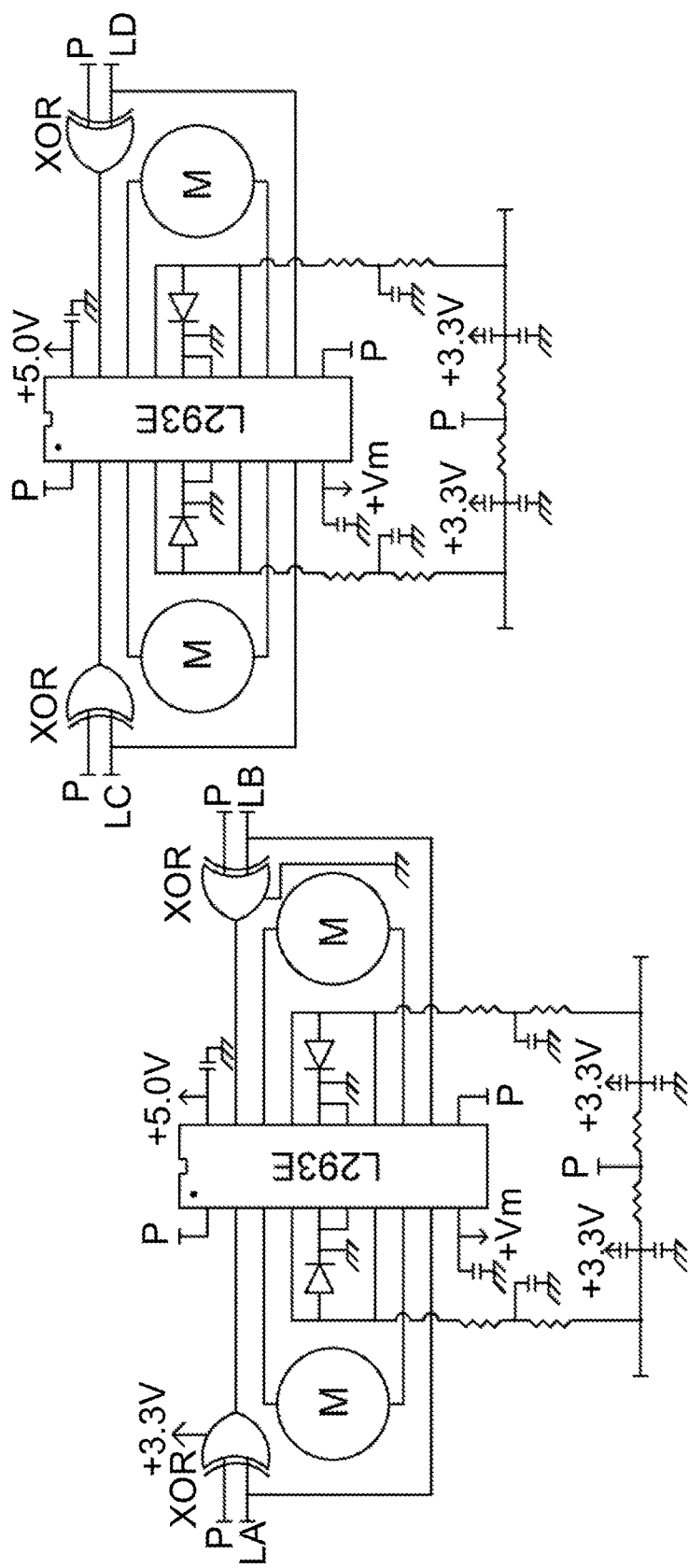
Figure 4:
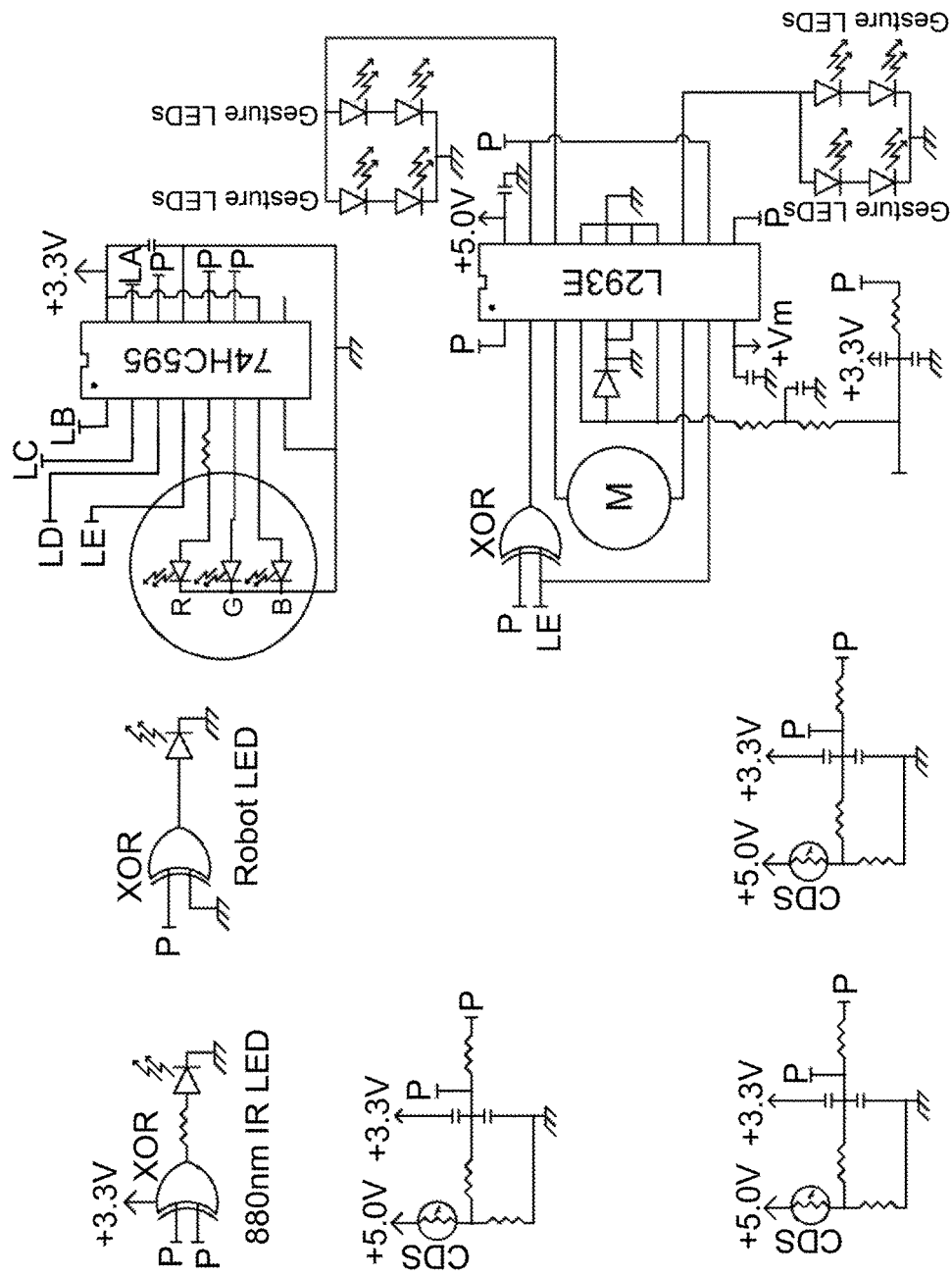

Outputs from the primary microcontroller may be too weak to drive a motor, for example, the P8X32A microcontroller can only drive 40 mA maximum. In order to drive pairs of motors (M) represented in FIG. 3, a quad half H bridge motor drive device (e.g., L293E driver), may be used for each pair of motors as shown in FIG. 3. In FIGS. 3 and 4, three motor drive devices (each comprising an L293E driver) are provided onboard to provide drive current of 1 A per motor for each of five to eight motors. An exclusive OR (XOR) gate is shown in FIGS. 3 and 4 as connected to each motor drive device to permit a single microcontroller output line to provide motor direction control while the XOR gate permits similarly scaled speed control in either direction by inverting the pulse width modulated (PWM) signal when in the reverse direction or buffering when in the forward direction.

Preferably, each motor drive device is capable of current sensing while the motor is in operation. The current sensing line of each motor drive device is shown in FIGS. 3 and 4 as connected to ground through a diode (e.g., a 1N4001). This diode both helps to clean up the motor current switching signal of the commutator and brushes as well as provides a low end cutoff voltage for monitoring the commutator switching. This monitoring may be accomplished using a sigma-delta circuit as shown in FIGS. 3 and 4 as an adjustable voltage divider to provide a comparison voltage of the diode forward voltage. Sigma-Delta analog to digital conversion uses a pulse width modulated (PWM) output from the primary microcontroller to produce a voltage output to be summed with the incoming analog voltage. For example, when the incoming analog voltage is 0V, then the PWM output can be 100% (value of 1000) for 3.3V at the output pin. There is a voltage divider circuit of two equal value resistors. A first end of each of the resistors is connected to the PWM output of the primary microcontroller and the opposite end of each of the resistors is connected to the incoming analog voltage. The point where these two resistors meet is connected to a microcontroller input. When the voltage on the input pin is at 1.65V or more, the input is read as high level. When the voltage on the input pin is below 1.65V, the input is read as low level. This provides for bringing the PWM level to a point when summed with the incoming analog voltage that it will cause the input to become high level. The diode forward voltage is preferably only present when the brush and commutator tab are connected. The duration of the diode conduction time may be monitored for measuring motor stress and current flow. When the duration becomes longer, then either the motor is under stress or the batteries are degrading.

As represented in FIG. 4, the output pulses from the motor drive devices may be fed into the respective inputs of a parallel in/serial out shift register (e.g., 74HC595). Those pulses from the motor may come in at a rate of 408 pulses per second (HZ). The shift register latching signal may be set at 1000 µS or 1000 HZ, allowing for a minimum of two samples per pulse from the motor. This is also known as the Nyquist limit wherein the sampling frequency is at least twice the maximum incoming signal frequency for monitoring of switching states.

If the robotic controller includes onboard audio capabilities, as represented in FIG. 2, audio rendering from audio files (e.g., WAV) may be performed using PWM. The PWM output may be filtered through two low-pass and two high-pass RC filters before entering an audio amplifier device (e.g., an LM386N-3) as shown in FIG. 2. Use of the high-pass filter is primarily for DC blocking of the audio signal. The low-pass filter helps eliminate the high frequencies (more than 15 KHZ) caused by the high sampling rate when rendering the sound files. Preferably, the audio amplifier device is at least capable of 700 mW audio output power into an 8Ω speaker continuously. Preferably, the amplifier device is also capable of operating from low voltage and has little distortion.

The robotic controller preferably includes means for coupling to a power source, for example, FIG. 2 represents the circuitry as including a 2.1 mm ID power jack interface configured to mate with a 7.5V at 2.4 A direct current (DC) wall power supply. The power source preferably provides suitable power based on the minimum incoming voltage requirements of the 5.0V regulator. The 5.0V regulator may supply power to the H bridge motor drive devices as well as the 3.3V regulators used by the primary microcontroller and Ethernet interface. A heatsink may be placed on the 5.0V regulator as it has a relatively high voltage drop across it, causing significant power dissipation. The H bridge motor drive devices may be connected to the mechatronics system (e.g., the OWI-535 Edge robotic arm) using two 16-pin dual-row rectangular connectors and a ribbon cable of about 1.5 m length between the robotic controller and the robotic device. Alternatively, or if the robotic device uses less than all of the available motor drive outputs, the remaining motor drive outputs may be connected to screw terminals on the robotic controller PCB for user access.

The five-axis robotic controller in FIGS. 1-4 is capable of sensing hand gestures performed by a user as input commands. Alternatively, such gesture sensing circuitry could be included on a pendant device coupled to the robotic controller. Gesture sensing may be accomplished using multiple photoresistors or light-dependent resistors (LDRs) (e.g., three cadmium sulfide (CDS) photocells; label "CDS"), optionally a light source (e.g., an LED; represented in FIG. 4 as eight LEDs labeled "Gesture LEDs" and an RGB LED labeled "D9" including "RED," "GREEN," and "BLUE"), two resistors, and two capacitors. The photoresistors decrease in resistance as the light intensity increases, and increase in resistance as the light intensity decreases. Each photoresistor causes a change in divider output voltage depending on the intensity of light on its surface.

According to the nonlimiting embodiment of the robotic controller represented in FIGS. 1-4, FIG. 4 represents one end of a 91 KΩ resistor is connected to ground and the other end connected to one side of a CDS photocell. The junction of the CDS photocell and resistor has one side of two different 1000 pF capacitors connected to it via a 91 KΩ resistor. The opposite end of one of the two capacitors is connected to the +3.3V supply and the opposite end of the other of the two capacitors is connected to ground. This junction is then connected to one of the primary microcontroller inputs to permit detection of the voltage divider output rising to 1.65V, thus triggering the input (making it high level at 1.65V and above or low level when below 1.65V). The open end of the CDS photocell is connected to a pulse width modulation output (PWM) pin of the primary microcontroller to allow the voltage supplied to the voltage divider circuit to be varied using the C programming code for this device.

In the embodiment of FIGS. 1-4, using a PWM clock period of 1000 uS and 1 uS per increment allows for 1000 increments of PWM average output voltage from 0 to 3.3V (maximum as this is the microcontroller supply voltage). The CDS photocell has a minimum resistance of 10 KΩ when fully saturated with light and is in series with a 91 KΩ resistor for a total resistance of 101 KΩ. The 91 KΩ resistor requires a 1.65V drop across it to trigger the microcontroller input. Thus, 1.65V divided by 91 KΩ results in a current flow of 18 ΩA. The PWM output voltage is determined by multiplying the current flow (18 μA) by the total series resistance (101 KΩ) resulting in 1.83V. Dividing the 1.83V by the 3.3V supplied to the primary microcontroller provides the PWM duty of 0.555 or 55.5%. Since the PWM is scaled to a maximum of 1000 in increments of 1 uS, the 0.555 duty is multiplied by 1000 resulting in a PWM integer value of 555 used in the code. In this example, this is the minimum PWM integer value that can be used to trigger the input when light fully saturates the CDS photocell surface.

In contrast, when the CDS photocell has no light radiating it, a resistance of about 91 KΩ occurs. Then the voltage divider has the 91 KΩ from the CDS photocell in series with the 91 KΩ resistor, resulting in 182 KΩ total resistance of the voltage divider circuit. Since the two resistors are equal, an equal voltage drop will be produced by each, and since the microcontroller input needs 1.65 volts to trigger it (making it high level), that trigger voltage is doubled resulting in 3.3V required across the voltage divider circuit. Dividing the 3.3V needed from the PWM output by the 3.3V microcontroller supply voltage results in a value of one, that is, 100%. Multiplying one by 1000 means the PWM code value is 1000 providing 100% duty output. Therefore, in this instance, the PWM values for detecting the intensity of light on the CDS photocell range from 555 (maximum intensity) to 1000 (minimum intensity). The robotic controller of FIGS. 1-4 includes three CDS photocells for gesture sensing that are preferably arranged in 90 degree intervals along a 2.2 inch radius. In this instance, only three quadrants are used because the wrist and arm of the operator are preferably constantly over the fourth quadrant while providing gestures for the robotic controller to detect.

A light source (e.g., an LED) on the robotic controller preferably provides a sufficiently bright light source to reflect off of the human hand. This reflection of light may add more light than is ordinarily available in a room, causing a noticeable change in voltage from the voltage divider circuits. This voltage change may then be detected by the primary microcontroller and allow for compensating variations in lighting levels of the room. Each photoresistor may be monitored independently one at a time. Using Sigma-Delta for monitoring the photoresistors also allows for defining several levels of user hand position. As such, an array of photoresistors may be coupled to the circuitry to permit position detection of the human hand, wherein more light intensity indicates that a hand is present and less intensity indicates that a hand is not present.

The light source (e.g., LEDs) is preferably under PWM control, allowing its intensity to be adjusted under user code for the device. Control of the light source intensity allows approximation of the human hand above the robotic controller surface whereas photoresistor presence or absence detection of the human hand allows approximation for the direction of movement. The light source intensity can be controlled using PWM values between 300 (minimum intensity) to 1000 (maximum intensity). Using the photoresistor saturation level and the light source specified intensity results in a three-dimensional means for detecting the hand position in respect to the robotic controller.

FIG. 4 represents the robotic controller as comprising nine LEDs for gesture sensing. Preferably in this instance, eight relatively bright white LEDs (labeled as "Gesture LEDs") are located in a circular array with a lower intensity RGB LED (labeled "D9" including "RED," "GREEN," and "BLUE") located in the center of the other eight LEDs. Due in part to its relatively lower intensity, the RGB LED provides both lighting effects as well as a low intensity source and the ability for detection of the human hand. For example, if a human hand is detected with the low intensity RGB LED, this could be used to trigger the much brighter white LEDs. Removing the human hand may cause a drastic change in light level over the photoresistors, triggering the primary microcontroller to turn off the eight brighter LEDs, thereby providing a means of eye protection for the user and energy conservation when their hand is not covering the LED array. The RGB LED includes Red, Green, and Blue LEDs coupled to and operated by three outputs of a serial in/parallel out shift register with latch (e.g., 74HC595). The remaining five outputs of the serial in/parallel out shift register are used for axis motor direction control.

FIGS. 5 through 8 are schematics representing circuitry of the six-axis robotic controller. The robotic controller includes a primary microcontroller, programming interface, auxiliary memory, power jack interface, microSD card interface, and three motor drive devices which are substantially the same as described with respect to the five-axis robotic controller of FIGS. 1 through 4. In addition, the six-axis robotic controller includes a USB interface (e.g., USB A Jack) for providing power for an external USB amplified speaker.

One or more bus interfaces (in this instance, P8X32A bus interfaces) may be provided to allow for multiple PCBs to be chained together and used in combination. Although direct interfacing of the I2C bus with other P8X32A microcontrollers may be performed (FIG. 1), investigations leading to the present invention determined that this did not provide as reliable operation as alternative methods as the load on the I/O line prevented initial code loading when the device powered up. Google SimpleIDE does not currently permit buffering of the RS-232 data, which further added to the issue. Therefore, the six-axis robotic controller includes two P8X32A bus interfaces and an auxiliary microcontroller (e.g., PIC12F1572) on the I2C bus for I2C interfacing and providing the RS-232 communication for interfacing with other devices. The one remaining I/O line available on the auxiliary microcontroller is implemented for switch contact closure detection as desired by the end user. Alternatively, the I/O lines from the auxiliary microcontroller could be used for other interfaces such as, but not limited to, a BlueTooth wireless interface.

Figure 5:
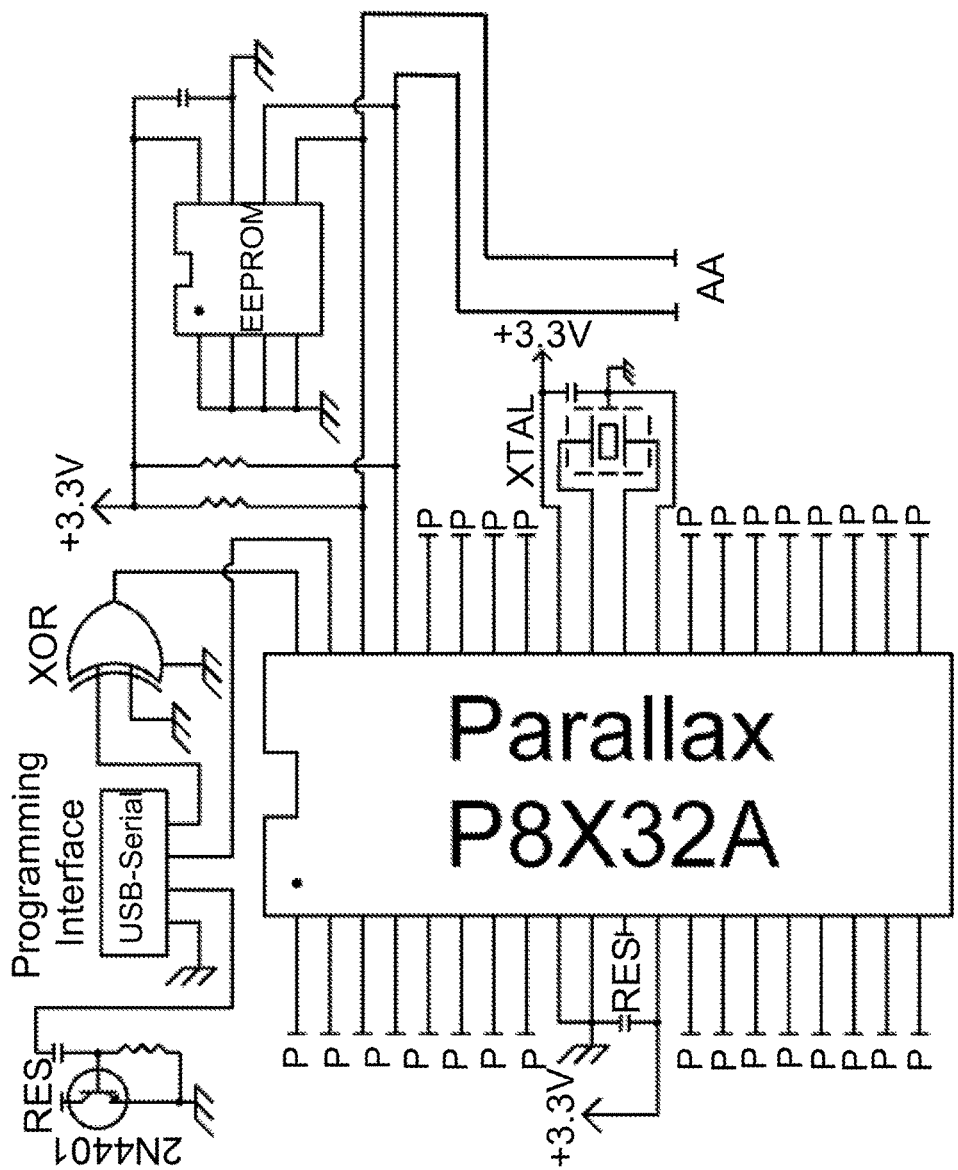
FIGS. 5 through 8 are schematics representing circuitry of a printed circuit board (PCB) for a six-axis programmable controller adapted to operate a robotic device in accordance with certain aspects of the invention.
Figure 6:
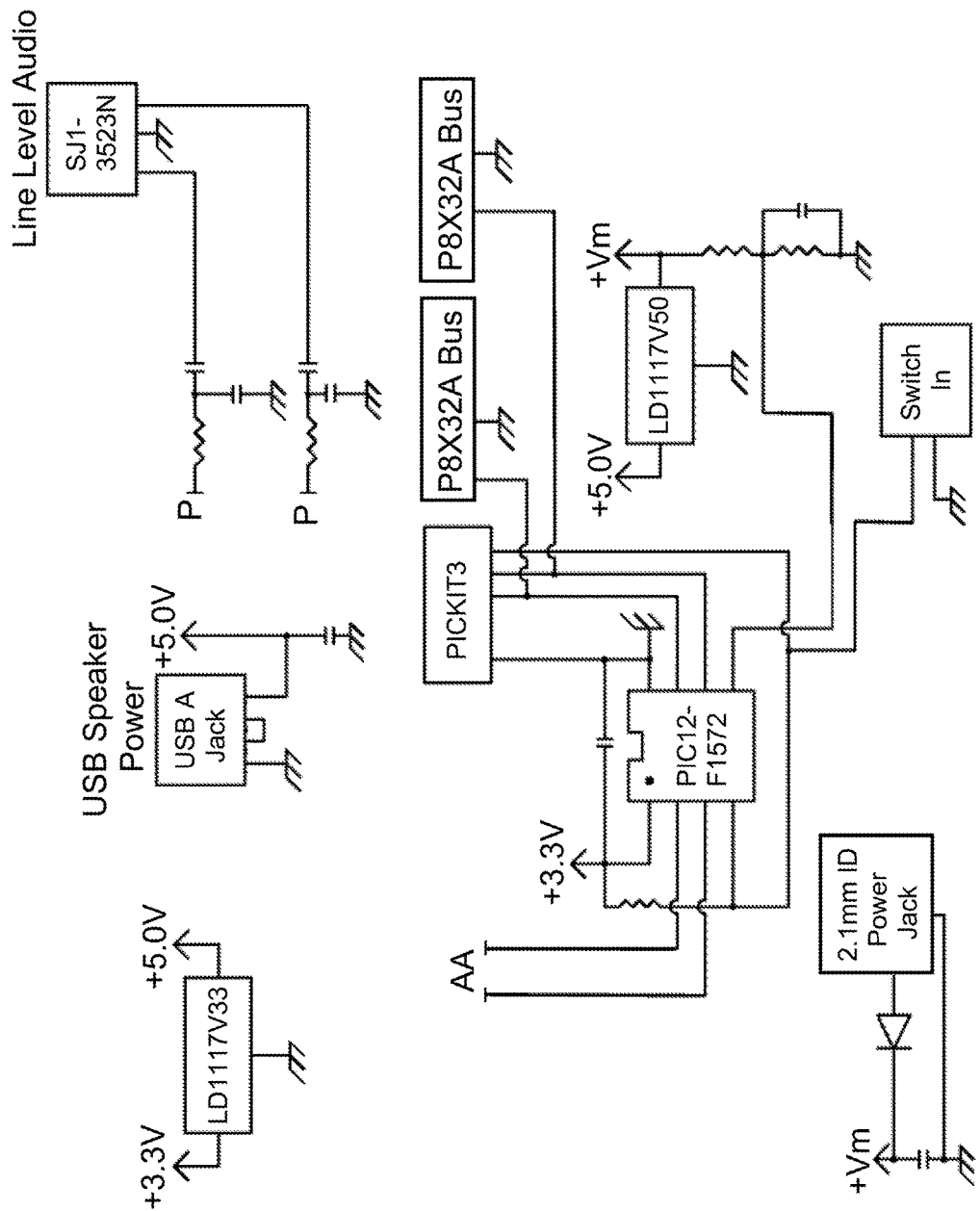
Figure 7:
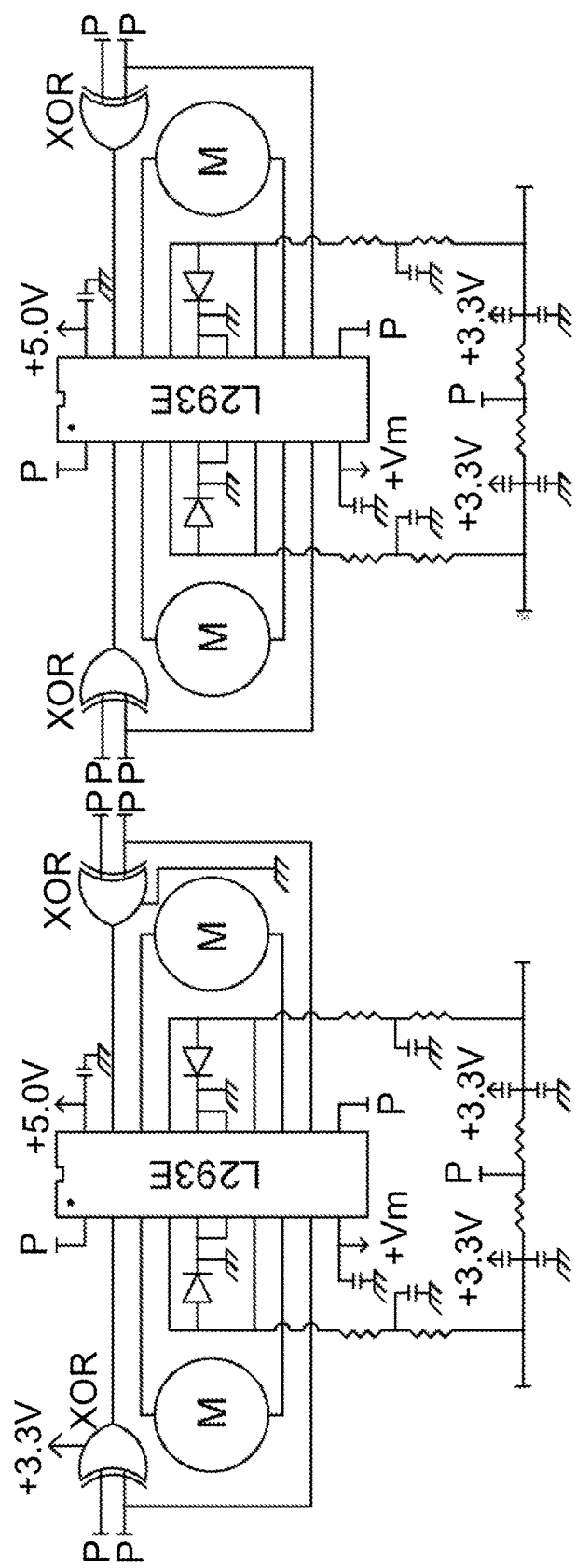
Figure 8:
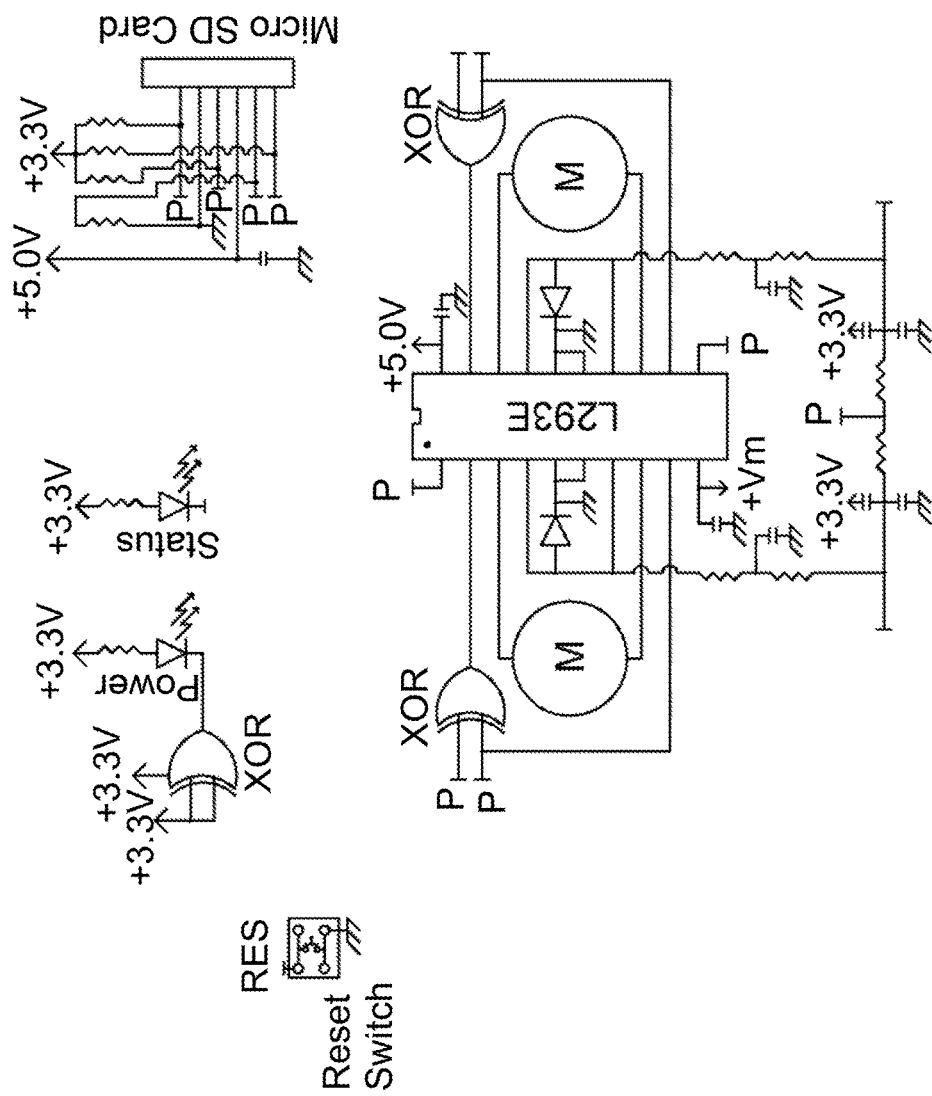
Figure 9:
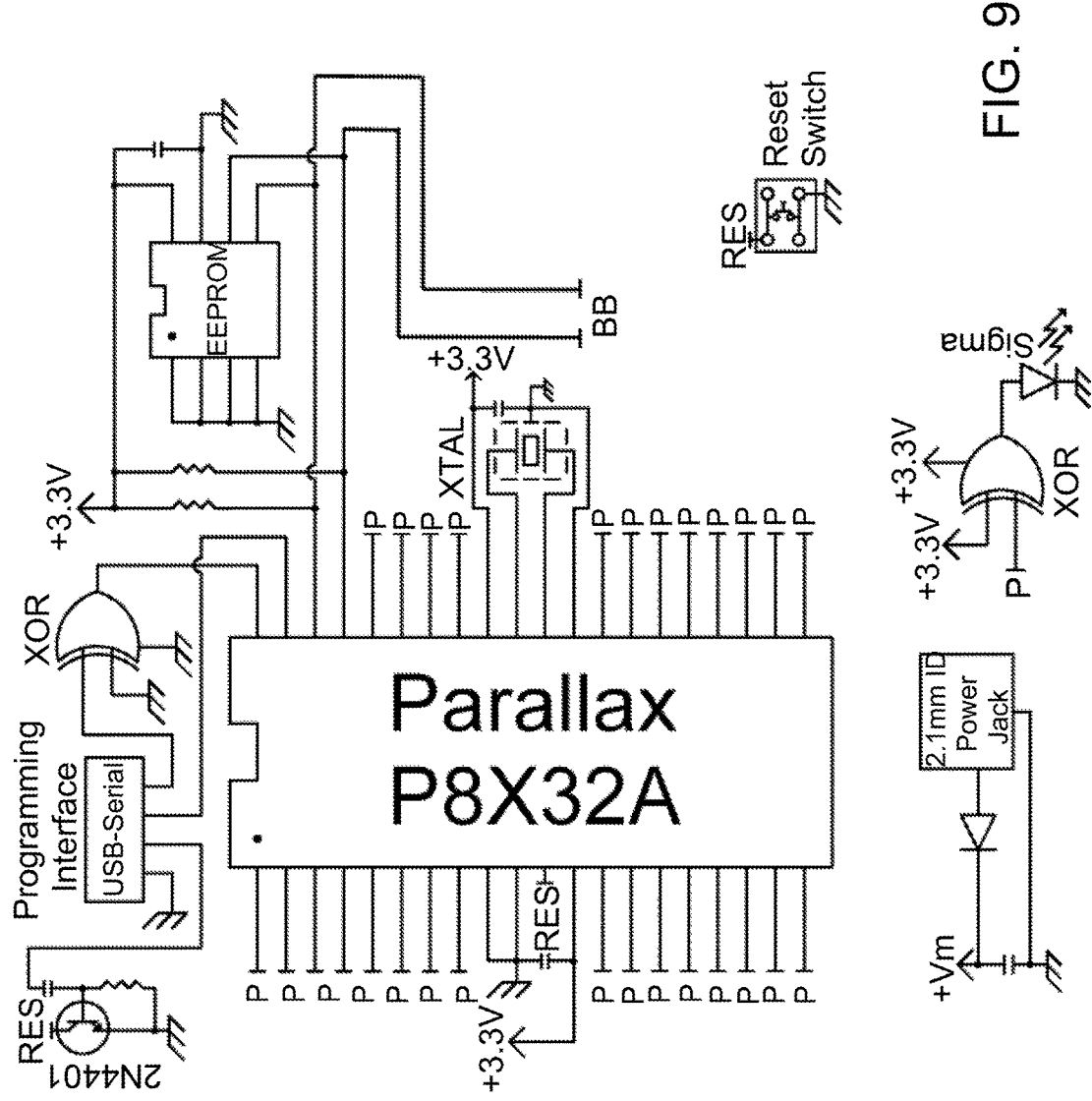
FIGS. 9 through 12 are schematics representing circuitry of a printed circuit board (PCB) for an eight-axis programmable controller adapted to operate a robotic device in accordance with certain aspects of the invention.
Figure 10:
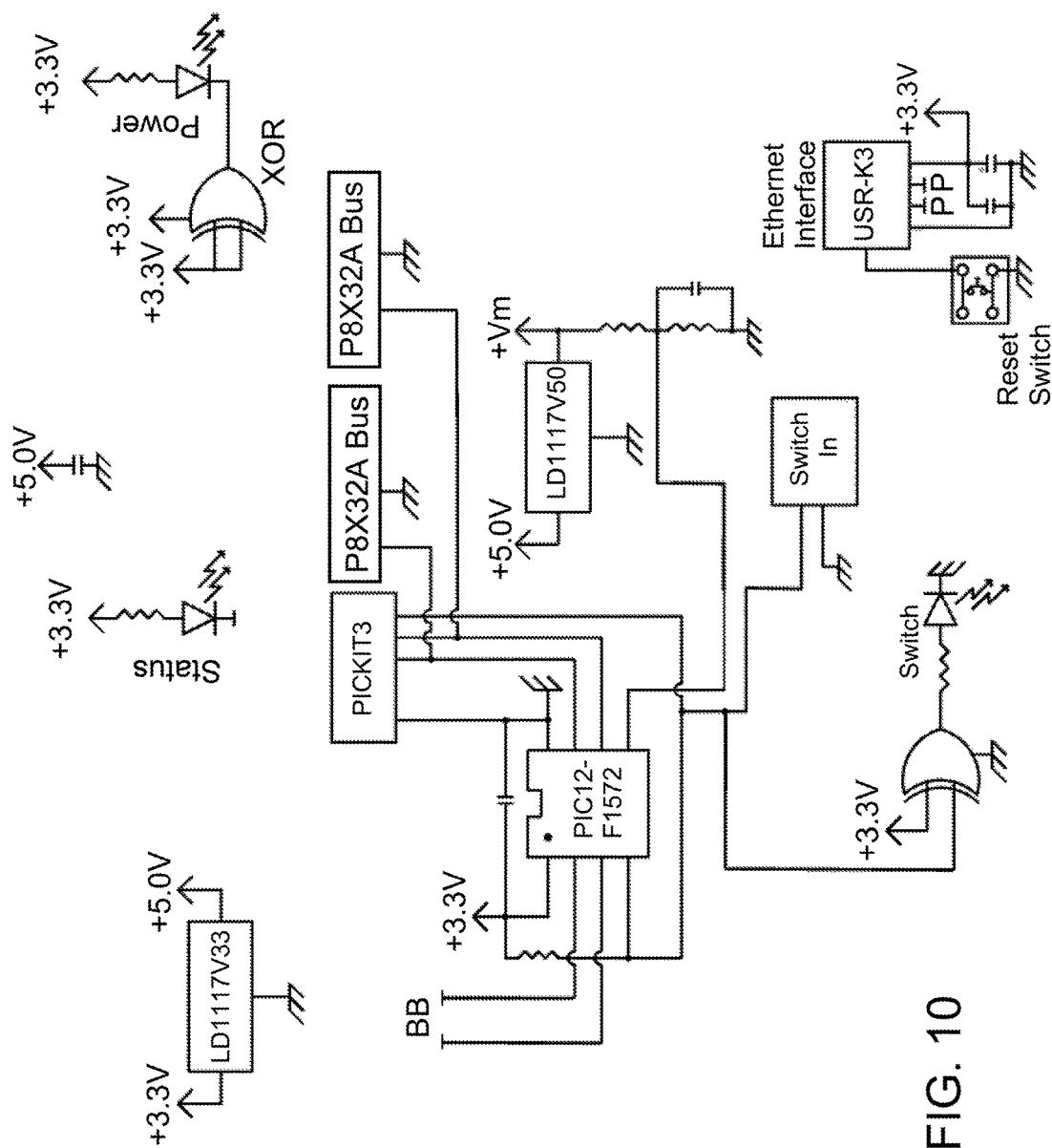
Figure 11:
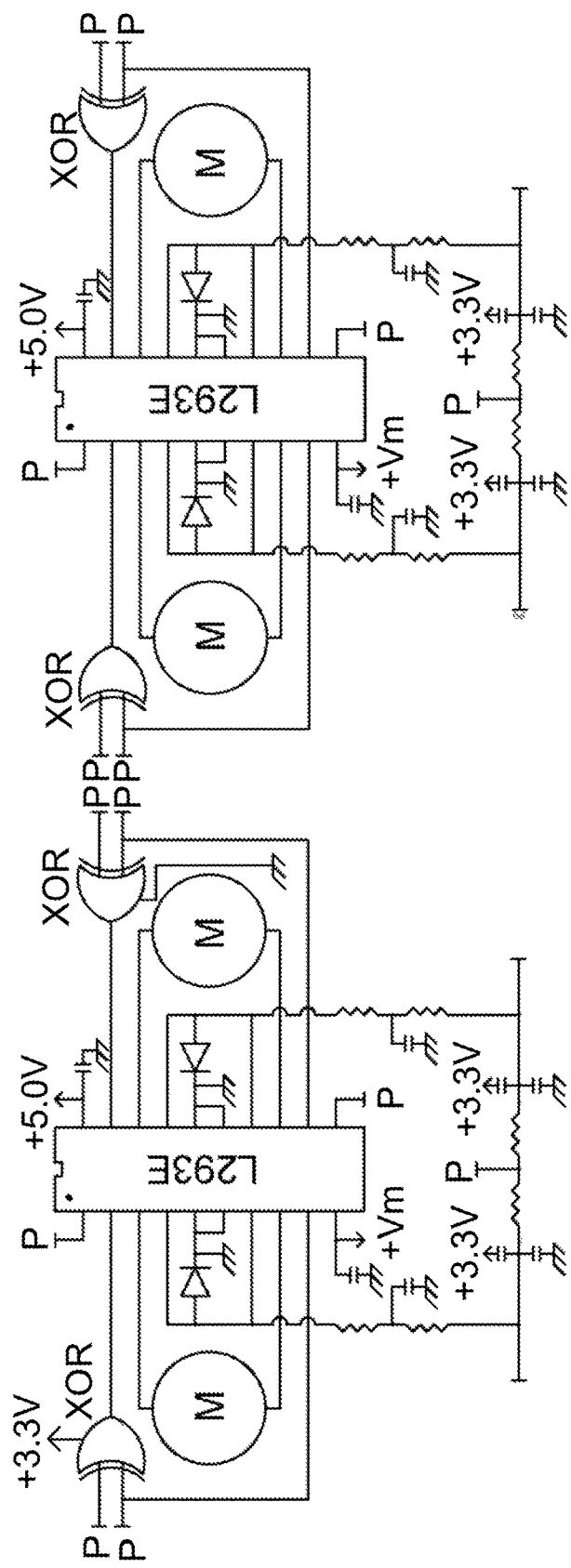
Figure 12:
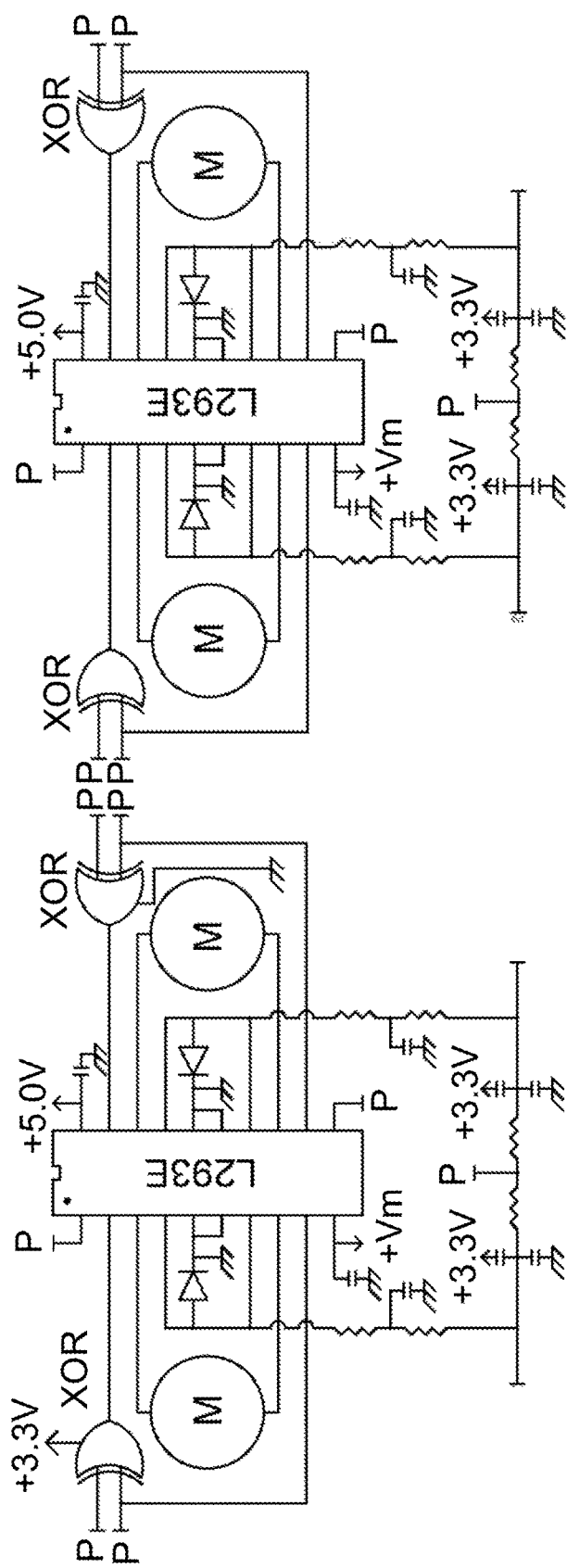

A pendant interface, such as a 3.5 mm stereo jack connection, is provided on the six-axis robotic controller of FIGS. 5 through 8 for connection of an external sensor or interface board, such as a pendant comprising the circuitry of FIGS. 5 and 6. In this example, the battery positive and negative leads may be brought out to two of the three pins of the 3.5 mm stereo jack and the third pin may be the bidirectional serial data pin for communication with another microcontroller.

FIGS. 9 through 12 are schematics representing circuitry of the eight-axis robotic controller. The robotic controller includes a primary microcontroller, programming interface, auxiliary memory, auxiliary microcontroller, bus interfaces, power jack interface, ethernet interface, and four motor drive devices, which are substantially the same as described with respect to the five- and six-axis robotic controllers of FIGS. 1 through 8.

Depending on the robotic device used, an adapter PCB may be necessary. In addition, a pendant PCB may be provided to provide additional functionality to the corresponding programmable controller, in this instance the robotic controller. FIGS. 14 through 15 are schematics representing circuitry of a nonlimiting pendant comprising a microcontroller, programming interface, auxiliary memory, and auxiliary microcontroller which are substantially the same as described with respect to the programmable (robotic) controllers of FIGS. 1 through 12. The pendant further includes a VGA video output, a radio-frequency identification (RFID) card reader interface, a distance sensor interface, and sixteen touch switches. In this example, the VGA video output provides the synchronization signals, 5.0V supply, and RGB video color signals.

The RFID card reader interface has a 5.0V logic level RS-232 output followed by a XOR gate for logic translation, and is capable of coupling to an external device for reading RFID chips, for example, in for users to scan RFID badges to simulate access or entry control features. The distance sensor interface may be used for multiple applications, such as but not limited to, detection of a person standing in front of the pendant PCB, proximity detection of an object being moved by a robotic device, or to monitor the axis speed (change in distance divided by the change in time) of a robotic device. Both the RFID card reader interface and the distance sensor interface include a XOR gate for interfacing with their respective external devices, which may have a higher volt logic output.

Use of the touch switches may be an option provided by the primary microcontroller of the pendant PCB, allowing for bare pads on the PCB to be used as switches bridged by the human finger. Although not required, exposing a copper layer at the switching points would likely be less costly than installing tactile switches both in material cost and labor cost. In this instance, there is no more than 50 μA current flow from any touch pad on the pendant PCB. The pendant PCB can be used with any of the circuitries represented in FIGS. 1-12, as well as circuitries described hereinafter in reference to FIGS. 16-29.

FIGS. 16 through 21 are schematics representing circuitry of a nonlimiting programmable controller configured as a graphical user interface (GUI) controller that is capable of being used as a standalone user programmable gaming system, or in combination with one or more other controllers, such as those represented in FIGS. 1-12 and 22-29. The GUI controller includes a primary microcontroller, programming interface, auxiliary memory, auxiliary microcontroller, bus interfaces, power jack interface, microSD card interface, ethernet interface, pendant interface, and USB interface, which are substantially the same as described with respect to the programmable (robotic) controllers of FIGS. 1 through 12. In addition, the GUI controller includes two game control interfaces for communicating with video game controllers.

The GUI controller further comprises multiple video outputs including a VGA video output and an AD725 VGA to NTSC/PAL adapter to permit use of older television equipment. The primary microcontroller (e.g., P8X32A) preferably provides the x4 clock, FM audio carrier, and VSB video RF carrier for modulated video/audio output. Composite and S-video outputs from the AD725 VGA to NTSC/PAL adapter are included as well.

A low-power transceiver (e.g., MAX3486) provides a half-duplex RS-485 interface for attachment of various devices in a bus topology. For example, an end user could implement ProfiBus, MobBus, ANN-Bus, etc. The GUI controller also includes a dual channel monaural audio line level output jack interface. An incoming voltage monitor circuit is provided using the auxiliary microcontroller (e.g., PIC12F1572) as it has a 10 bit internal analog-to-digital converter (ADC), and improved functionality over the primary microcontroller (e.g., P8X32A). The GUI controller can be used with any of the circuitries represented in FIGS. 1-15 and 22-29.

FIGS. 22 through 29 are schematics representing circuitry of a nonlimiting programmable controller configured as a instrumentation and electrical system controller (also referred to herein as the instrument controller) capable of being programmed to operate with various devices. For example, the instrument controller may be functionally connected to heat detectors, smoke detectors, occupancy sensors, fire alarm horns, temperature sensors, flow sensors, switches, etc. The instrument controller includes a primary microcontroller, programming interface, auxiliary memory, auxiliary microcontroller, bus interfaces, power jack interface, microSD card interface, ethernet interface, distance sensor interface, and RFID card reader interface, which are substantially the same as described with respect to the programmable controllers of FIGS. 1 through 12.

Figure 25:
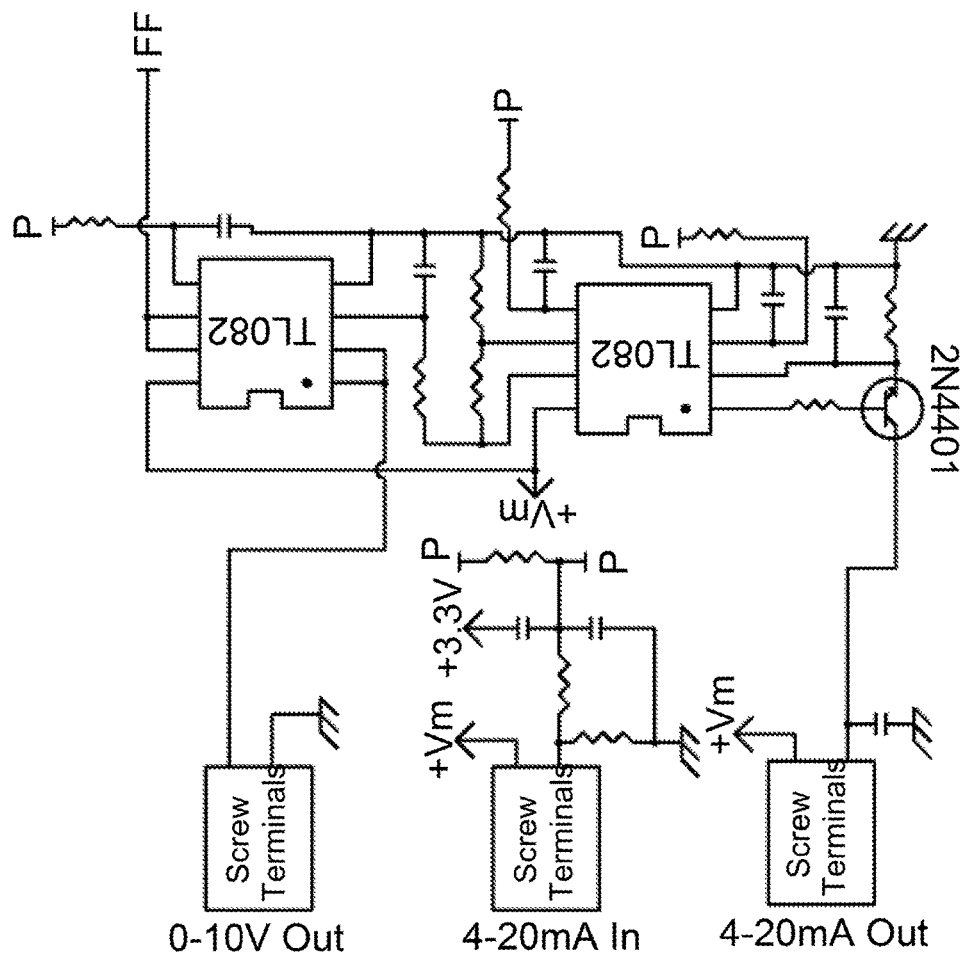
Figure 26:
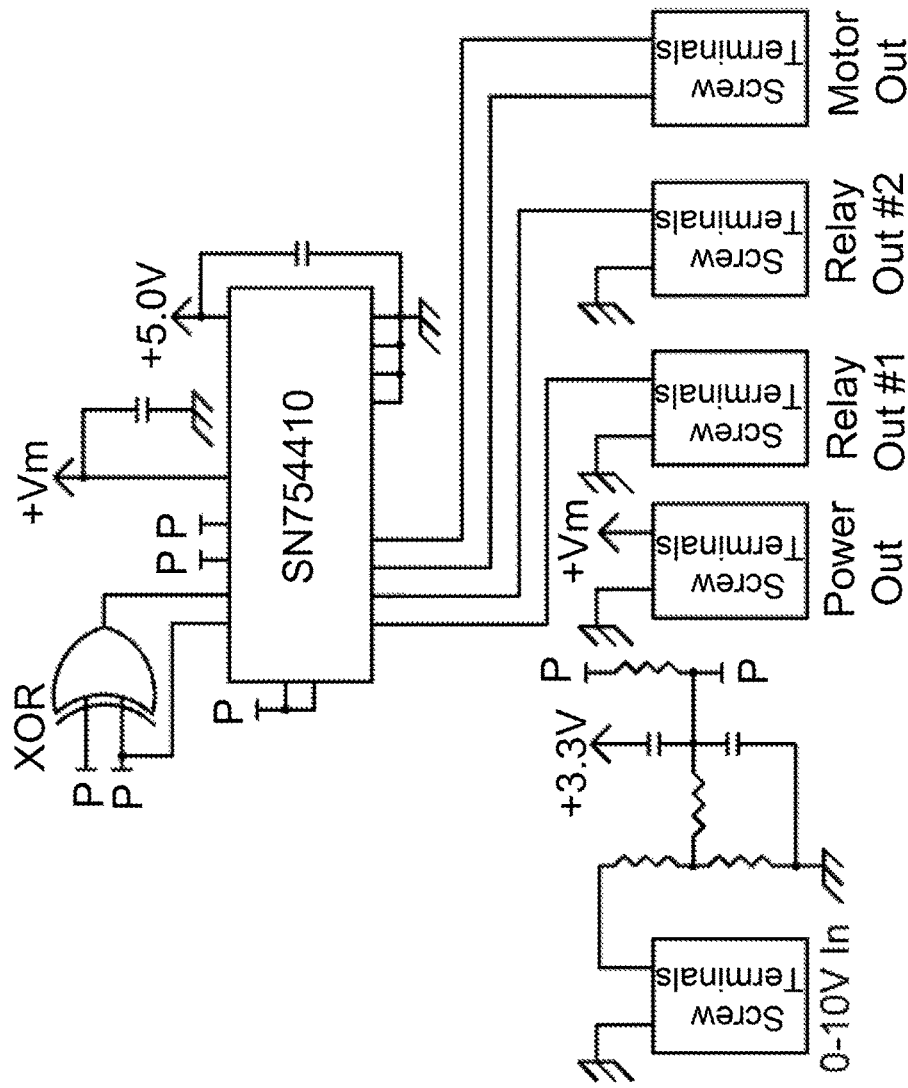

Referring to FIGS. 25 and 26, one 4-20 mA sensor input (4-20 mA In) is provided that uses a 160Ω resistor to provide a 0.64V to 3.2V input for the sigma-delta input of the primary microcontroller, and one 4-20 mA output using a transistor (e.g., 2N4401) and a dual operational amplifier (e.g., TL082). The operational amplifier provides a means of feedback to keep the circuit from sending too much current out to the attached indicator. A 160Ω resistor provides the 0.64V to 3.2V feedback voltage for comparison with the PWM voltage output of the primary microcontroller. When the current through the transistor causes a greater voltage drop across that 160Ω resistor than the PWM voltage from the primary microcontroller, the operational amplifier will disable the transistor output. As long as the voltage drop across the 160Ω resistor is below the PWM voltage level, the transistor is enabled. This provides a PWM-type of current regulation for the interface.

One 0-10V input (0-10V In) is provided that uses a voltage divided of one 6.8 KΩ resistor and one 3.3 KΩ resistor. When 10V is present at the input then the 3.3 KΩ resistor will have a 3.3V drop across it. When 0V is present at the input then the 3.3 KΩ resistor will have a 0V drop across it. For example, 10V will have a PWM code value of zero while 0V will have a PWM value of 1000. A 0-10V output (0-10V Out) uses the 6.8 KΩ resistor as the feedback resistor of one operational amplifier (e.g., TL082) and the 3.3 KΩ resistor as the input resistor of that operational amplifier. This provides a gain of 6.8 KΩ divided by 3.3 KΩ plus 1 or 2.06 plus 1 which equals 3.06 times. The 3.3V maximum PWM output of the primary microcontroller multiplied by 3.06 times results in an output voltage of 10.1V. Filtering and buffering of this 10V output voltage reduces the likelihood of inappropriate responses from the device, such as lighting control. Two PWM outputs for relay coil voltage level (Relay Out #1 and #2) are available through an H bridge device (e.g., SN754410) providing up to 1 A drive current. The H bridge device may also be used for speed control of a DC motor, such as a pump motor to control its flow rate, through a motor output (Motor Out).

Figure 27:
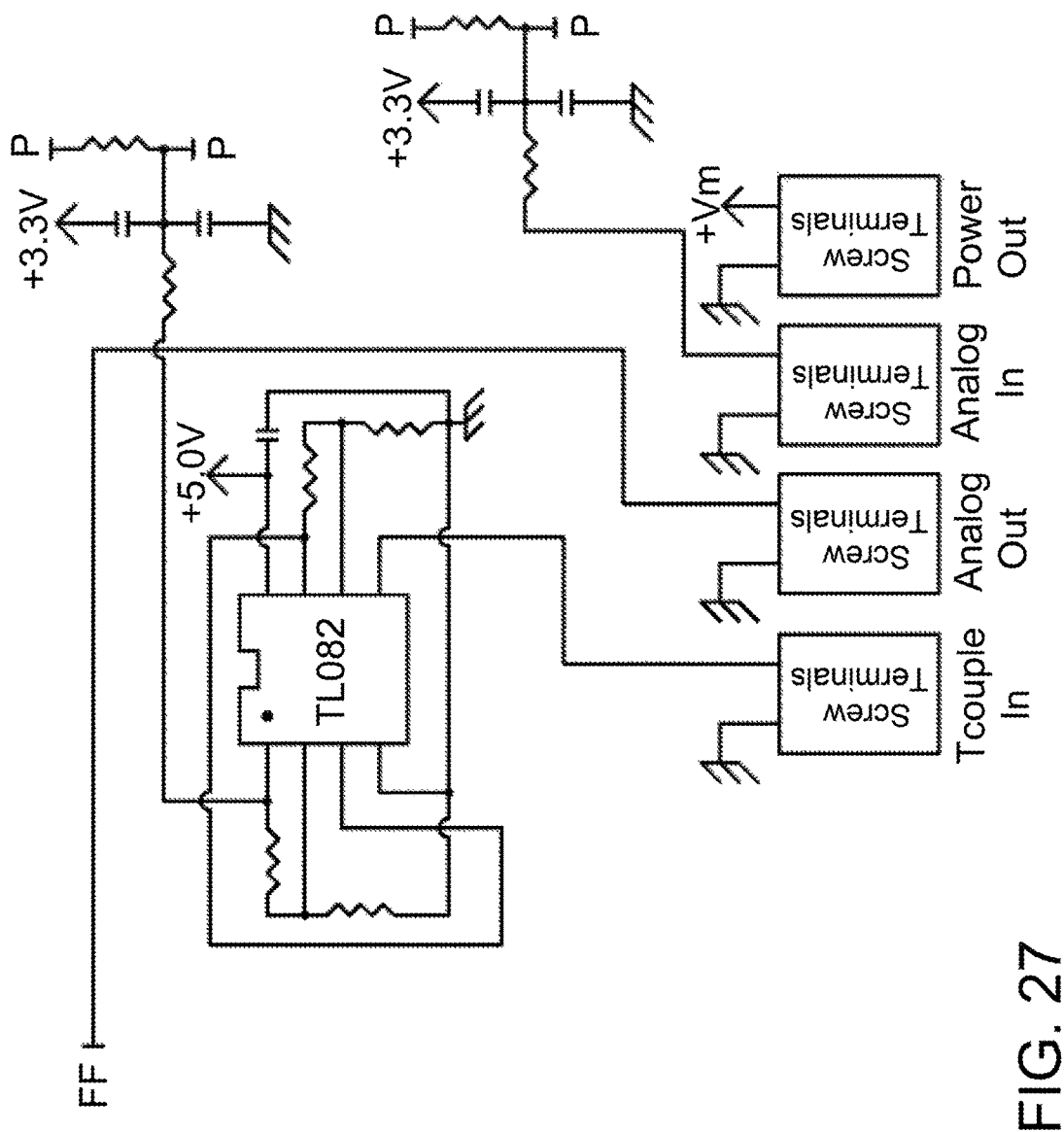

Referring to FIG. 27, a thermocouple input (Tcouple In) is provided as an analog input using sigma-delta conversion. In this instance, since the thermocouple output is only around 22 mV, external amplification is needed of about 100 times. Significant circuitry noise may occur if one stage were used for the full 100 times multiplication. Therefore, the multiplication is preferably separated, for example, into two stages of ten times each. The ratio is calculated from the operational amplifier feedback resistor, 91 KΩ in this case, by the input resistor at the inverting input, 9.1 KΩ in this case, and adding one to that value. The 91 KΩ divided by 9.1 KΩ equals 10 and adding one results in 11 times gain of one amplifier stage. The gain of the two amplifier stages multiplies, or 11 multiplied by 11 equals 121 times gain total. The 22 mV, center value from the thermocouple, is multiplied by 121 providing 2.66V at the final operational amplifier output. A maximum thermocouple voltage of 27 mV can be used for an amplifier output voltage of 3.3V. For example, if 22 mV is 212° F. and 27 mV is 250° F., then the PWM values from the sigma-delta conversion will be 806 and 1000, respectively, providing a range in PWM values of 194 and a temperature range of 38° F. Dividing the PWM range (194) by the temperature range (38° F.) results in 5.1 PWM iterations per ° F. or 0.196° F. per PWM iteration.

Figure 28:
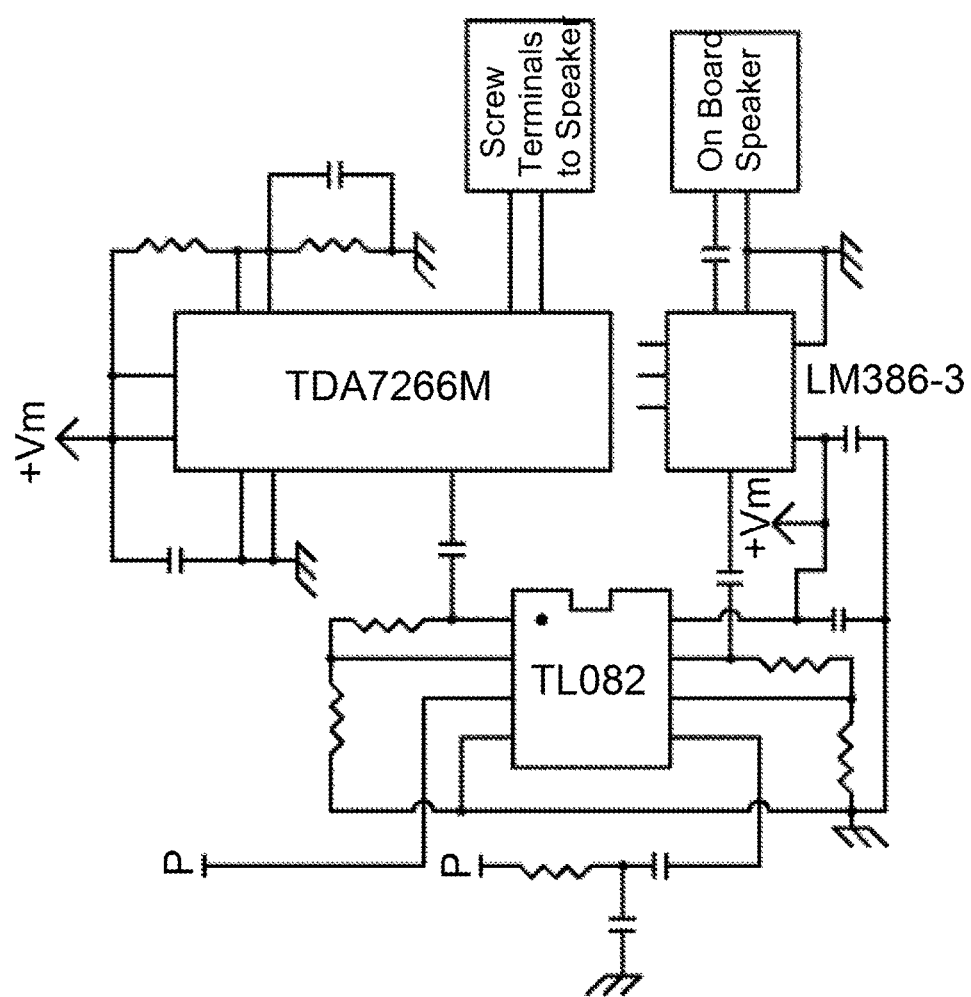

The instrument controller of FIGS. 22 through 29 includes one 7 W 8Ω audio output and one 700 mW 8Ω audio output (FIG. 28). This allows for an onboard speaker so that students can test their programming code without attachment to a large apparatus. One speaker (e.g., 8Ω 1 W) and one light source (e.g., high intensity white LED) are provided onboard which may be used for, for example, fire alarm simulation capability. A 7 W audio amplifier is provided for driving four 32Ω 2 W speakers in parallel configuration (32Ω/4=8Ω). One analog (0-3.3V) output (Analog Out) with filtering and buffering and one analog (0-3.3V) input (Analog In) are provided for interfacing with other sensors and devices the end user may choose to implement in their projects.

Figure 29:
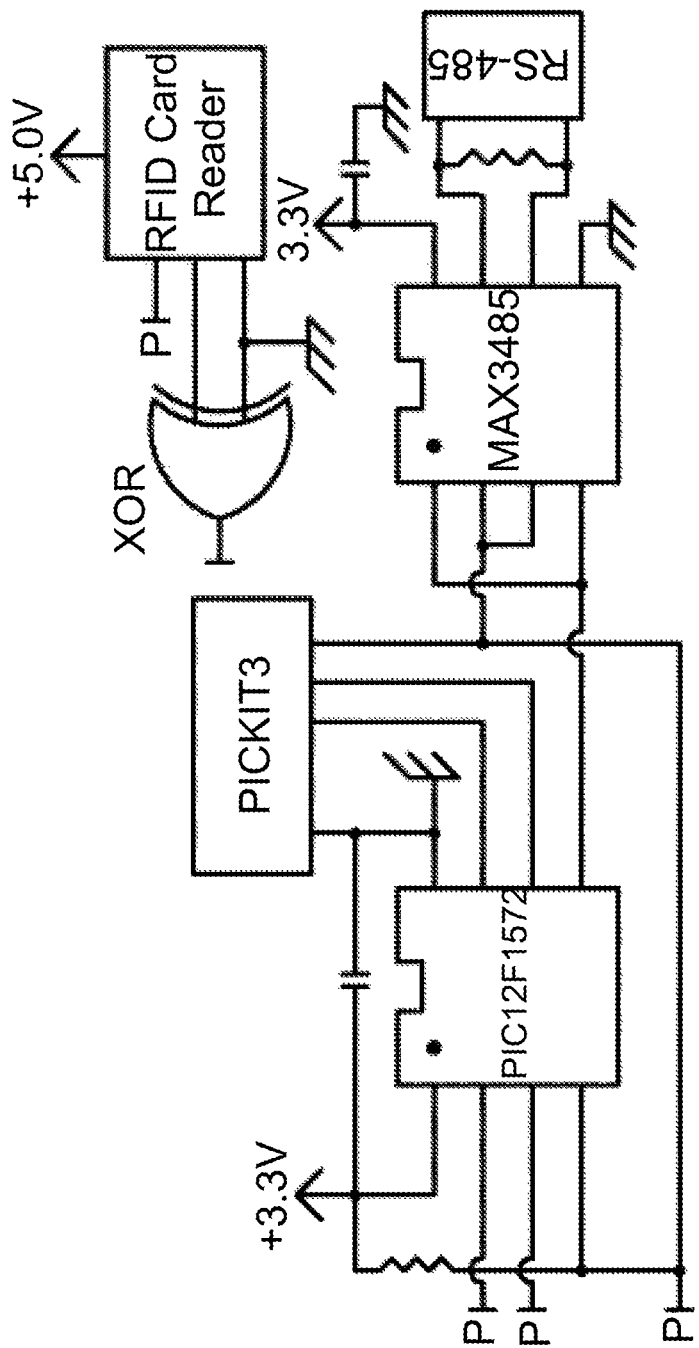

Referring to FIGS. 28 and 29, an RS-485 interface is provided that preferably communicates at 9600 baud, 1 start bit, 1 stop bit, and even parity (8E1). If Google SimpleIDE is used, this function will have to be implemented as it is not currently supported.

The instrument controller is capable of not only monitoring external devices such as heat detectors, gas sensors, power monitoring equipment, etc., but is also capable of broadcasting audio files. As examples, WAV files may be rendered for an announcement message to leave the building due to fire or that the machine has malfunctions in production along with alarm sound effect. As such, the instrument controller allows for process monitoring and control suitable for teaching students instrumentation.

FIGS. 30 through 38 and 39 through 47 are schematics representing circuitry of nonlimiting a basic remote control (RC) control receiver and a basic control transmitter, respectively (individually referred to as the RC receiver and RC transmitter, and collectively referred to as RC controllers). These RC controllers may be used to remotely operate a motorized device, such as but not limited to an RC vehicle.

The RC receiver includes a primary microcontroller, programming interface, auxiliary memory, auxiliary microcontroller, bus interfaces, and microSD card interface which are substantially the same as described with respect to the devices of FIGS. 1 through 29.

Figure 36:
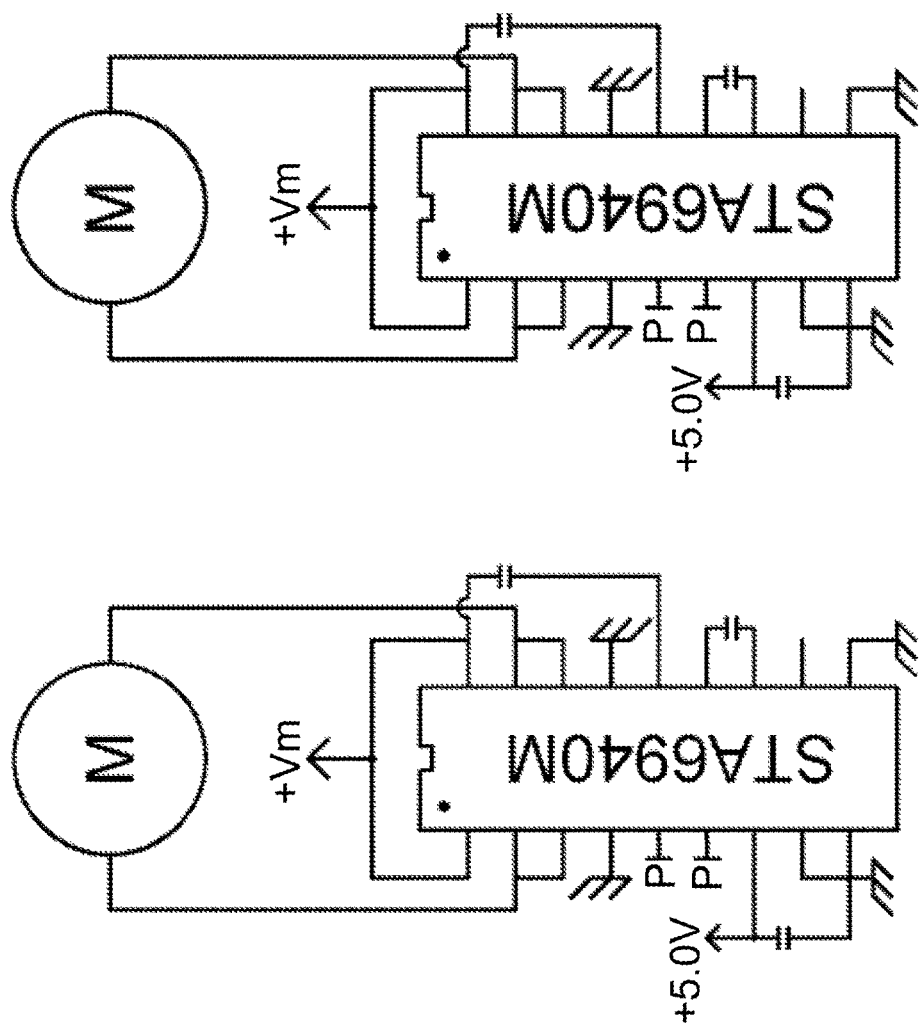
Figure 37:
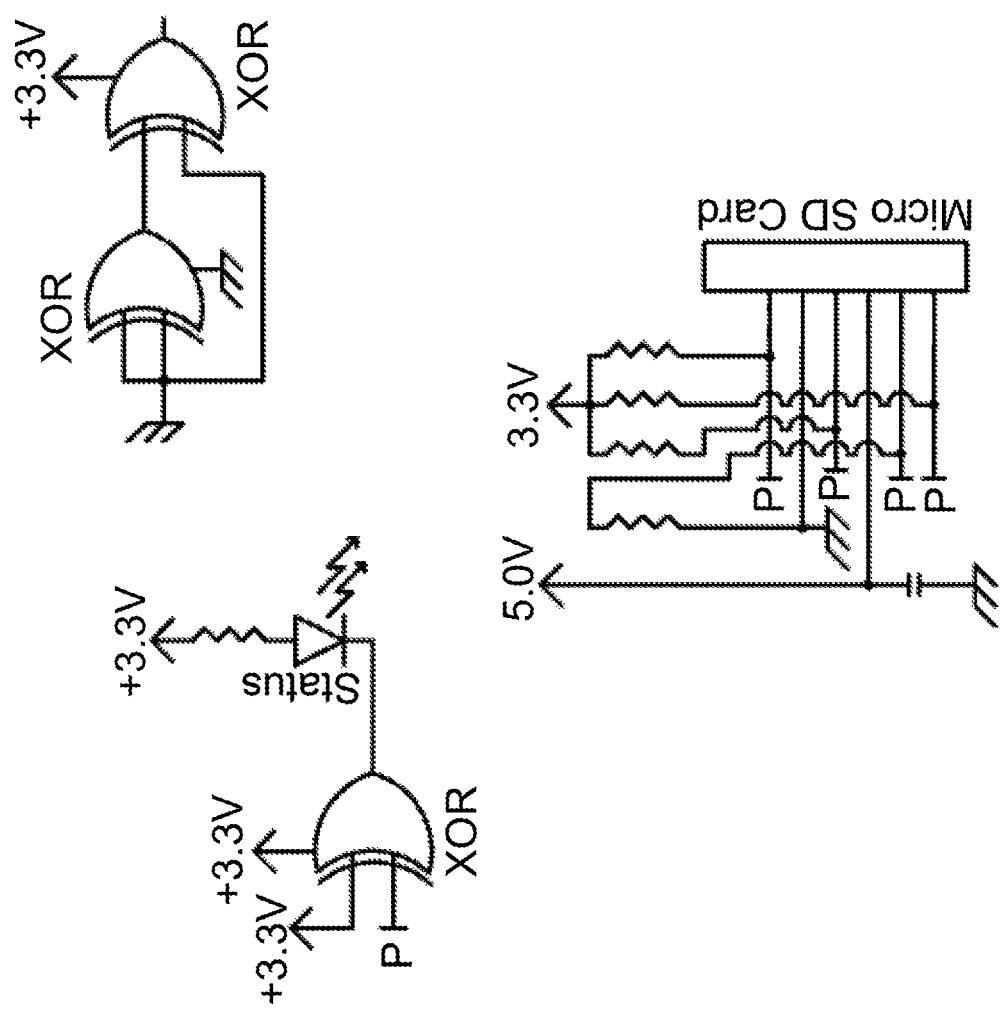
Figure 38:
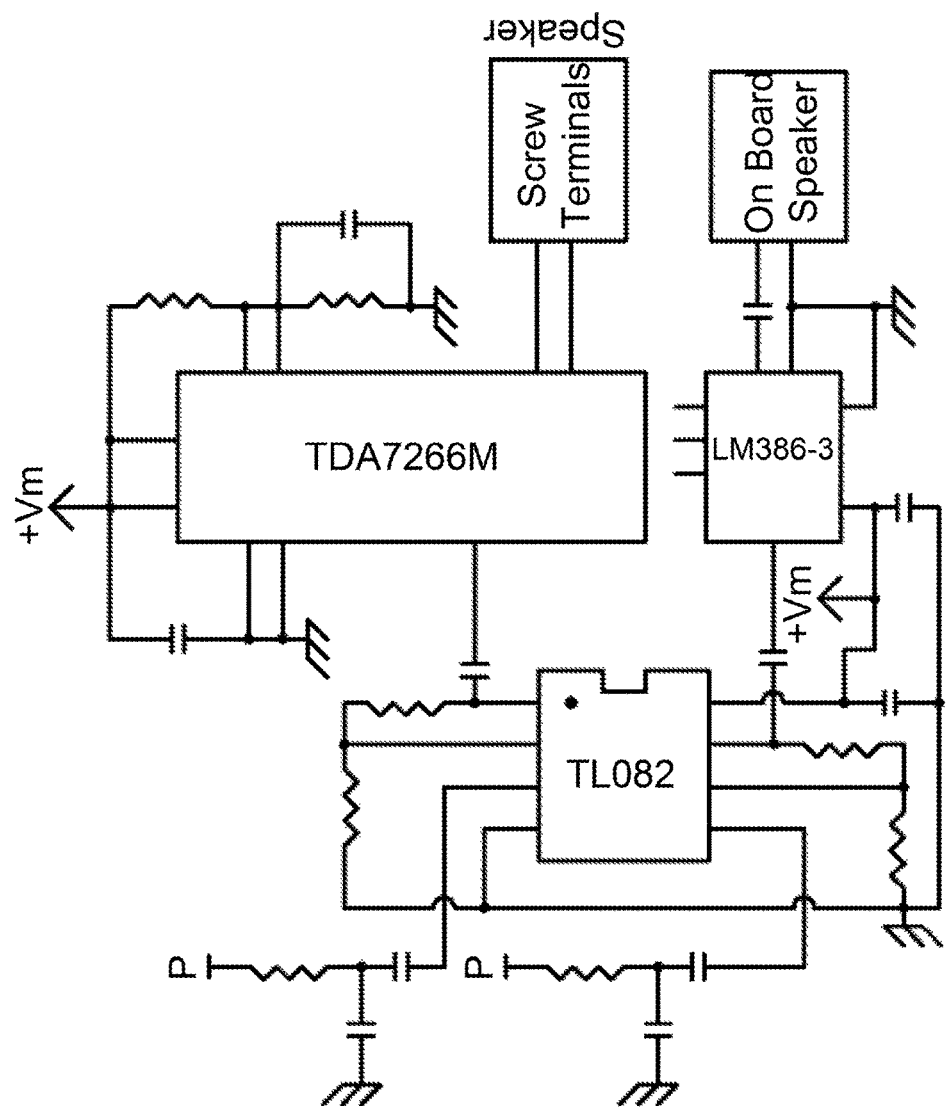
Figure 39:
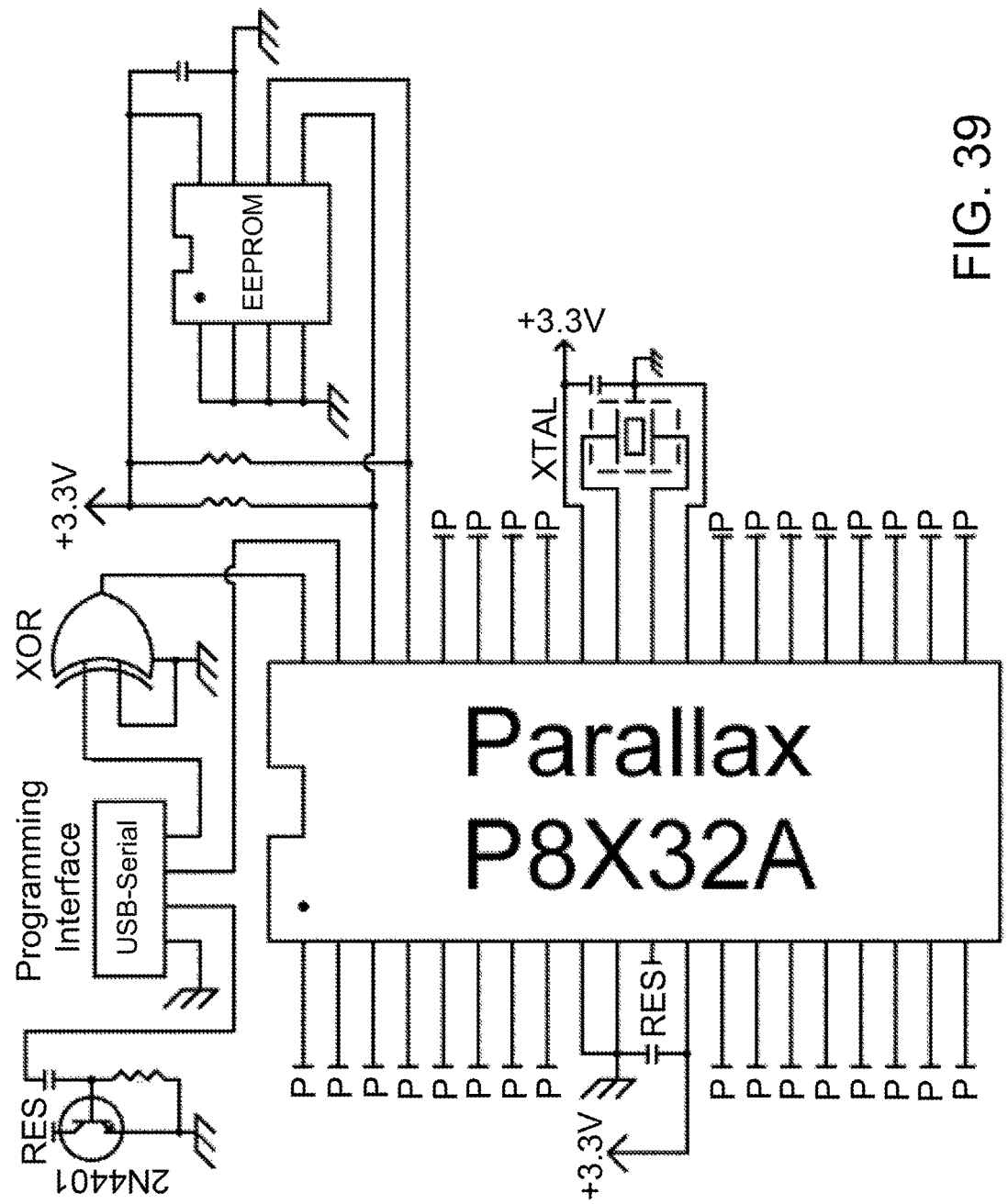
FIGS. 39 through 47 are schematics representing circuitry of a remote control (RC) transmitter in accordance with certain aspects of the invention.

Referring to FIG. 36, the RC receiver includes two H bridge motor drive devices (e.g., STA6940M) driving 4 A of current for operating two corresponding motors (M), such as the DC motor commercially available from Mabuchi under the model number RS-380SH. These motor drive devices preferably each provide relatively low internal on resistance, on the order of about 0.1Ω or 100 mΩ, which is significantly lower than most currently available H bridges of this size. Two output lines per motor drive device may be used to provide PWM depending on the direction of rotation desired from the corresponding motor. In this embodiment, input 1 having PWM and input 2 held low permits clockwise motor rotation, whereas input 1 held low and input 2 having PWM permits counter clockwise motor rotation.

Figure 34:
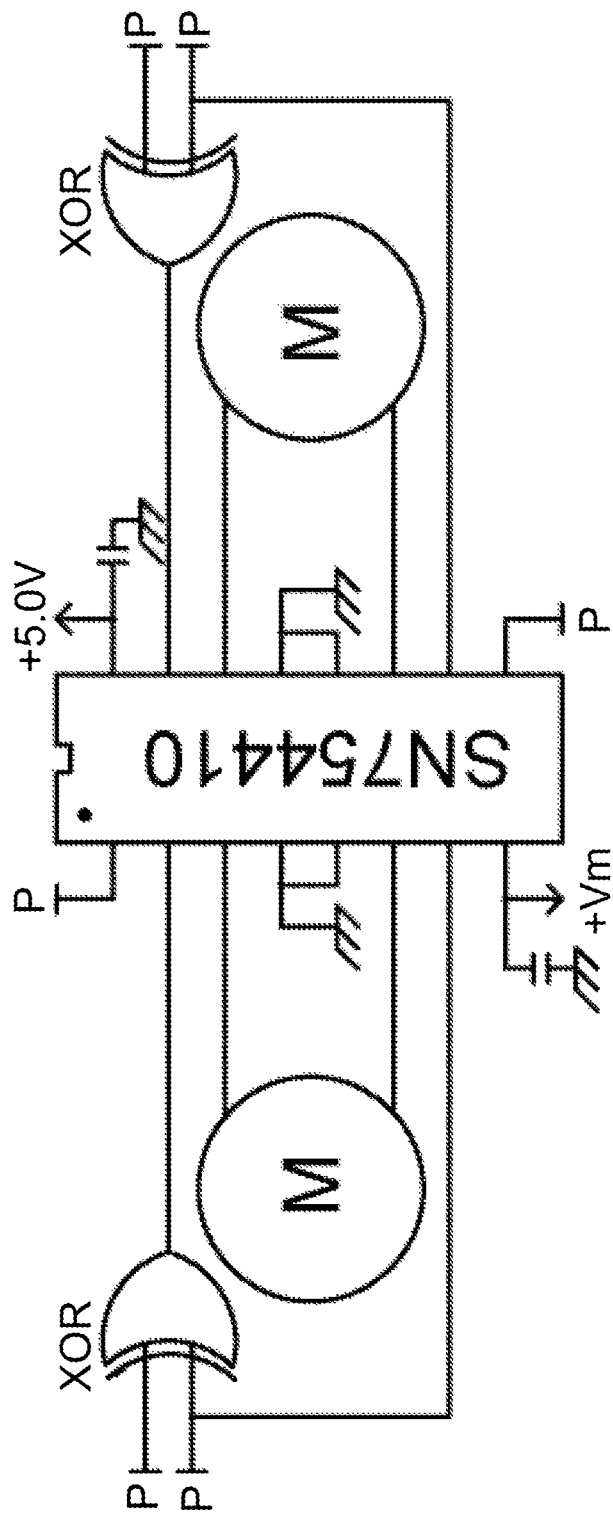
Figure 35:
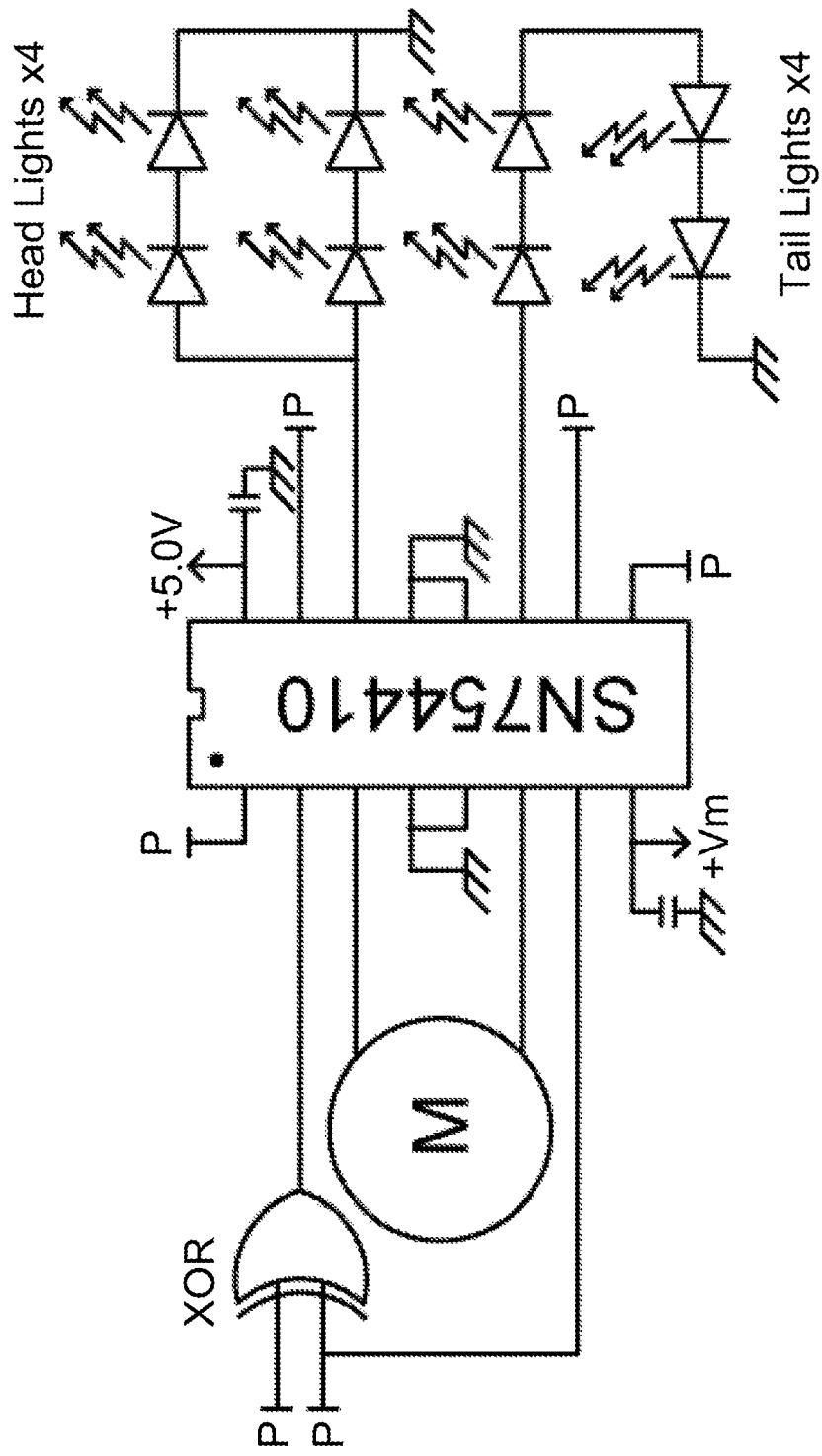

As represented in FIGS. 34 and 35, two additional H bridge motor drive devices (e.g., SN754410) are provided. A first of the additional motor drive devices may be used for operating two auxiliary motors, such as for turret rotation and barrel elevation of an RC tank. The other motor drive device may be used to drive an auxiliary motor, such as the barrel recoil linear movement of an RC tank, as well as providing user programmable variable voltage outputs for operating two lighting circuits on the RC vehicle, such as headlights and tail lights. Exclusive OR (XOR) gates permit uniform PWM control of the additional motors for either direction without the need of swapping PWM inputs.

Similar to the instrument controller of FIGS. 22-29, the RC receiver includes one high-power audio output with the option of two high-power audio outputs possible. The high-power audio output is 7 W into an 8Ω speaker load via a mono bridge amplifier (e.g., TDA7266M). It is foreseeable that a dual bridge amplifier (e.g., TDA7266) could alternatively provide two high-power audio drives.

Figure 30:
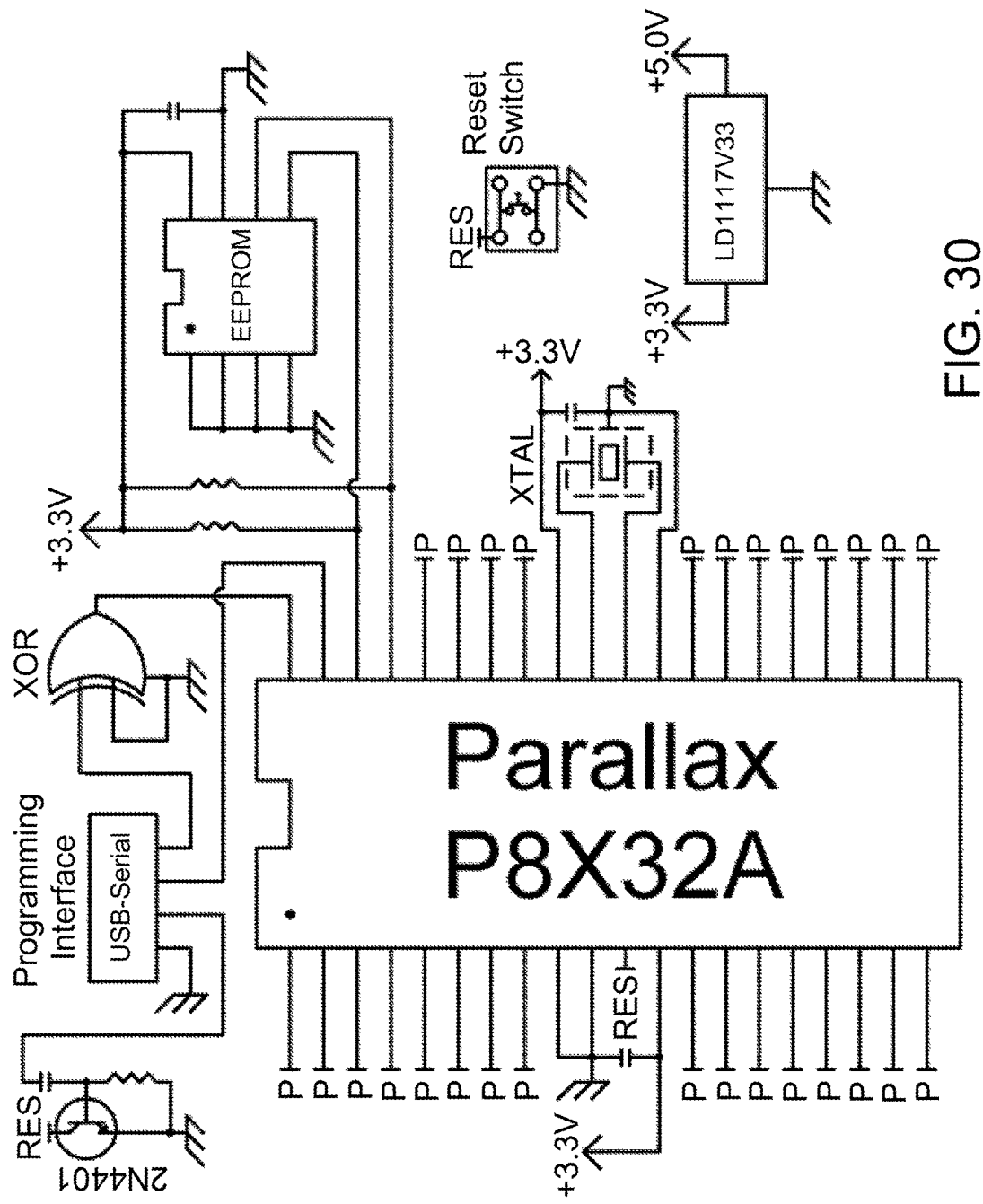
FIGS. 30 through 38 are schematics representing circuitry of a remote control (RC) receive controller in accordance with certain aspects of the invention.
Figure 31:
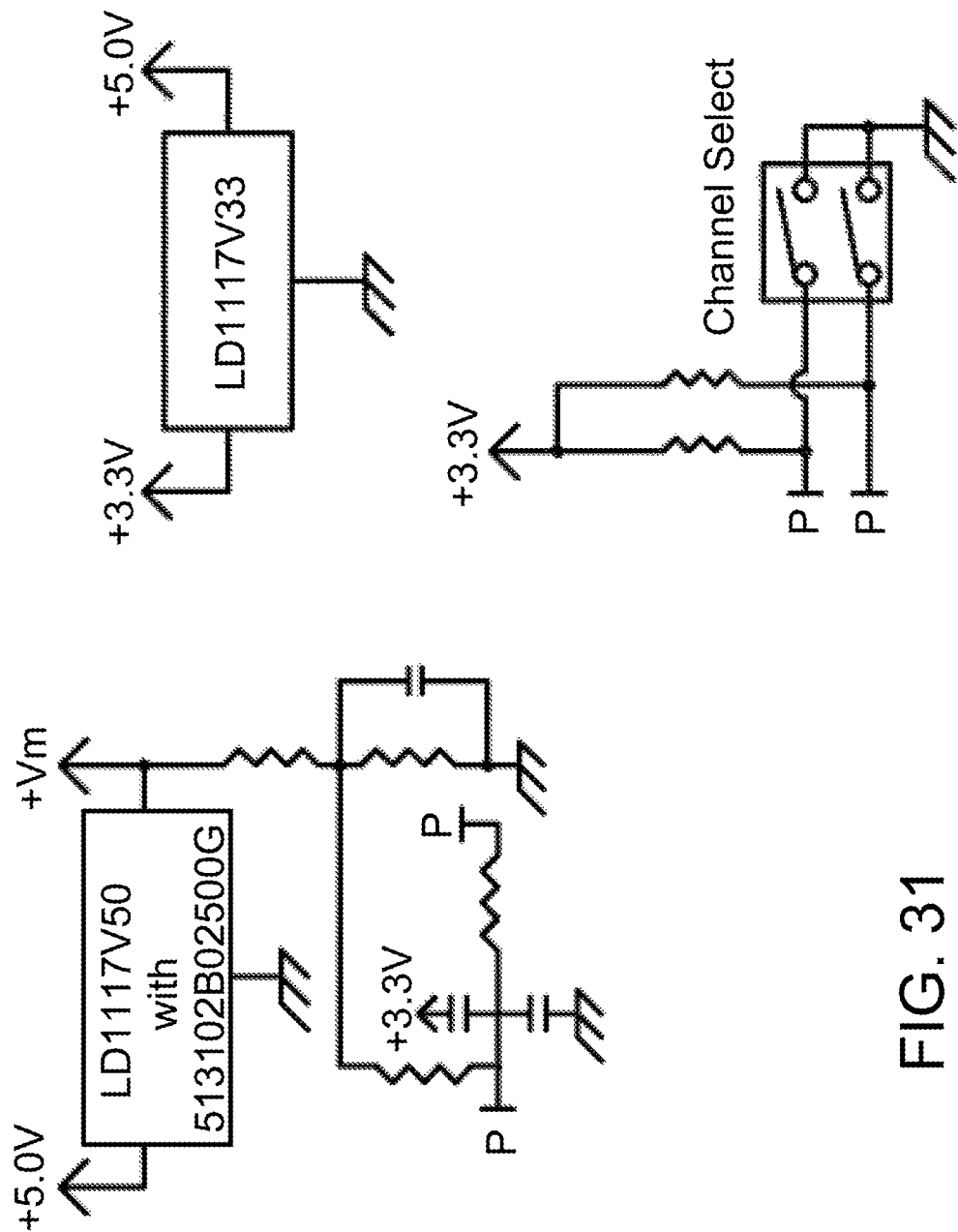
Figure 32:
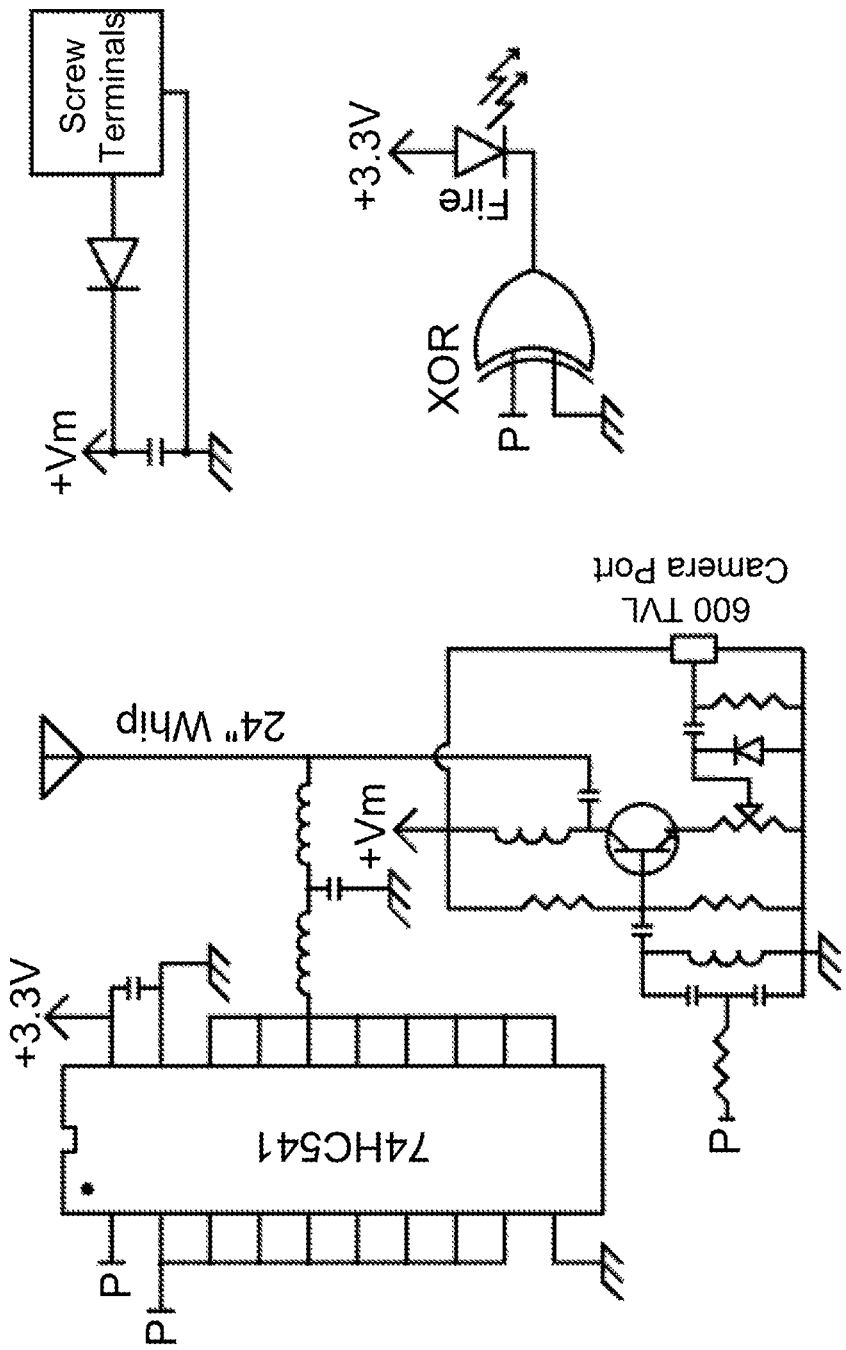
Figure 33:
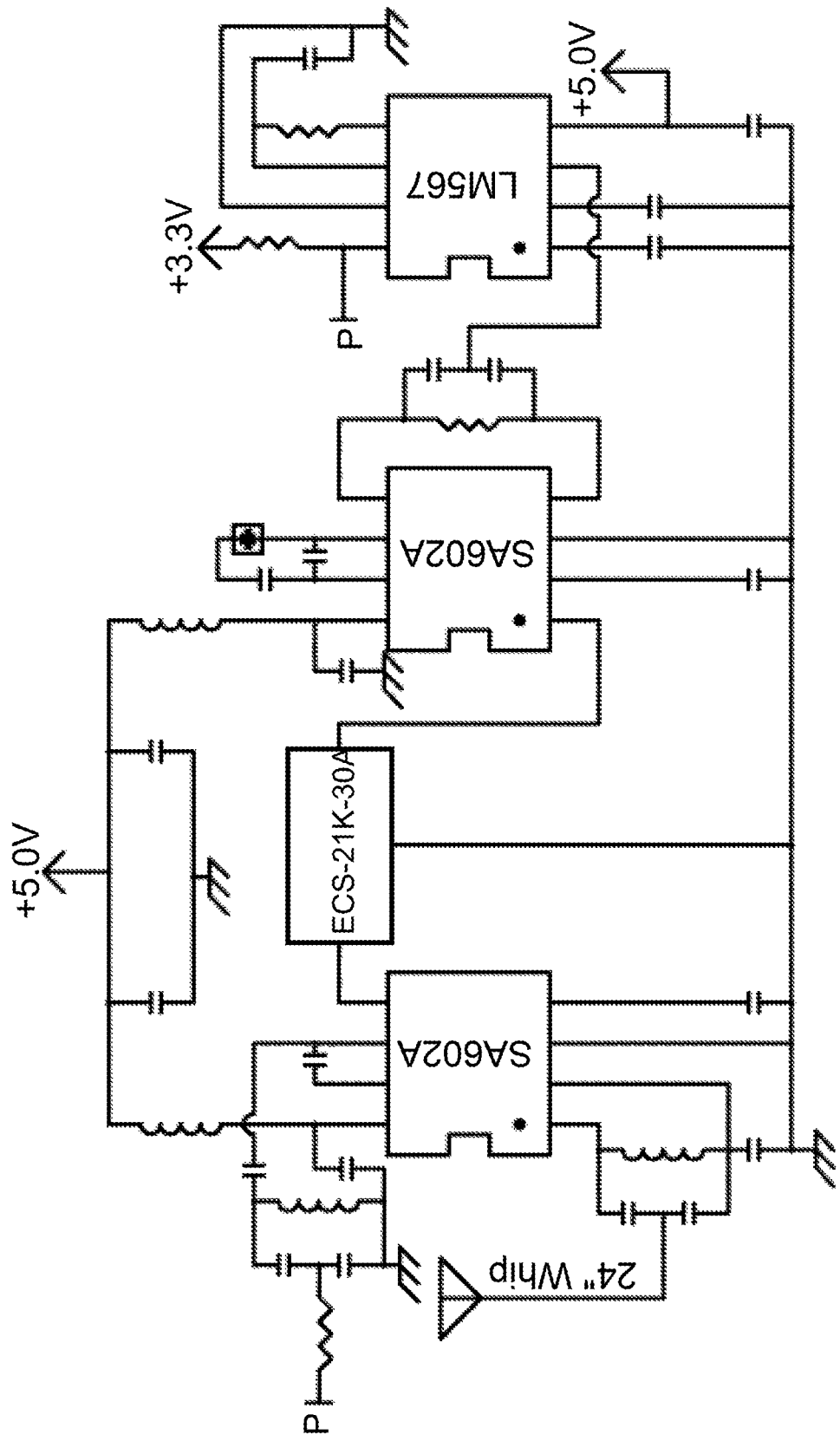

The primary microcontroller (e.g., P8X32A) is preferably crystal controlled to provide reliable oscillator stability and preferably has an internal phase-locked loop (PLL) circuit. This PLL circuit permits multiplying the crystal frequency (5 MHZ), in this instance, from 0 to 25.6 times or DC to 128 MHZ. FIGS. 30 and 31 represents this PLL feature as used on two separate output lines of the primary microcontroller. One of these output lines may be the radio frequency (RF) carrier frequency output, for example about 49 MHZ for applications in the United States of America. Referring to FIGS. 32 and 33, the RC receiver includes a receiver circuit with a 21.395 MHZ first intermediate frequency (IF). Therefore a second microcontroller PLL output needs to be about 70.395 MHZ to provide the local oscillator (LO) frequency needed by a mixer circuit (e.g., SA602A). The difference of 70.395 MHZ and 49 MHZ is 21.395 MHZ which the IF filter will pass.

During operation, the 49 MHZ RF carrier being received may contain data from the user transmitter control. The RF band is very wide so the IF filter is preferred to reduce the amount of spectrum which the RF circuitry is amplifying. A crystal 21.395 MHZ oscillator with 30 KHZ bandwidth may be used to narrows the RF spectrum to the second stage of the RF circuitry while reducing the bandwidth to only 30 KHZ. The 70.395 MHZ LO frequency may be used as the video carrier for, for example, a small NTSC or PAL compatible CMOS camera. Such a camera may allow video transmission from the RC vehicle (RC receiver) to the hand-held user control transmitter where it may be received by the RC transmitter.

The RC transmitter may use the first mixer stage for direct conversion of the RF rendering the received video that may then be pre-amplified before sending to an output port for connection of a low power LCD-style display. Using the internal PLL feature of the primary microcontroller permits for changing the channel or RF frequency output by the device as desired. The RC transmitter preferably outputs no more than 100 mW (typically 80 mW) as to meet FCC requirements for unlicensed devices.

The second mixer stage of the receiver circuit may use a fixed crystal with a frequency of 21.477270 MHZ. The difference between the 21.477270 MHZ crystal frequency and 21.395 MHZ IF frequency is 82.270 KHZ. A resistor-capacitor filter is used for the second IF filter circuit. This filter output is fed into a tone detector chip (e.g., LM567) set up for a center frequency of about 82.270 MHZ. When the second mixer output is at 82.270 MHZ (carrier modulated by 2400 baud 8N1 serial data from the RC transmitter) then the tone detector chip output is brought to the low logic level. When the 82.270 MHZ output is not present, the tone detector chip output is left at the high logic level.

The transmitter circuit may use an octal non-inverting buffer/line driver device (e.g., 74HC541) may be used as a RF transistor array to provide RF power for an antenna to radiate. The gate inputs of this driver device may be tied together and then to an RF carrier output of the primary microcontroller. A serial data output line (RS-232 compatible) from the primary microcontroller may be applied to the output enable (OE) line of the driver device for controlling the RF power output. When the serial data output line is high the transmitter circuit is disabled. When the serial data output line is low the transmitter circuit is powered. This method inverts the RS-232 data at the RC transmitter end and the tone detector chip of the RC receiver inverts the RS-232 data at the RC receiver end so that the received RS-232 data is of the same polarity as the original data from the RC transmitter.

The RC transmitter includes a primary microcontroller, programming interface, and auxiliary memory which are substantially the same as described with respect to the devices of FIGS. 1 through 38. The RC transmitter also includes receiver and transmitter circuitry substantially similar to that of the RC receiver.

Figure 40:
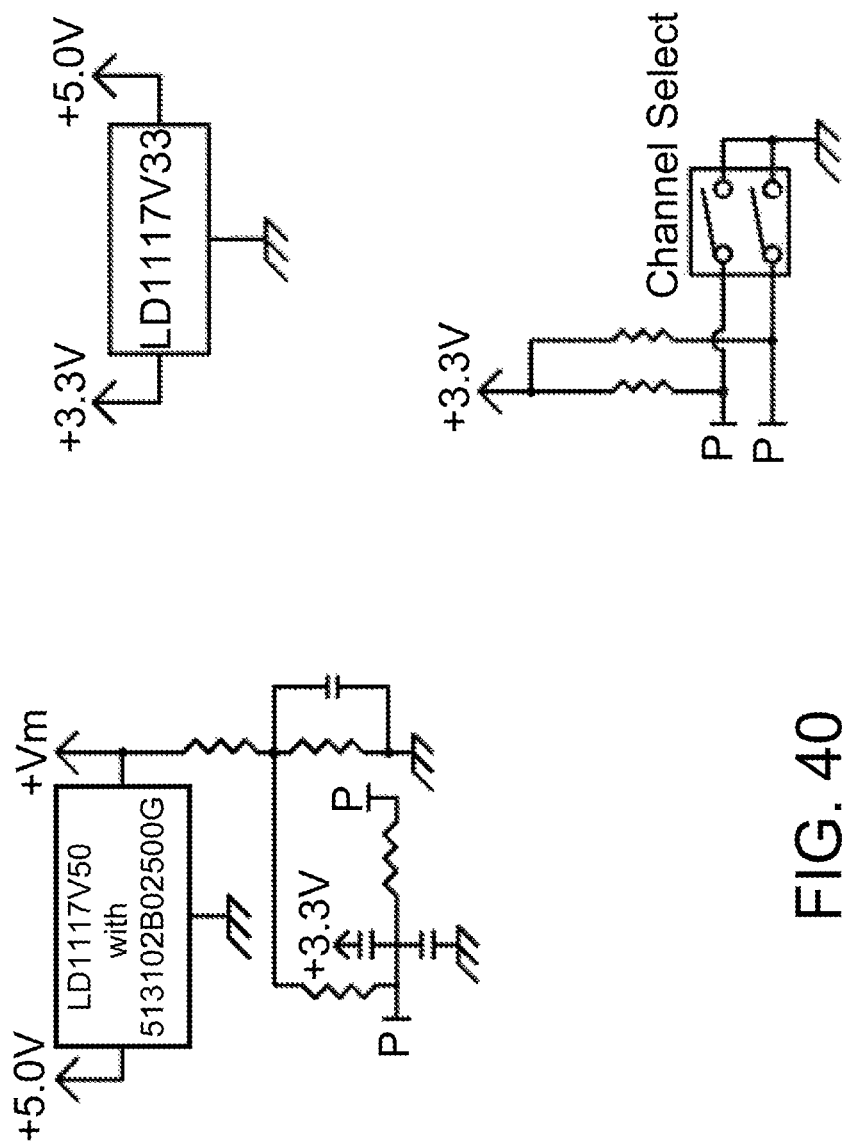
Figure 41:
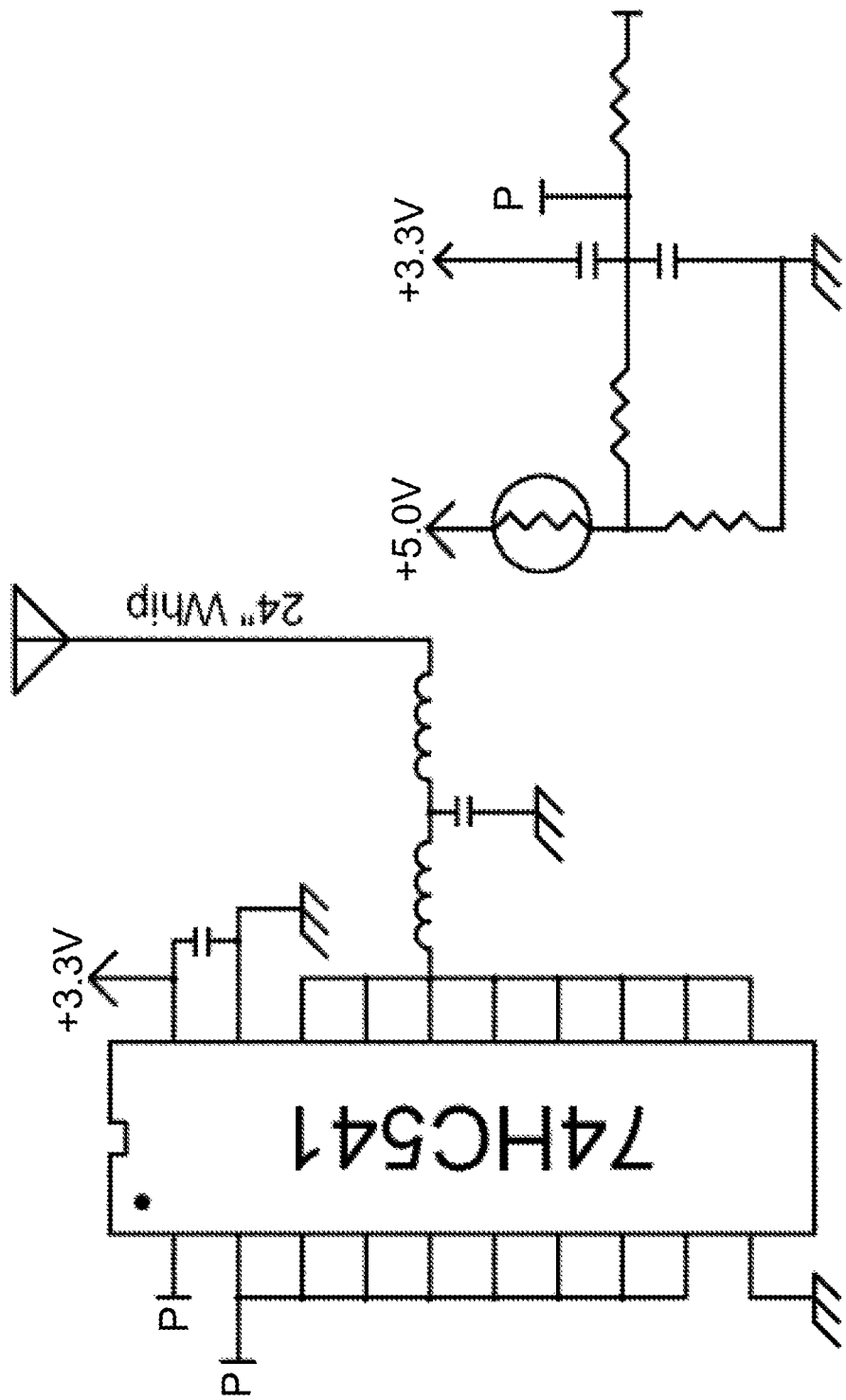
Figure 42:
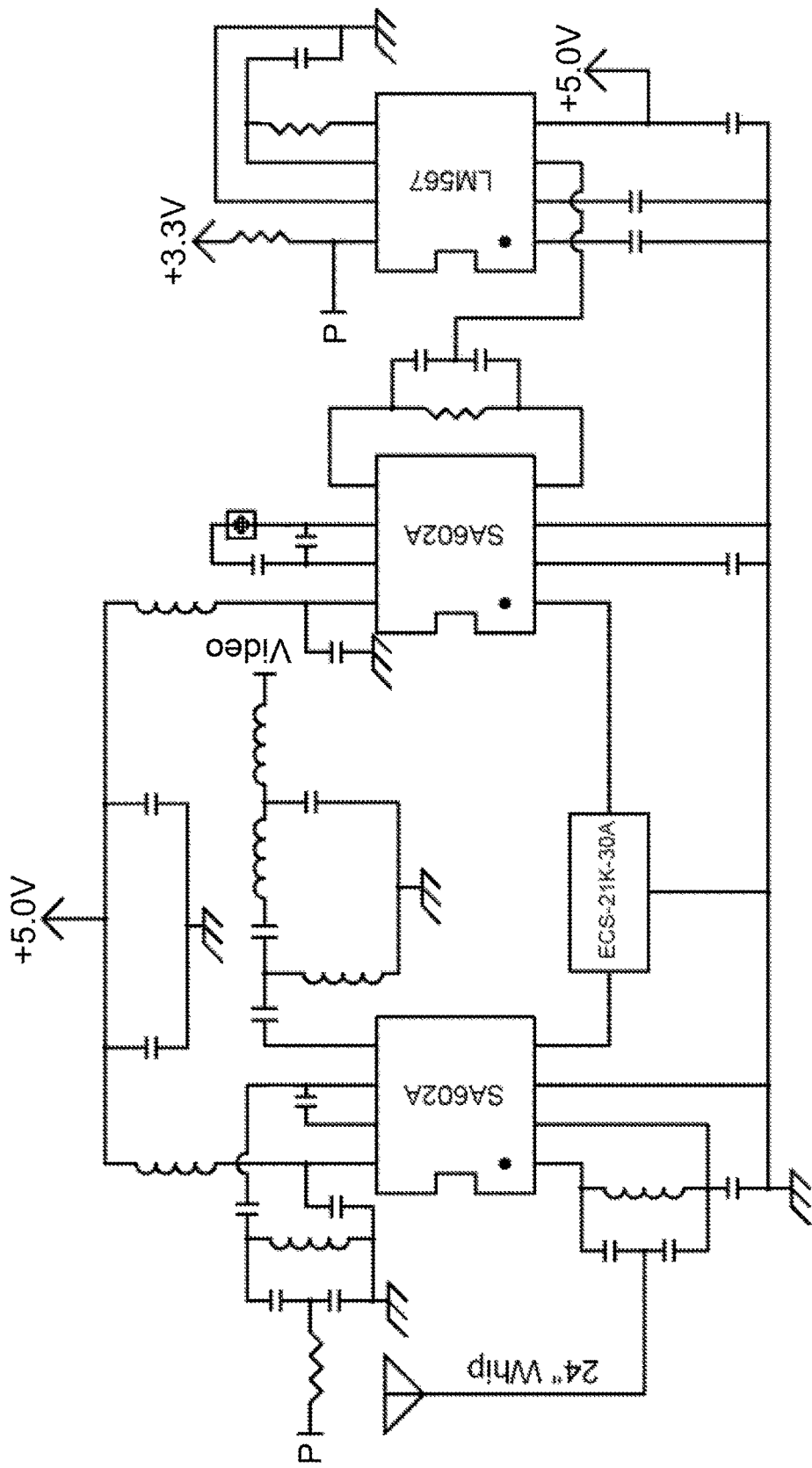
Figure 43:
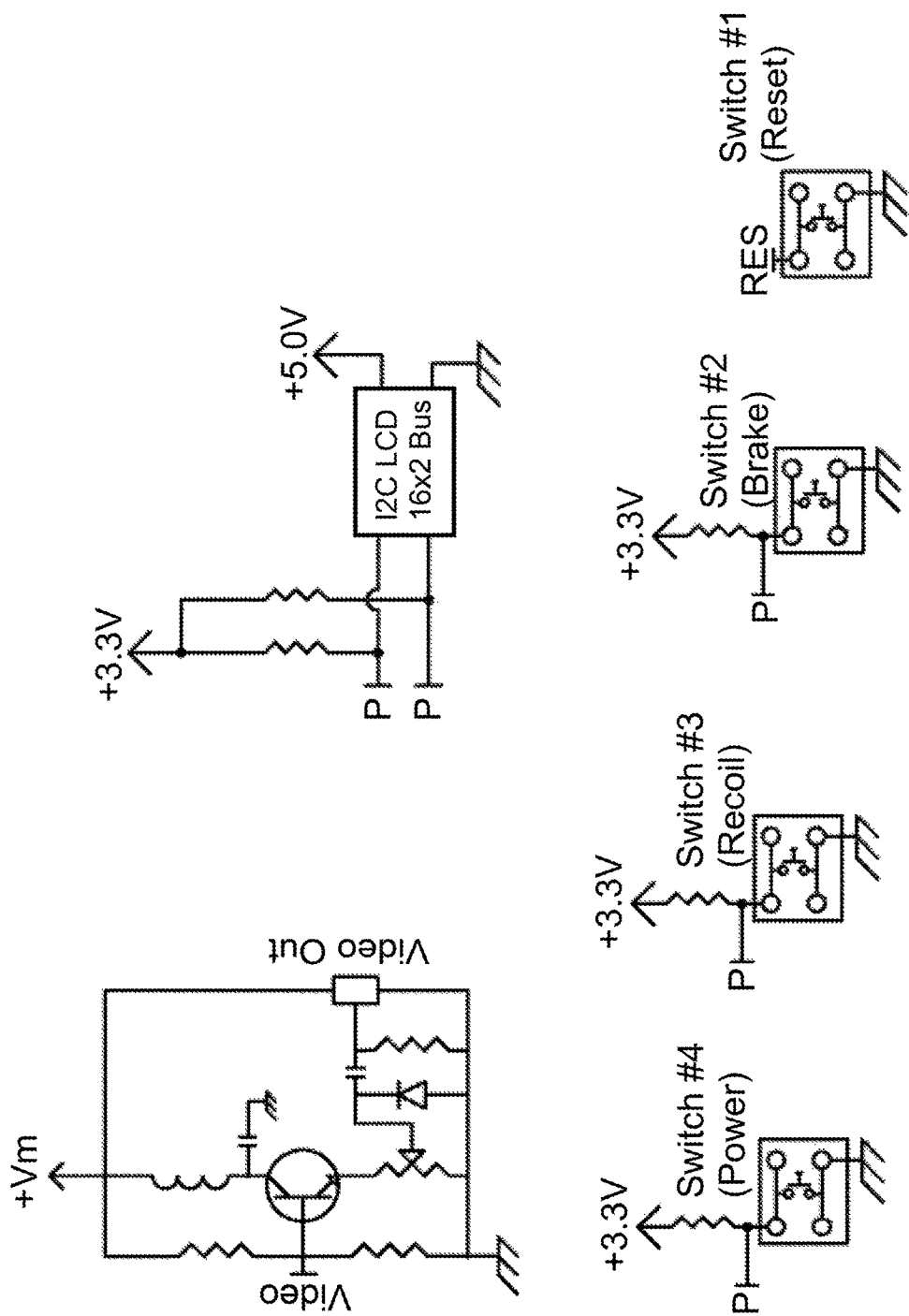
Figure 44:
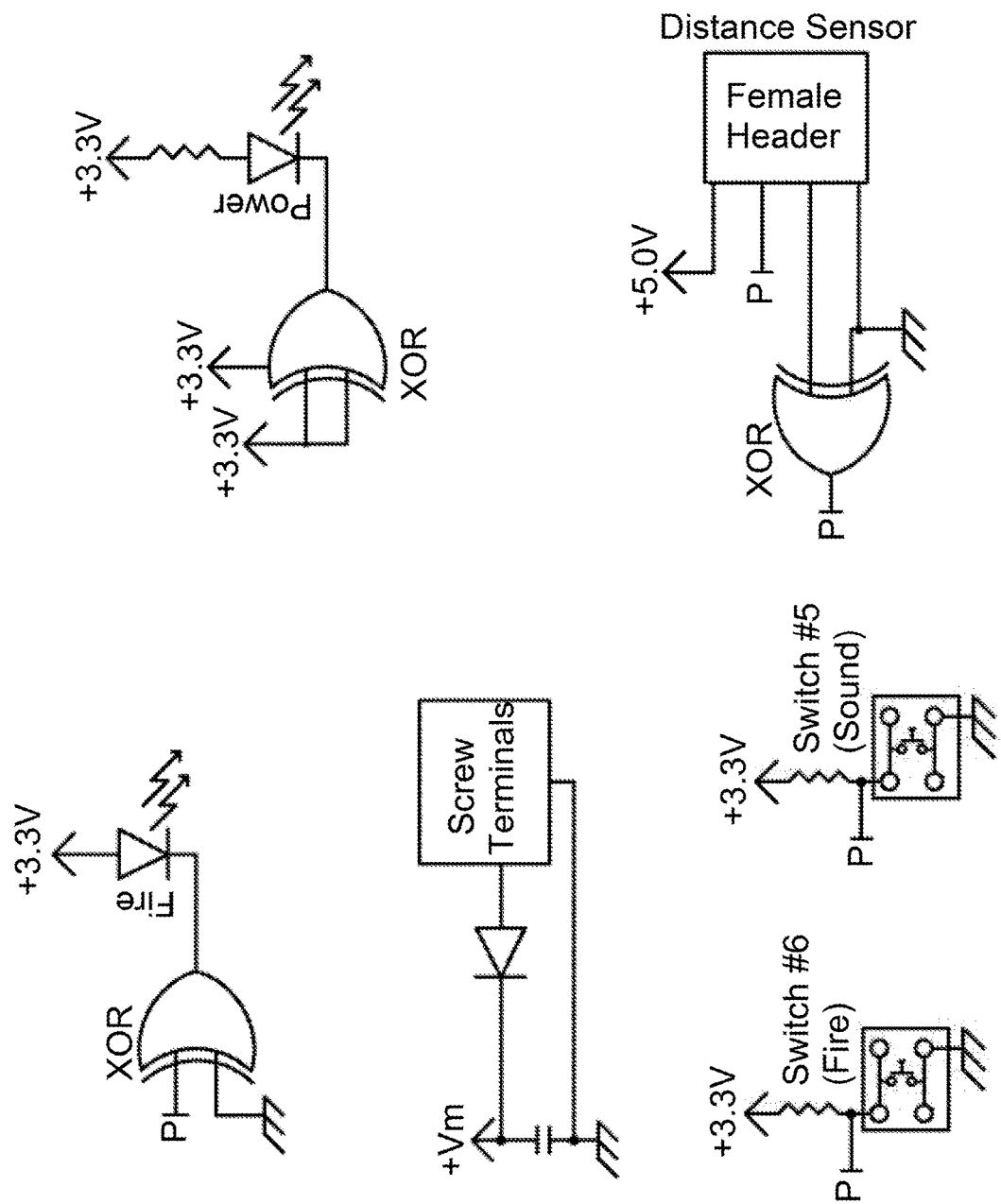
Figure 45:
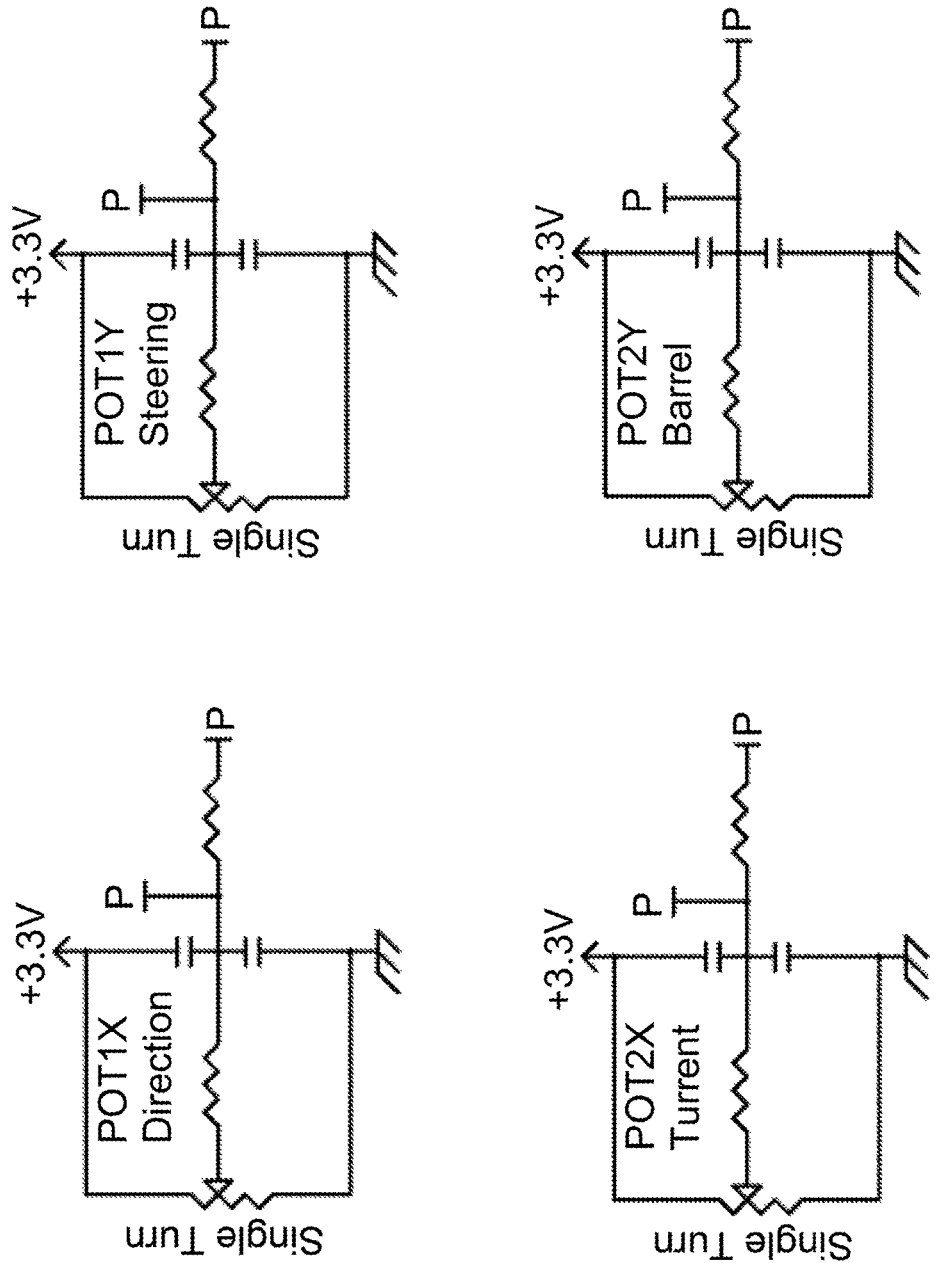
Figure 46:
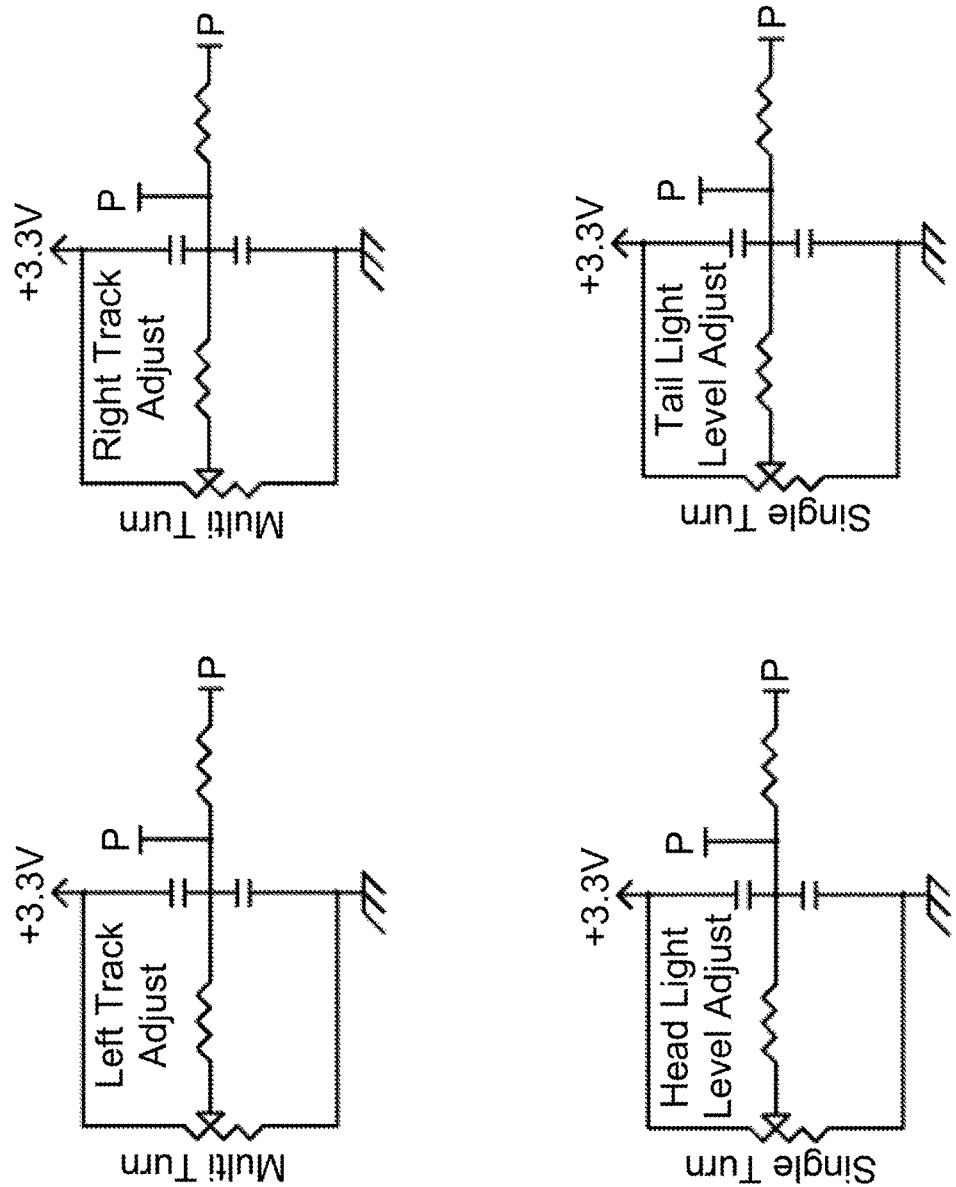
Figure 47:
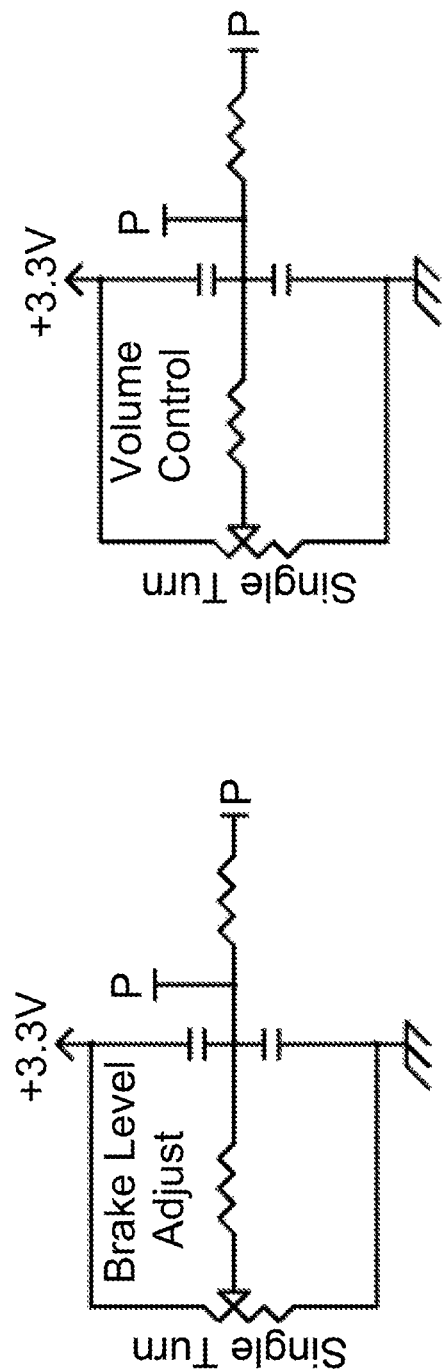

Referring to FIG. 40, the RC transmitter includes two channel-select switches permitting four RF channels to be selected by users. As represented in FIGS. 43 and 44, the RC transmitter includes circuitry for user controls with options for adjusting individual motor speeds to correct steering offsets of the RC device. Headlight and brake light level adjustment as well as volume adjustment are on provided on the RC transmitter as well.

Sigma-Delta circuitry (FIGS. 45-47) is provided for reading control positions, such as joysticks for steering and turret/barrel control, volume level and even a LDR for enabling the lights on the RC vehicle when the surrounding light level becomes low. A 16×2 LCD character display with an inter-integrated chip (I2C) bus (FIG. 43) is provided for displaying data such as the RC receiver battery status, RC transmitter battery status, volume level, and current function. Switches are available on the RC transmitter, one for powering on the RC receiver module, one for testing the brake lights, and one for programming the recoil response. Preferably, a switch is provided inside each of the joysticks. For example, a first joystick may be used for controlling the auxiliary motors and its switch for enabling or disabling the sound output. The other joystick may be used for steering the RC device and its switch used for enabling an effect, such as flashing a LED indicating a shot fired from the tank, for example.

An ultrasonic distance sensor is provided on the RC transmitter permitting speed of the RC device to be monitored and displayed on the LCD. One XOR gate on the RC receiver and one XOR gate on the RC transmitter, all powered from the 3.3 volt supply of the primary microcontroller, are placed between the USB-to-RS-232 module used to program each device and the respective primary microcontroller so that damage will not occur if the end user does not change the programmer module jumper to the 3.3 volt output position.

Figure 48:
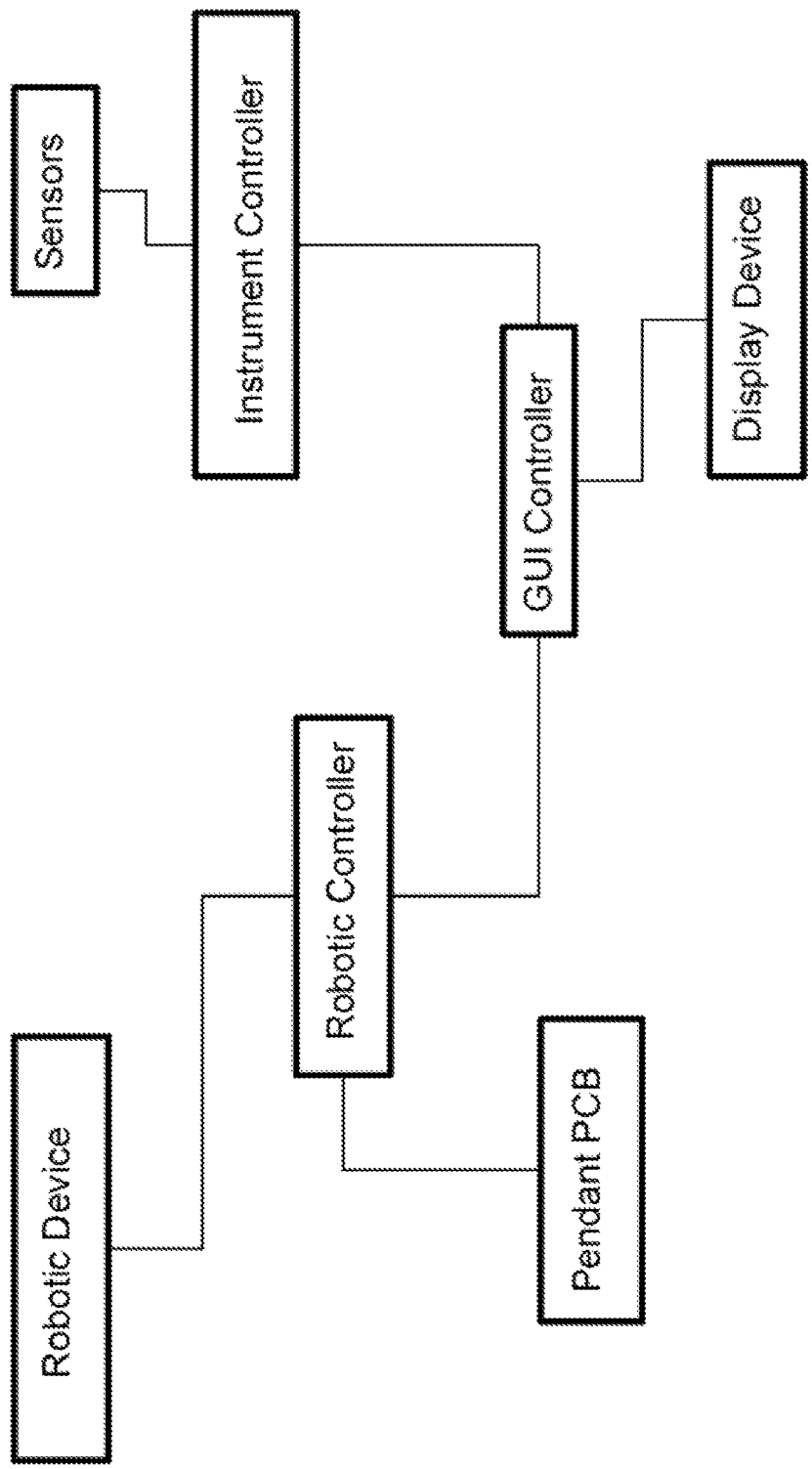
FIG. 48 schematically represents an educational system comprising multiple programmable controllers in accordance with certain aspects of the invention.

FIG. 48 schematically represents a nonlimiting education system comprising three programmable controllers configured to interact with one or more external devices, including a robotic controller, a GUI controller, and an instrument controller. The robotic controller is configured for controlling movement of a robotic device with the use of a pendant PCB. The GUI controller is configured to display graphics or video on a display device (e.g., LCD monitor, TV, etc.). The instrument controller is configured to communicate with more than one external sensors. The three controllers and pendant PCB are preferably individually programmable for simultaneous operation of the robotic device, sensors, and display device.

In view of the above, educational systems as described provide various benefits over existing systems. An exemplary benefit of the educational systems described herein is the ability for a student to configure and/or program the programmable controllers, rather than rely on factory programming or a restricted/limited user configuration interface. To this end, the programmable controllers preferably include interfaces suitable for connection to the Internet (e.g., ethernet) as well as conventional computer interface devices (e.g., VGA monitor, PS/2 keyboard and PS/2 mouse, game controller, etc.).

In addition, the programmable controllers are preferably operating system independent. For example, the programmable controllers may include an open source compiler readily available for installation onto a plurality of operating system platforms. According to one nonlimiting example, an ethernet interface is provided that eludes the operating system dependency by rendering web page coding (e.g., HTML or CSS) from the microcontroller program to a browser on a personal computer or other smart device. Educational systems comprising the above features are particularly suited for both automation training and distance learning. Preferably, the system uses an industry standard programming language (e.g., C programming) and is capable of multiple core (cog) operation. Educational systems as described herein can be adapted for use with other a variety of commercially available motorized mechanical systems such as the Erector sets with DC motors.

In a specific example, the system may include a robotic controller that includes the ability to monitor feedback from the motors. For example, as described previously the robotic controller may include diodes configured for sensing commutator switching based on feedback from the commutator and brushes of the motor. This specific example eliminates extra hardware necessary for conventional systems and thereby reduces the cost of the overall system. In addition, the physical size of the system is reduced relative to industrial devices that may require extra axis position monitoring apparatuses in order to provide similar functionality. Such feedback information may be valuable for monitoring motor stress, power source degradation, and may be applicable to various educational lessons for the students.

In addition, by actually monitoring motor rotation via the commutator pulses, the robotic controller may be programmed to determine and measure distance of movement of the robotic device. The ability to program the robotic controller for movement and monitoring motor feedback pulses for monitoring distance of movement may aid students with better travel path calculations and more accurate vector predictions relative to existing systems which are limited to only logarithmic control, that is, only timing of axis run duration. Furthermore, with such information, the specific axis movements of the robotic device may be repeatable.

The GUI controller allows an end user the option of remotely controlling another robotic device while being able to display an animated graphical representation of that remote robotic device. This may greatly reduce the data bandwidth in certain applications as only position data may be needed rather than real time video data. The GUI controller can also be programmed as a standalone gaming system. The use of the SD card on the GUI controller allows for a relatively large storage capacity for a gaming environment, photos for the control web page rendering, multiple axis position storage for the mechatronics system, etc.

The instrument controller may be used, for example, by electrical contractor students for building and testing lab projects such as heat sensors with audible alarm and voice message, process control with alarms and strobe lighting, security system and monitoring/controlling from remote locations over the internet, etc. For example, the 0-10V output may be used for controlling room lighting, the 0-10V input for lighting control input, the 4-20 mA output for indicating various levels such as water flow rate, the 4-20 mA input for sensor input such as temperature or water flow, the analog input and output for monitoring nonstandard sensors and devices, two relay drives for controlling relay coils of relays switching higher voltages, and one DC motor output for controlling pump flow rate, for example.

The instrument controller's LED output and low power audio output may be used, for example, by students when testing their code outside of the classroom. The high-power audio output may be used while a classroom speaker when demonstrating their code. The primary microcontroller (e.g., P8X32A) compiler (SimpleIDE by Google) currently only has features for the eight bit, and no parity or one stop bit at this time. Therefore, the auxiliary microcontroller (e.g., PIC12F1572) on the instrument controller may be used to convert eight data bits, no parity and one stop bit from the primary microcontroller to seven data bits, even parity and one stop bit for use over the RS-485 interface as required for the fire alarm ANN-BUS standard configuration both operating at 9600 baud. The ANN-BUS has addressed bus modules for indicating location of fire and triggering alarm sirens when evacuation is required. The instrument controller is intended to interface with the ANN-BUS permitting students the ability to program and experiment with current safety and emergency circuitry. The RFID card reader data port may be used for testing a security entry system, for example, swiping of an RFID card to actuate a solenoid door latch. The instrument controller provides hands-on experience with the various features and what is needed for the utilization of each feature as well as using the features collectively for process control, remote monitoring, security monitoring, etc.

Preferably, the educational system may be produced as a kit including one or more of the components disclosed herein, as well as an operation and training manual to facilitate operation, programming, and interfacing of the programmable controllers, and an external device, such as a mechatronic device, and its ancillaries to external systems. Preferably, the educational system is capable of introducing students to the fundamentals of industrial and commercial systems, such as robotic operation, by allowing them to build a programmable controller, programming a microcontroller of the programmable controller, and implementing the programmable controller to have the external device perform desired tasks. As such, it is within the scope of the invention that individual components of one or more of the programmable controllers are provided in the kit such that the students can build the programmable controllers themselves.

While the invention has been described in terms of specific or particular embodiments, it should be apparent that alternatives could be adopted by one skilled in the art. For example, the educational system and its components could differ in appearance and construction from the embodiments described herein and shown in the drawings, and functions of certain components of the system could be performed by components of different construction but capable of a similar (though not necessarily equivalent) function. In addition, the invention encompasses additional or alternative embodiments in which one or more features or aspects of the disclosed embodiments could be eliminated, or different disclosed embodiments may be combined. Accordingly, it should be understood that the invention is not necessarily limited to any embodiment described herein or illustrated in the drawings. It should also be understood that the phraseology and terminology employed above are for the purpose of describing the disclosed embodiments, and do not necessarily serve as limitations to the scope of the invention. Therefore, the scope of the invention is to be limited only by the following claims.

The invention claimed is:

1. An educational system comprising:
   at least one robotic device having at least five degrees of freedom and motors for moving the robotic device in at least five axes; and
   programmable controllers configured to interact with the robotic device, each of the programmable controllers comprising:
   a microcontroller;
   a memory device;
   an interface for remotely accessing the programmable controller; and
   means for interfacing with an external microcontroller of another of the programmable controllers;
   wherein a first of the programmable controllers is a programmable robotic controller comprising means for controlling movement of the robotic device in the five axes, the programmable robotic controller comprising means for monitoring and controlling axis positions of the robotic device using feedback obtained from the robotic device, the means for monitoring and controlling the axis positions of the robotic device comprising at least one diode functionally connected to current sensing lines of the motors of the robotic device, means for monitoring commutator switching of the motors while the motors are in operation; and means for determining distance of movement of the robotic device based on the commutator switching.

2. The educational system of claim 1, wherein the programmable robotic controller comprises means for sensing gestures performed by a user.

3. The educational system of claim 1, wherein the programmable robotic controller comprises means for sensing distances of objects near the educational system.

4. The educational system of claim 1, the programmable robotic controller comprising means for a user to interface with the programmable robotic controller for controlling the movement of the robotic device.

5. The educational system of claim 1, wherein the feedback obtained from the robotic device is obtained from the motors of the robotic device.

6. The educational system of claim 4, wherein the programmable robotic controller comprises means for interfacing with a programmable pendant device comprising touch switches, wherein a user can control the movement of the robotic device with the touch switches.

7. The educational system of claim 1, wherein at least one of the programmable controllers comprises means for interfacing with a programmable pendant device comprising touch switches.

8. The educational system of claim 1, wherein at least one of the programmable controllers is a graphical user interface (GUI) controller comprising a microcontroller with an internal video processor and a SD card interface for external graphics storage.

9. The educational system of claim 1, wherein at least one of the programmable controllers is an instrument controller configured to communicate with more than one external device, the instrument controller comprising a SD card interface and at least one audio output for rendering audio files, means for monitoring sensors and control actuators of a process, and a motor output for interfacing with a motor of an external device.

10. The educational system of claim 1, further comprising a remote control (RC) transmitter and an RC receiver configured for wirelessly communication therebetween to control movement of a vehicle, the RC transmitter comprising means for a user to interface with the RC transmitter for controlling the movement of the vehicle, wherein the RC receiver is configured to send a video transmission to the RC transmitter and the RC transmitter is configured to receive the video transmission from the RC receiver.

11. An educational system comprising:
    at least one robotic device having at least five degrees of freedom and motors for moving the robotic device in at least five axes; and
    programmable controllers configured to interact with the robotic device, each of the programmable controllers comprising:
    a microcontroller;
    a memory device;
    an interface for remotely accessing the programmable controller; and
    means for interfacing with an external microcontroller of another of the programmable controllers;
    wherein at least one of the programmable controllers is a programmable robotic controller comprising means for controlling movement of the robotic device in the five axes, the programmable robotic controller comprising means for monitoring and controlling axis positions of the robotic device using feedback obtained from the motors of the robotic device, and means for a user to interface with the programmable robotic controller for controlling the movement of the robotic device, the means for monitoring and controlling the axis positions of the robotic device comprising at least one diode functionally connected to current sensing lines of the motors of the robotic device, means for monitoring commutator switching of the motors while the motors are in operation; and means for determining distance of movement of the robotic device based on the commutator switching;
    wherein at least one of the programmable controllers is a graphical user interface (GUI) controller comprising a microcontroller with an internal video processor and a SD card interface for external graphics storage;

wherein at least one of the programmable controllers is an instrument controller configured to communicate with more than one robotic device, the instrument controller comprising a SD card interface and at least one audio output for rendering audio files, means for monitoring sensors and control actuators of a process, and a motor output for interfacing with motors of the robotic devices.

12. A method of using an educational system comprising programmable controllers configured to interact with at least one robotic device having at least five degrees of freedom and motors for moving the robotic device in at least five axes, each of the programmable controllers comprising a microcontroller, a memory device, an interface for remotely accessing the programmable controller, and means for interfacing with an external microcontroller of another of the programmable controllers, the method comprising:

functionally coupling a programmable robotic controller of the programmable controllers to the robotic device, the programmable robotic controller comprising means for controlling movement of the robotic device in the five axes and at least one diode functionally connected to current sensing lines of the motors of the robotic device;

programming the programmable robotic controller to control the movement of the robotic device in the five axes;

monitoring and controlling axis positions of the robotic device using feedback obtained from the robotic device;

monitoring commutator switching of the motors while the motors are in operation;

determining distance of movement of the robotic device based on the commutator switching; and providing instructions to the robotic device through the programmable robotic controller from a remote location relative to the programmable robotic controller.

13. The method of claim 12, further comprising programming the programmable robotic controller to sense gestures performed by a user.

14. The method of claim 12, further comprising programming the programmable robotic controller to sense distances of objects near the educational system.

15. The method of claim 12, wherein the feedback obtained from the robotic device is obtained from the motors of the robotic device.

16. The method of claim 12, further comprising controlling the movement of the robotic device with touch switches.

* * * * *